United States Patent
Kobayashi et al.

(10) Patent No.: US 7,245,479 B2
(45) Date of Patent: Jul. 17, 2007

(54) ELECTROLYTIC CAPACITOR AND METHOD OF MANUFACTURING THE SAME

(75) Inventors: Masaaki Kobayashi, Tokyo (JP); Atsushi Monden, Tokyo (JP); Tokuhiko Handa, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/634,126

(22) Filed: Dec. 6, 2006

(65) Prior Publication Data

US 2007/0081300 A1 Apr. 12, 2007

Related U.S. Application Data

(62) Division of application No. 11/089,227, filed on Mar. 25, 2005.

(30) Foreign Application Priority Data

| Mar. 31, 2004 | (JP) | 2004-105231 |
| Mar. 31, 2004 | (JP) | 2004-105553 |
| Mar. 31, 2004 | (JP) | 2004-106932 |
| Mar. 31, 2004 | (JP) | 2004-107215 |

(51) Int. Cl.
*H01G 9/00* (2006.01)

(52) U.S. Cl. ........... 361/523; 361/509; 361/516; 361/519; 361/525; 361/528; 361/529; 29/25.01; 29/25.03

(58) Field of Classification Search ........ 361/523, 361/524, 525, 528–534, 508–509, 516–519; 29/25.01, 25.03; 252/62.2
See application file for complete search history.

(56) References Cited

U.S. PATENT DOCUMENTS

| 5,428,500 | A | | 6/1995 | Nishiyama et al. | |
| 5,457,862 | A | | 10/1995 | Sakata et al. | |
| 5,694,287 | A | * | 12/1997 | Nishiyama et al. | 361/525 |
| 5,914,852 | A | * | 6/1999 | Hatanaka et al. | 361/523 |
| 6,134,099 | A | * | 10/2000 | Igaki et al. | 361/509 |
| 6,962,612 | B1 | * | 11/2005 | Saito et al. | 29/25.03 |

FOREIGN PATENT DOCUMENTS

| JP | U 5-6826 | 1/1993 |
| JP | U 5-23529 | 3/1993 |
| JP | A 11-176695 | 7/1999 |

* cited by examiner

*Primary Examiner*—Nguyen T. Ha
(74) *Attorney, Agent, or Firm*—Oliff & Berridge PLC

(57) ABSTRACT

The present invention provides an electrolytic capacitor manufacturing method capable of manufacturing an electrolytic capacitor having the PTC function as easy as possible. A main electrode layer in a cathode is formed so as to have the PTC function. Different from a conventional electrolytic capacitor manufacturing method of connecting a PTC thermistor to a capacitor element to give the PTC function to an electrolytic capacitor so that an electrolytic capacitor manufacturing process is complicated and the number of manufacturing processes is increased by the amount corresponding to the PTC thermistor connecting process, the process of connecting the PTC thermistor to the capacitor element is unnecessary. Consequently, complication of the electrolytic capacitor manufacturing process and increase in the number of manufacturing processes caused by the PTC thermistor connecting process can be prevented.

3 Claims, 16 Drawing Sheets

ELECTROLYTIC CAPACITOR AND METHOD OF MANUFACTURING THE SAME

This is a Divisional of application Ser. No. 11/089,227 filed Mar. 25, 2005. The entire disclosure of the prior application is hereby incorporated by reference herein in its entirety.

BACKGROUND OF THE INVENTION

1. Field of the Invention

The present invention relates to an electrolytic capacitor having a solid electrolyte layer and a method of manufacturing the same.

2. Description of the Related Art

In recent years, as one of electronic parts adapted for high frequency applications, an electrolytic capacitor is mounted on various electronic devices. For example, under the circumstance that digitization, miniaturization and speedup of electronic devices is being acceleratedly progressed, larger capacity and lower impedance of an electrolytic capacitor are demanded and, in addition, assurance of operation stability and operation reliability and longer life are also demanded.

A main part (capacitor element) of an electrolytic capacitor has, for example, a stacked structure in which an anode made of a valve metal, an oxide film (dielectric layer) formed by anodizing the surface layer of the anode, an electrolyte layer, and a cathode are stacked in this order.

The electrolytic capacitors are roughly divided into two kinds according to the kind of the electrolyte layer; a liquid electrolytic capacitor whose capacitor element includes an electrolyte layer (electrolyte) made of a liquid material, and having a conductive mechanism mainly using ionic conduction, and a solid electrolytic capacitor whose capacitor element includes an electrolyte layer (solid electrolyte layer) made of a solid material such as complex salt or conductive high polymer, and having a conductive mechanism mainly using electron conduction. When the two kinds of electrolytic capacitors are compared with each other from the viewpoint of stability of operating characteristics, for example, in the liquid electrolytic capacitor, the operating characteristics deteriorate with time due to leakage and evaporation of the electrolyte. In contrast, the deterioration with time in the operating characteristics due to leakage and evaporation of the electrolyte does not occur in the solid electrolytic capacitor. Consequently, as an electrolytic capacitor which can become the main stream in future, recently, in place of the liquid electrolytic capacitor, the solid electrolytic capacitor is being actively researched and developed. In the research process on the solid electrolytic capacitor, for example, in consideration of a series of operating characteristics such as the leak current characteristic, impedance characteristic, and heat resistance, the main part of the solid electrolyte layer is rapidly shifting from manganese dioxide or complex salt to a conductive high polymer of a conjugated system.

For the solid electrolytic capacitor, in particular, based on the technical background to be described below, to prevent destruction (including firing and burning) caused by heat generated at the time of short circuit, the function of increasing resistance as the temperature rises within a predetermined temperature range (so-called PTC (Positive Temperature Coefficient) function) is in demand.

Specifically, the solid electrolytic capacitor is mounted on various electronic devices (electronic circuits) as described above and has an advantage of generally low failure rate. However, when an overvoltage (voltage larger than rated voltage) or backward voltage (voltage whose sign of positive or negative is opposite) is applied due to a trouble on an electronic circuit and a dielectric layer is partially destroyed due to the overvoltage or backward voltage, the anode, solid electrolyte layer, and cathode are unintentionally made conductive, so that short circuit occurs in the solid electrolytic capacitor. In the case where short circuit occurs, when excess current (short-circuit current) flows in the solid electrolytic capacitor, the solid electrolytic capacitor generates heat and, in some cases, is destroyed by firing or burning caused by the heat generation.

As a measure to prevent destruction caused by heat generated at the time of short circuit in the solid electrolytic capacitor and also to prevent destruction of the solid electrolytic capacitor and circuit parts mounted on an electronic circuit, for example, a technique of mounting a fuse on the solid electrolytic capacitor may be employed. A solid electrolytic capacitor on which the fuse is mounted and having a configuration that a cathode and a cathode lead (lead for passing current) are electrically connected to each other via the fuse is known. In a solid electrolytic capacitor of this kind, when the fuse is blown due to heat generation at the time of short circuit, a circuit mechanism is interrupted, that is, a current path of excess current is interrupted, so that destruction of the solid electrolytic capacitor is prevented. However, the solid electrolytic capacitor using the fuse has some problems due to a structural factor and a mechanical factor of the fuse. First, when a fuse is mounted on a solid electrolytic capacitor, the structure of the solid electrolytic capacitor is complicated and is enlarged. Second, the mechanical strength of the fuse is low, that is, it is difficult to handle the fuse. When the process of manufacturing the solid electrolytic capacitor is complicated, the manufacture yield deteriorates. Third, in some cases, reliability of a solid electrolytic capacitor on which a fuse is mounted is low. More concretely, for example, when the periphery of a fuse is firmly covered with a mold resin, even if the fuse is blown due to heat generation at the time of short circuit, there is the possibility that the fuse is not completely blown due to the existence of the mold resin, so that the circuit mechanism is not therefore interrupted and the solid electrolytic capacitor may be destroyed. Therefore, a safety mechanism replacing the fuse is needed to increase the reliability of prevention of destruction of the solid electrolytic capacitors, and the PTC function as the safety mechanism is in demand.

Some modes of an electrolytic capacitor having the PTC function have been already proposed. Concretely, for example, an electrolytic capacitor in which PTC thermistors are disposed so as to face a capacitor element, and the PTC thermistors and the capacitor element are covered with a mold resin is known (refer to, for example, Japanese Utility Model Laid-Open No. H05-006826). In the electrolytic capacitor of this kind, a PTC thermistor is not provided as a safety mechanism replacing the fuse. As another example, an electrolytic capacitor having a configuration in which an anode (internal terminal) of a capacitor element and an anode lead (external terminal) are electrically connected to each other via a PTC thermistor (semiconductor ceramic layer) is known (refer to, for example, Japanese Utility Model Laid-Open No. H05-023529). Further, for example, an electrolytic capacitor having a configuration in which one of electrodes (external electrode) of a capacitor element and an electrode lead (metal terminal) are electrically connected to each other via the PTC thermister (an excess current/overheat protection device having the PTC function) is known (refer to, for example, Japanese Patent Laid-Open No. H11-176695). Generally, the PTC thermistor is electrically connected to a capacitor element by thermo compression bonding or a conducive adhesive.

For a solid electrolytic capacitor having the PTC function, there are various demands from the following viewpoints.

In a process of manufacturing a solid electrolytic capacitor having the PTC function, to increase productivity of the solid electrolytic capacitor, the solid electrolytic capacitor has to be manufactured as easy as possible. However, the conventional solid electrolytic capacitor manufacturing method has the following problem. By using the PTC function of the PTC thermistor, destruction of the solid electrolytic capacitor caused by heat generated at the time of short circuit is prevented. Since the PTC thermistor is connected to the capacitor element to give the PTC function to the solid electrolytic capacitor, the solid electrolytic capacitor manufacturing process is complicated and the number of manufacturing processes increases only by the amount corresponding to the PTC thermistor connecting process required. As a result, it is difficult to increase productivity of the electrolytic capacitor. Therefore, to increase the productivity of the electrolytic capacitor while preventing destruction caused by heat generated at the time of short circuit by using the PTC function, it is an urgent necessity to establish a technique capable of manufacturing the solid electrolytic capacitor having the PTC function as easy as possible. In particular, in the case of establishing the technique capable of manufacturing the solid electrolytic capacitor having the PTC function as easy as possible, it is also important to simplify the configuration of the solid electrolytic capacitor as much as possible in consideration of miniaturization of the solid electrolytic capacitor.

In the process of manufacturing the solid electrolytic capacitor having the PTC function, to assure productivity by increasing the manufacture yield of the solid electrolytic capacitor, it is necessary to stably manufacture the solid electrolytic capacitor as much as possible. In the conventional solid electrolytic capacitor manufacturing method, however, for example, when a PTC thermistor is thermo-compression-bonded to the capacitor element, the dielectric layer is easily damaged severely due to a mechanical factor (excessive external force applied to the capacitor element) at the time of thermo compression bonding, there is the possibility that the solid electrolytic capacitor is mechanically destroyed during manufacture. Different from destruction of the solid electrolytic capacitor caused by heat generated at the time of short circuit, the mechanical destruction of the solid electrolytic capacitor is fatal one and the basic structure itself of the solid electrolytic capacitor is damaged. Therefore, the mechanical destruction cannot be prevented by using the PTC function. When the solid electrolytic capacitor is mechanically destroyed during manufacture, naturally, the manufacture yield deteriorates and productivity of the solid electrolytic capacitor cannot be assured, so that it becomes difficult to stably manufacture the solid electrolytic capacitor. Therefore, to increase the productivity by increasing the manufacture yield of the solid electrolytic capacity while preventing destruction caused by heat generated at the time of short circuit by using the PTC function, it is an urgent necessity to establish a technique capable of manufacturing the solid electrolytic capacitor having the PTC function as stably as possible. In particular, in the case of establishing the technique capable of manufacturing the solid electrolytic capacitor having the PTC function as stably as possible, as described above, it is also important to manufacture the solid electrolytic capacitor as easily as possible in consideration of productivity of the solid electrolytic capacitor.

Further, to achieve higher performance of the solid electrolytic capacitor having the PTC function, it is necessary to reduce the resistance characteristic of the solid electrolytic capacitor as much as possible. However, in the conventional solid electrolytic capacitor manufacturing method, the resistance characteristic is not sufficiently low to improve the performance, so that there is room for improvement from the viewpoint of the resistance characteristic. More concretely, for example, in the case of connecting a PTC thermistor to a capacitor element to give the PTC function to the solid electrolytic capacitor, the resistance characteristic of the solid electrolytic capacitor increases only by the amount corresponding to the resistance of the PTC thermistor and the contact resistance between the PTC thermistor and the capacitor element. The resistance characteristic can increase to the degree that an adverse influence is given to the performance of the solid electrolytic capacitor. In the case of bonding the PTC thermistor to the capacitor element by using a conductive adhesive to give the PTC function to the solid electrolytic capacitor, an amount of increase in the resistance characteristic is often smaller than that in the case of thermo-compression-bonding the PTC thermistor to the capacitor element. Consequently, from the viewpoint of preventing the resistance characteristic of the solid electrolytic capacitor from increasing, it is preferable to use the bonding method using the conductive adhesive. However, when increasing demand for higher performance of the solid electrolytic capacitor is considered, it cannot be said that the resistance characteristic of the solid electrolytic capacitor obtained in the case of using simply a conductive adhesive is sufficient. Therefore, to achieve higher performance of the solid electrolytic capacitor while preventing destruction caused by heat generated at the time of short circuit by using the PTC function, it is also an urgent necessity to establish a technique capable of reducing the resistance characteristic of the solid electrolytic capacitor having the PTC function as much as possible.

SUMMARY OF THE INVENTION

The present invention has been achieved in consideration of such problems and its first object is to provide an electrolytic capacitor manufacturing method capable of manufacturing an electrolytic capacitor having a PTC function as easily as possible.

A second object of the invention is to provide an electrolytic capacitor manufacturing method capable of manufacturing an electrolytic capacitor having a PTC function as stably as possible by preventing the electrolytic capacitor having the PTC function from being mechanically destroyed during manufacture.

A third object of the invention is to provide an electrolytic capacitor manufacturing method capable of reducing the resistance characteristic of an electrolytic capacitor having the PTC function as much as possible.

A fourth object of the invention is to provide an electrolytic capacitor whose PTC function is assured with the simplest configuration.

A fifth object of the invention is to provide an electrolytic capacitor capable of preventing destruction caused by heat generated at the time of short circuit by using the PTC function as much as possible.

A sixth object of the invention is to provide an electrolytic capacitor whose PTC function is assured with lowest resistance.

An electrolytic capacitor according to a first aspect of the invention has a stacked structure in which a first electrode layer, a dielectric layer, a solid electrolyte layer, and a second electrode layer in which resistance increases in accordance with rise in temperature within a predetermined temperature range are stacked in this order.

In the electrolytic capacitor according to the first aspect of the invention, the function of increasing the resistance in accordance with rise in temperature within a predetermined temperature range (so-called PTC function) is given to the second electrode layer. Since the PTC function is assured without increasing the number of parts of the electrolytic capacitor, the configuration of the electrolytic capacitor can be prevented from becoming complicated to assure the PTC function.

An electrolytic capacitor according to a second aspect of the invention includes: a capacitor element having a stacked structure in which a first electrode layer, a dielectric layer, a solid electrolyte layer, and a second electrode layer are stacked in this order; a resistance control layer which is connected to the second electrode layer in the capacitor element, has a sheet structure in which conductive particles are held in a high polymer, and has a first face on the side close to the second electrode layer and a second face on the side far from the second electrode layer, a surface process for exposing the conductive particles being performed on at least one of the first and second faces, and in which resistance increases in accordance with rise in temperature in a predetermined temperature range; and an electrode lead connected to the resistance control layer.

In the electrolytic capacitor according to the second aspect of the invention, while assuring the function of increasing resistance in accordance with rise in temperature within a predetermined temperature range (so-called PTC function) in the resistance control layer, the contact resistance between the resistance control layer and the second electrode layer or electrode lead is reduced.

An electrolytic capacitor manufacturing method according to the first aspect of the invention includes the step of forming a second electrode layer in which resistance increases in accordance with rise in temperature within a predetermined temperature range on a solid electrolyte layer in a stacked structure in which a first electrode layer, a dielectric layer, and the solid electrolyte layer are stacked in this order.

In the electrolytic capacitor manufacturing method according to the first aspect of the invention, a second electrode layer is formed so as to have the function of increasing resistance in accordance with rise in temperature within a predetermined temperature range (so-called PTC function) on a solid electrolyte layer. Different from the case in which a PTC thermistor is connected to a capacitor element to give the PTC function to an electrolytic capacitor so that the process of manufacturing the electrolytic capacitor is more complicated and the number of manufacturing processes increases by the amount corresponding to the PTC thermistor connecting process, the process of connecting the PTC thermistor to the capacitor element is unnecessary. Consequently, complication of the electrolytic capacitor manufacturing process and increase in the number of manufacturing processes caused by the PTC thermistor connecting process is prevented. Moreover, to form the second electrode layer having the PTC function, it is sufficient to use, as the material of the second electrode layer, the materials capable of assuring the PTC function in place of a material which cannot assure the PTC function. That is, since the electrolytic capacitor can be manufactured by using the existing method of manufacturing an electrolytic capacitor which does not have the PTC function only with the change point of forming the second electrode layer by using the material for assuring the PTC function, the electrolytic capacitor manufacturing process is not complicated.

An electrolytic capacitor manufacturing method according to the second aspect of the invention includes: a step of connecting a resistance control layer having a sheet structure in which conductive particles are held in a high polymer and whose resistance increases in accordance with rise in temperature within a predetermined temperature range to a second electrode layer in a capacitor element in which a first electrode layer, a dielectric layer, a solid electrolyte layer, and the second electrode layer are stacked in this order; and a step of connecting an electrode lead to the resistance control layer, wherein the step of connecting the resistance control layer to the second electrode layer and the electrode lead comprises: a first step of performing surface process for exposing the conductive particles on at least one of a first face facing the second electrode layer of the resistance control layer and a second face on the side opposite to the first face; a second step of connecting the resistance control layer to the second electrode layer in the first face; and a third step of connecting the resistance control layer to the electrode lead in the second face.

In the electrolytic capacitor manufacturing method according to the second aspect of the invention, when a sheet-shaped resistance control layer (high polymer, conductive particles) having the function of increasing resistance in accordance with rise in temperature within a predetermined temperature range (so-called PTC function) is connected to the second electrode layer and the electrode lead, surface process for exposing the conductive particles is performed on at least one of first and second faces of the resistance control layer. After that, the first face of the processed resistance control layer is connected to the second electrode and the second face is connected to the electrode lead. Since the conductive particles are exposed in the resistance control layer, the contact area (electric contact area) between the resistance control layer (conductive particles) and the second electrode layer or electrode lead increases. Consequently, the contact resistance between the resistance control layer and the second electrode layer or electrode lead is reduced.

In particular, in the electrolytic capacitor according to the first aspect of the invention, the second electrode layer has a stacked structure in which two or more layers are stacked and, in at least one of the two or more layers, resistance increases in accordance with rise in temperature within a predetermined temperature range. Alternately, the second electrode layer may have a single-layer structure. In the case where he second electrode layer has a stacked structure, the second electrode layer may have a two-layer structure including a main electrode layer for assuring conductivity and a sub electrode layer which is disposed between the main electrode layer and the solid electrolyte layer and is used for electrically bonding the main electrode layer to the solid electrolyte layer. In this case, it is preferable that the second electrode layer contains a high polymer and conductive particles held in the high polymer.

In the electrolytic capacitor according to the first aspect of the invention, preferably, the second electrode layer contains at least one of metal particles and conductive ceramic particles. In this manner, the resistance characteristic is lowered while assuring the PTC function in the second electrode layer. In this case, the second electrode layer has a stacked structure in which two or more layers are stacked and, in at least one of the two or more layers, at least one of the metal particles and the conductive ceramics particles is contained and resistance increases in accordance with rise in temperature within a predetermined temperature range. Alternately, the second electrode layer may have a single-layer structure. In the case where the second electrode layer has a stacked structure, it may have a three-layer structure comprising: a main electrode layer for assuring conductivity; a sub electrode layer which is disposed between the main electrode layer and the solid electrolyte layer and is used for electrically bonding the main electrode layer to the solid electrolyte layer; and an auxiliary electrode layer which is disposed on the side opposite to the sub electrode layer while sandwiching the main electrode layer and contains at least one of the metal particles and the conductive ceramic particles, and whose resistance increases in accordance with rise in temperature within a predetermined temperature range. Preferably, the metal particles are metal particles of at least one of the group including nickel (Ni), copper (Cu), aluminum (Al), tungsten (W), molybdenum (Mo), zinc (Zn), cobalt (Co), platinum (Pt), gold (Au), and silver (Ag), and the conductive ceramic particles are conductive ceramic particles of at least one of the group including tungsten carbide (WC), titanium nitride (TiN), zirconium nitride (ZrN), titanium carbide (TiC), titanium boride (TiB$_2$), molybdenum silicide (MoSi$_2$), and tantalum boride (TaB$_2$). A material for increasing the resistance in accordance with rise in the temperature within a predetermined temperature range is a liquid high polymer containing at least one of the metal particles and the conductive ceramic particles, and the second electrode layer may contain a film-shaped high polymer formed by using the liquid high polymer and at least one of the metal particles and the conductive ceramic particles held in the film-shaped high polymer.

In the electrolytic capacitor according to the first aspect of the invention, preferably, the second electrode layer is formed in a film shape by using a liquid material for increasing resistance in accordance with rise in temperature within a predetermined temperature range on the surface of the solid electrolyte layer. With the configuration, destruction caused by heat generated at the time of short circuit is prevented by using the PTC function of the second electrode layer. In this case, the second electrode layer may have a stacked structure in which two or more layers are stacked and, in at least one of the two or more layers, resistance may increase in accordance with rise in temperature within a predetermined temperature range. Alternately, the second electrode layer may have a single-layer structure. Preferably, the liquid material is a liquid high polymer containing conductive particles, and the second electrode layer contains a film-shaped high polymer formed by using the liquid high polymer and the conductive particles held in the film-shaped high polymer.

Preferably, in the electrolytic capacitor according to the second aspect of the invention, at least one of a plasma process, an ultraviolet process, an ozone process, and a laser process is performed as the surface process on at least one of the first and second faces of the resistance control layer.

In the electrolytic capacitor manufacturing method according to the first aspect of the invention, it is preferable to form a second electrode layer so as to contain at least one of metal particles and conductive ceramic particles. With the configuration, when a second electrode layer is formed so as to have the PTC function, the second electrode layer is formed so as to contain at least one of the metal particles and the conductive ceramic particles. Since the resistance characteristic of the electrolytic capacitor is reduced on the basis of a low resistance characteristic of the metal particles or conductive ceramic particles, while preventing destruction of the electrolytic capacitor caused by heat generated at the time of short circuit by using the PTC function, the resistance characteristic of the electrolytic capacitor can be reduced.

In the electrolytic capacitor manufacturing method according to the first aspect of the invention, preferably, a second electrode layer is formed by supplying a liquid material for increasing resistance in accordance with rise in temperature within a predetermined temperature range on the surface of the solid electrolyte layer. Consequently, at the time of forming the second electrode layer so that the solid electrolytic layer has the PTC function, a liquid material is supplied on the surface of the solid electrolyte layer, thereby forming the second electrode layer. Different from the case where the dielectric layer tends to be severely damaged due to a mechanical factor (excessive external force applied to the electrolytic capacitor) which occurs at the time of thermo-compression-bonding a PTC thermistor to the electrolytic capacitor, a large external force is not applied to the dielectric layer during manufacture, so that damage due to the mechanical factor during manufacture in the dielectric layer is suppressed.

The "liquid material" is a material which enters a liquid state (fluid state) directly without using a solvent or indirectly by using a solvent (by being dissolved in a solvent) at room temperature (atmosphere temperature of normal environment in which, generally, a process of manufacturing an electrolytic capacitor is performed except for high-temperature environment which is intentionally set) and which can be directly formed in a film by being supplied onto the surface of a solid electrolyte layer by using a method such as coating, dipping, or printing. The "liquid state (fluid state)" is a concept including a paste state as long as the material can be supplied onto the surface of a solid electrolyte layer and is, for example, a state where the material has a viscosity in a range from about 100 cP to 1,000,000 cP. The "liquid high polymer" is a high polymer having characteristics similar to those of the "liquid material" and is, concretely, the thermosetting high polymer or soluble thermoplastic high polymer (a thermoplastic high polymer which does not directly enter a liquid state at room temperature but indirectly becomes a liquid state since a solvent which can be dissolved at room temperature exists) except for an insoluble thermoplastic high polymer (a thermoplastic high polymer which does not directly enter a liquid state at room temperature and does not also indirectly enter a liquid state since a solvent which can be dissolved at room temperature does not exist).

In the electrolytic capacitor according to the first aspect of the invention, the function of increasing the resistance in accordance with rise in temperature within a predetermined temperature range (so-called PTC function) is given to the second electrode without increasing the number of parts of the electrolytic capacitor, so that the PTC function can be assured with the simplest configuration. In this case, the resistance characteristic is reduced while assuring the PTC function in the second electrode layer, the PTC function can be assured with the lowest resistance. Since destruction caused by heat generated at the time of short circuit is suppressed by the PTC function, destruction caused by heat at the time of short circuit can be prevented as much as possible by using the PTC function.

In the electrolytic capacitor according to the second aspect of the invention, while assuring the PTC function in the resistance control layer, the contact resistance between the resistance control layer and the second electrode layer or electrode lead is reduced. Thus, the PTC function can be assured with resistance as low as possible.

In the electrolytic capacitor manufacturing method according to the first aspect of the invention, a second electrode layer is formed so as to have the function of increasing resistance in accordance with rise in temperature within a predetermined temperature range (so-called PTC function) on a solid electrolyte layer. Consequently, complication of the electrolytic capacitor manufacturing process and increase in the number of manufacturing processes caused by the PTC thermistor connecting process is prevented and an electrolytic capacitor can be manufactured by using the existing method of manufacturing an electrolytic capacitor which does not have the PTC function, the electrolytic capacitor having the PTC function can be manufactured as easily as possible. In this case, at the time of forming the second electrode layer so as to have the PTC function, the second electrode layer is formed so as to contain at least one of metal particles and conductive ceramic particles. Consequently, because of the low resistance characteristic of the metal particles or conductive ceramic particles, the resistance characteristic of the electrolytic capacitor is reduced. Thus, the resistance characteristic of the electrolytic capacitor having the PTC function can be reduced as much as possible. At the time of forming the second electrode layer so as to have the PTC function, a liquid material is supplied on the surface of the solid electrolyte layer, thereby forming the second electrode layer. Consequently, destruction in the dielectric layer due to a mechanical factor during manufacture is suppressed. By preventing an electrolytic capacitor having the PTC function from being mechanical damaged during manufacture, the electrolytic capacitor having the PTC function can be manufactured stably and easily.

According to the electrolytic capacitor manufacturing method according to the second aspect of the invention, at the time of connecting a sheet-shaped resistance control layer (high polymer, conductive particles) having the PTC function to the second electrode layer and the electrode lead, the surface process for exposing the conductive particles is performed on at least one of the first and second faces of the resistance control layer. After that, the first face of the processed resistance control layer is connected to the second electrode layer and the second face is connected to the electrode lead. Consequently, the contact resistance between the resistance control layer and the second electrode layer or electrode lead is reduced, so that the resistance characteristic of the electrolytic capacitor having the PTC function can be reduced as much as possible.

Other and further objects, features and advantages of the invention will appear more fully from the following description.

DETAILED DESCRIPTION OF THE PREFERRED EMBODIMENTS

First Embodiment

Figure 1:
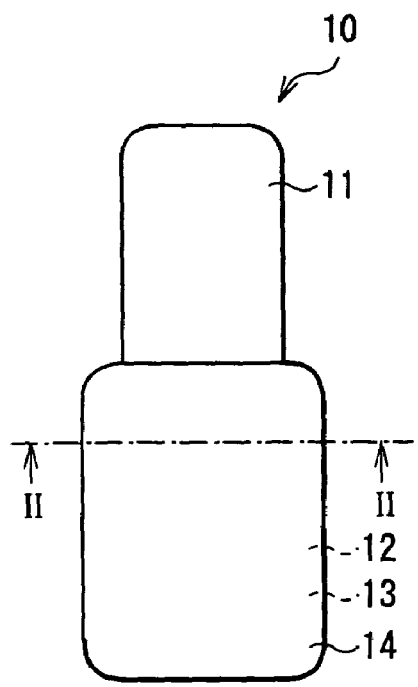
FIG. 1 is an external view showing an external configuration of an electrolytic capacitor according to a first embodiment of the invention.
Figure 2:
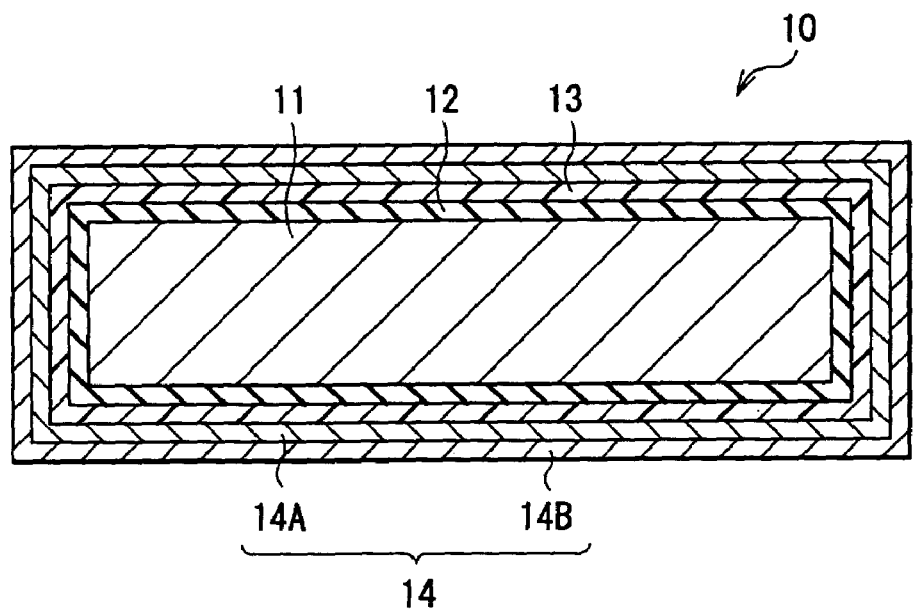
FIG. 2 is an enlarged cross section showing a sectional configuration of the electrolytic capacitor illustrated in FIG. 1.

First, the configuration of an electrolytic capacitor according to a first embodiment of the invention will be briefly described with reference to FIGS. 1 and 2. FIGS. 1 and 2 show the configuration of the main part (a capacitor element 10) of the electrolytic capacitor. FIG. 1 shows an external configuration and FIG. 2 shows an enlarged sectional configuration taken along line II-II of FIG. 1.

The electrolytic capacitor has a structure that an anode lead and a cathode lead (which are not shown) are connected to the capacitor element 10 shown in FIGS. 1 and 2 and the capacitor element 10 is covered with a mold resin (not shown) so that both of the anode lead and the cathode lead are partially exposed. An electric reaction occurs in the capacitor element 10 as a main part of the electrolytic capacitor. For example, the capacitor element 10 includes, as shown in FIGS. 1 and 2, an anode 11, a dielectric layer 12 disposed so as to partially cover the periphery (of one end) of the anode 11, a solid electrolyte layer 13 disposed so as to cover the dielectric layer 12, and a cathode 14 disposed so as to cover the solid electrolyte layer 13. That is, the capacitor element 10 has a stacked structure in which the anode 11, dielectric layer 12, solid electrolyte layer 13, and cathode 14 are stacked in this order.

The anode 11 is a first electrode layer having a rough surface structure which is subjected to surface enlarging process (or roughened), and is made of a valve metal such as aluminum (Al), titanium (Ti), tantalum (Ta), or niobium (Nb). More concretely, the anode 11 is, for example, metal foil of aluminum, titanium, or the like or is a metal sintered body made of tantalum or niobium. The details of the rough surface structure of the anode 11 subjected to surface enlargement process will be described later (refer to FIG. 3).

The dielectric layer 12 is an oxide film formed by anodizing the surface layer of the anode 11 made of the valve metal. The dielectric layer 12 is made of, for example, aluminum oxide ($Al_2O_3$) when the anode 11 is made of aluminum.

The solid electrolyte layer 13 contains, for example, the conductive high polymer and a dopant for controlling the conductivity of the conductive high polymer, that is, has a configuration that the conductive high polymer is doped with the dopant. The conductive high polymer is selected from, for example, at least one of the group consisting of polyaniline, polypyrrole, polythiophene, polyfuran, and their derivatives. A concrete example is polyethylene dioxythiophene as a derivative of polythiophene. The dopant is selected from, for example, at least one of the group consisting of alkylbenzene sulfonic acid, salt of the same, alkylnaphthalene sulfonic acid, salt of the same, and phosphoric acid. A concrete example is paratoluene sulfonic acid iron or isopyropyl naphthalene sulfonic acid iron. The electrolytic capacitor in which the capacitor element 10 includes the solid electrolyte layer 13 is a so-called solid electrolytic capacitor.

The cathode 14 is a second electrode layer disposed so as to face the anode 11 while sandwiching the dielectric layer 12 and the solid electrolyte layer 13. The cathode 14 has the function of an inherent electrode and also a function (so-called PTC function) that resistance increases as the temperature rises in a predetermined temperature range, more concretely, resistance increases exponentially. The resistance of the cathode 14 having the PTC function increases by about 1,000 times or more in the temperature range from about 60° C. or higher and 150° C. or lower (as compared with resistance at room temperature).

Particularly, the cathode 14 has the stack structure in which, for example, two or more layers are stacked, and at least one of the two or more layers has the PTC function. Concretely, the cathode 14 has, for example, as shown in FIG. 2, a main electrode layer 14B for assuring conductivity and a sub electrode layer 14A disposed between the main electrode layer 14B and the solid electrolyte layer 13 and electrically joining the main electrode layer 14B to the solid electrolyte layer 13. That is, the cathode 14 has a two-layer structure in which the main electrode layer 14B is stacked on the sub electrode layer 14A. In the cathode 14, for example, the sub electrode layer 14A does not have the PTC function and only the main electrode layer 14B has the PTC function.

The sub electrode layer 14A contains, for example, carbon. The sub electrode layer 14A has not only the function of electrically joining the main electrode layer 14B to the solid electrolyte layer 13 but also, for example, the function of preventing migration of a specific component (for example, silver (Ag)) in the main electrode layer 14B in the environments of high temperature and high moisture in the case where the main electrode layer 14B comes into direct contact with the solid electrolyte layer 13.

The main electrode layer 14B contains, for example, a metal. Concretely, the main electrode layer 14B contains, for example, a high polymer as a main component and conductive particles as a sub component held in the high polymer. That is, the main electrode layer 14B is a so-called polymer PTC (P-PTC) layer. The high polymer is, for example, one of the group consisting of epoxy resin, poly vinylidene fluoride (PVDF), and polyethylene (PE). The conductive particles are, for example, metal particles of nickel (Ni), copper (Cu), aluminum (Al), tungsten (W), molybdenum (Mo), zinc (Zn), cobalt (Co), platinum (Pt), gold (Au), silver (Ag), and the like, or conductive ceramic particles of tungsten carbide (WC), titanium nitride (TiN), zirconium nitride (ZrN), titanium carbide (TiC), titanium boride ($TiB_2$), molybdenum silicide ($MoSi_2$), and tantalum boride ($TaB_2$).

For reference sake, the anode lead and the cathode lead are made of, for example, a metal such as iron (Fe) or copper (Cu) or a plated metal obtained by performing a plating process (for example, tinning (Sn) or plating of tin lead (SnPb)) on the metals, and are connected to the anode 11 and the cathode 14, respectively, of the capacitor element 10. The mold resin is, for example, an insulating resin such as epoxy resin.

Figure 3:
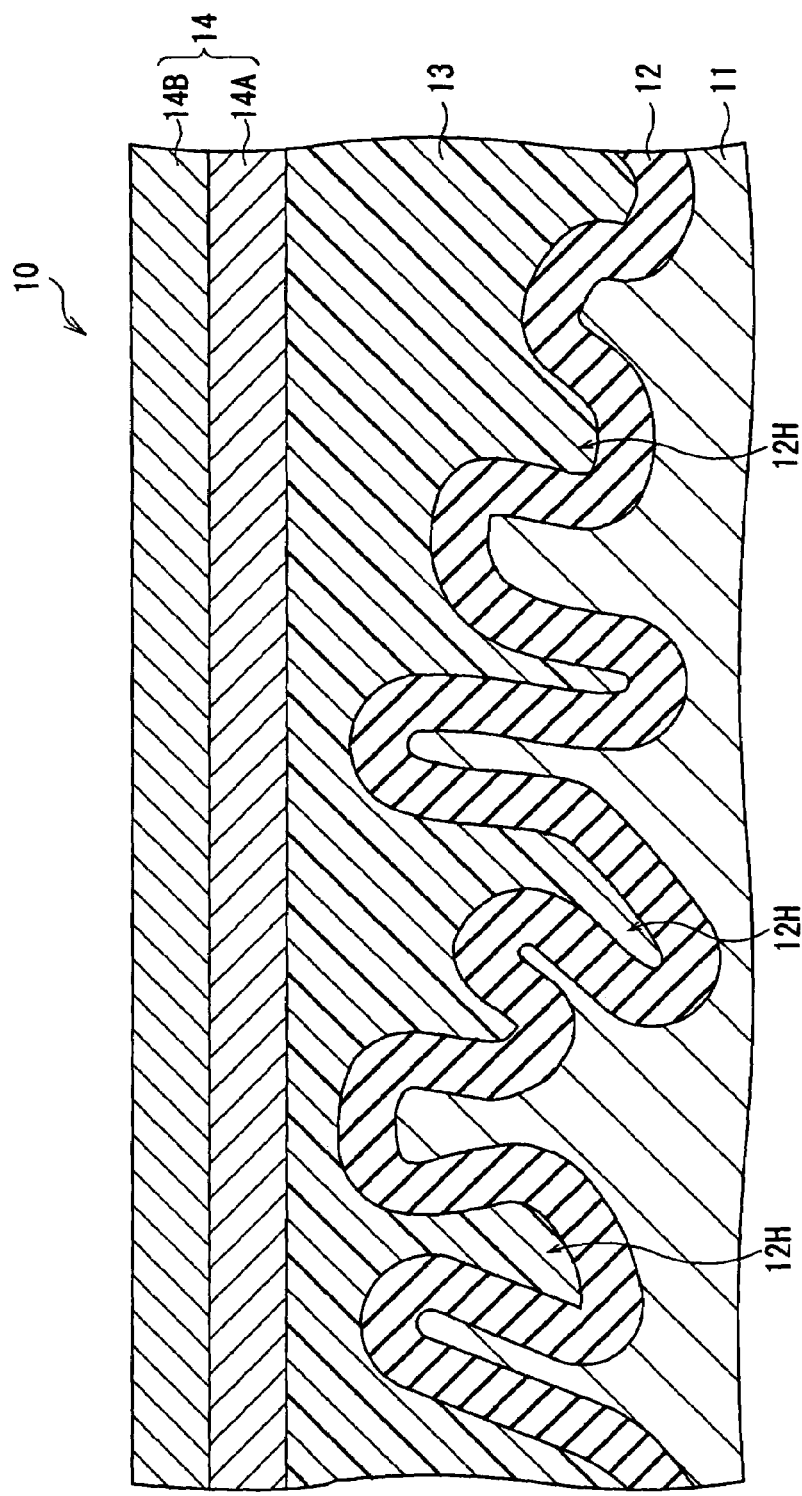
FIG. 3 is a partially enlarged cross section showing a sectional configuration of the electrolytic capacitor illustrated in FIG. 2.

The detailed configuration of the capacitor element 10 will now be described with reference to FIG. 3. FIG. 3 is a partially enlarged view showing a sectional configuration of the capacitor element 10 illustrated in FIG. 2.

In the capacitor element 10, for example, as shown in FIG. 3, the dielectric layer 12, solid electrolyte layer 13, and cathode 14 (the sub electrode layer 14A and the main electrode layer 14B) are stacked in this order so as to cover the anode 11. In the capacitor element 10, to realize larger capacity by increasing the surface area of the anode 11, the surface enlarging process (or roughening process) is performed on the anode 11 as described above, so that the anode 11 has a fine surface rough structure. The surface rough structure of the anode 11 is reflected and the dielectric layer 12 disposed so as to cover the anode 11 also has a fine rough structure. Further, the solid electrolyte layer 13 and the cathode 14 (sub electrode layer 14A and main electrode layer 14B) are disposed so as to cover the dielectric layer 12 having the fine rough structure. In particular, the dielectric layer 12 forms a plurality of pores 12H as parts of the rough structure, and the solid electrolyte layer 13 is partially entered in the plurality of pores 12H formed by the dielectric layer 12.

In the electrolytic capacitor shown in FIGS. 1 to 3, charges are accumulated in the capacitor element 10 when current is passed to the capacitor element 10 via the not-shown anode and cathode leads. In this case, by using the cathode 14 (main electrode layer 14B) having the PTC function, destruction of the electrolytic capacitor caused by heat generated at the time of short circuit is prevented. Specifically, for example, when the overvotlage or backward voltage is applied to the electrolytic capacitor, the dielectric layer 12 is partially broken and short circuit occurs. Due to the short circuit, excess current flows among the anode 11, solid electrolyte layer 13, and cathode 14 (sub electrode layer 14A and main electrode layer 14B) and heat is generated. By the heat generation at the time of short circuit, the temperature of the main electrode layer 14B rises and resistance increases exponentially. As a result, the excess current flowing in the capacitor element 10 is suppressed, so that destruction of the capacitor element 10 due to the excess current is suppressed. The factors of rise in the temperature of the main electrode layer 14B include not only the heat generation at the time of short circuit but also Joule's heat caused by excess current. As the temperature of the main electrode layer 14B decreases, the resistance of the main electrode layer 14B also decreases, so that the capacitor element 10 is reset to the state where current can be passed.

The principle that the main electrode layer 14B has the PTC function is as follows. At a stage before temperature rise, the conductive particles construct a chain (what is called a conductive path) in the high polymer of the main electrode layer 14B. Since the chain is stably held by the high polymer, based on the existence of the chain, the main electrode layer 14B is in a low resistance state. However, when the temperature of the main electrode layer 14B rises, due to the expansion phenomenon of the high polymer, the chain is disconnected, and the main electrode layer 14B enters a high resistance state. Obviously, when the temperature of the main electrode layer 14B decreases, the chain is re-constructed due to a contraction phenomenon of the high polymer, so that the main electrode layer 14B enters again a low resistance state. Therefore, since the resistance state of the main electrode layer 14B can be reversibly changed by using the construction, disconnection, and re-construction mechanism of the chain, the main electrode layer 14B has the PTC function.

Figure 4:
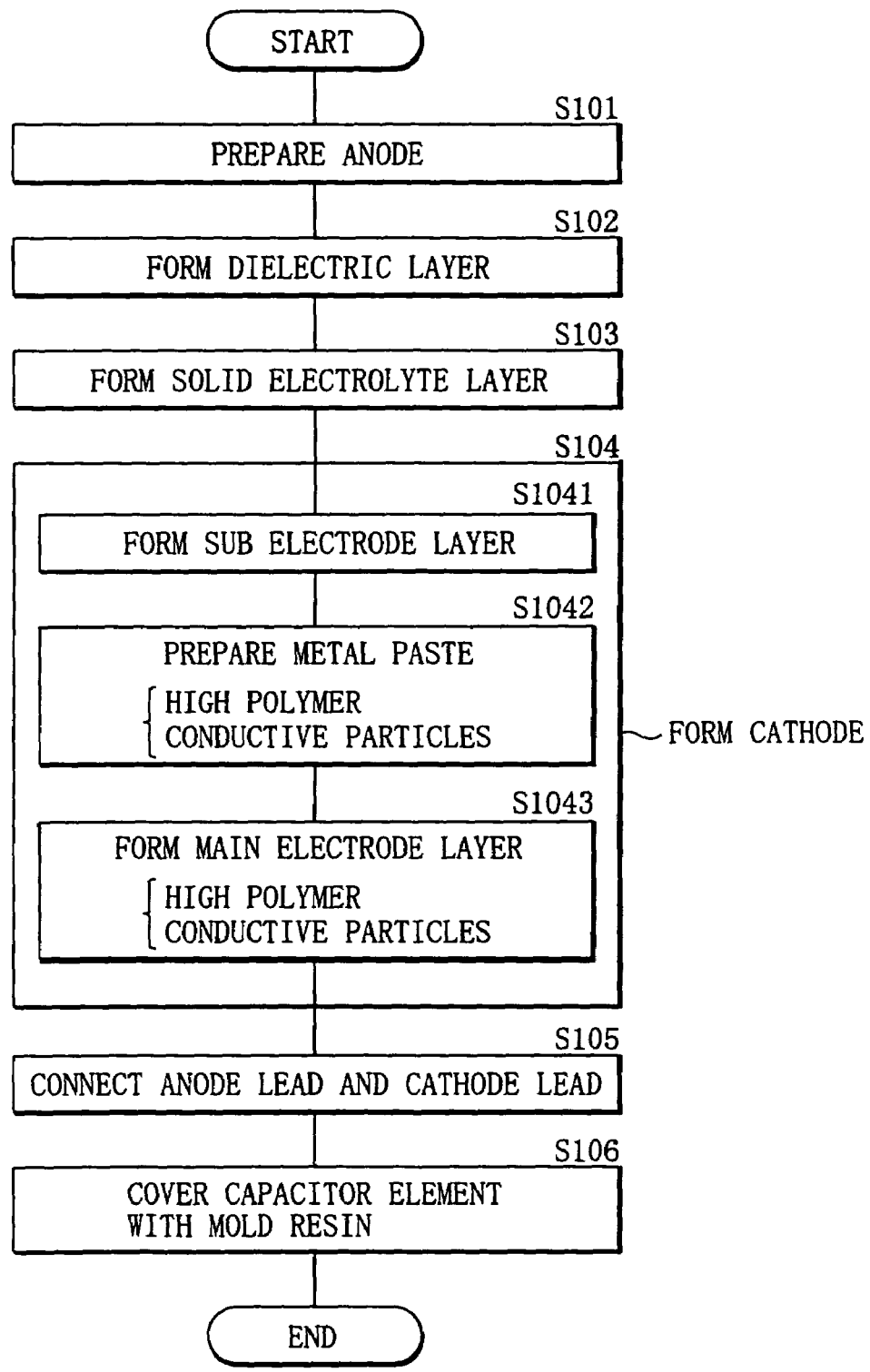
FIG. 4 is a flowchart showing the flow of a manufacturing process related to a method of manufacturing the electrolytic capacitor according to the first embodiment of the invention.

With reference to FIGS. 1 to 4, as a method of manufacturing the electrolytic capacitor according to the embodiment of the invention, a method of manufacturing the electrolytic capacitor having the capacitor element 10 shown in FIGS. 1 to 3 will now be described. FIG. 4 is used for describing the flow of a manufacturing process of the method of manufacturing the electrolytic capacitor. As the materials of the components of the electrolytic capacitor (capacitor element 10) have been already described above in detail, their description will not be repeated below.

At the time of manufacturing the electrolytic capacitor, first, the capacitor element 10 shown in FIGS. 1 to 3 is formed. First, as the anode 11, for example, valve metal foil (such as aluminum foil or titanium foil) subjected to the surface enlarging process, that is, the anode 11 having a fine surface roughness structure is prepared (step S101 in FIG. 4). As the anode 11, for example, in place of the valve metal foil subjected to the surface enlarging process, a valve metal sintered body of tantalum, niobium, or the like can be used. At the time of preparing the anode 11, in place of using the valve metal foil subjected to the surface enlarging process, the anode 11 may be formed by using unprocessed valve metal foil may be used and performing the surface enlarging process on the valve metal foil by using chemical etching or electric chemical etching.

Subsequently, by anodizing the surface layer of the anode 11, the dielectric layer 12 as an oxide film is formed so as to partially cover the periphery of the anode 11 (step S102 in FIG. 4). As the dielectric layer 12, for example, in the case of using aluminum foil as the material of the anode 11, the dielectric layer 12 can be formed by an oxide aluminum film. At the time of forming the dielectric layer 12, for example, the anode 11 is impregnated in a formation solution and voltage is applied to the anode 12, thereby making anodic oxidation reaction progressed. As the formation solution, for example, a buffer aqueous solution containing ammonium borate, ammonium phosphate, organic acid ammonium, or the like is used. Concretely, adipic acid ammonium aqueous solution or the like is used. The voltage applied to the anode 11 can be freely set within the range from a few V to hundreds V in accordance with the thickness of the dielectric layer 12.

Subsequently, by generating conductive high polymer doped with a dopant so as to cover the dielectric layer 12, the solid electrolyte layer 13 is formed so as to include the conductive high polymer (step S103 in FIG. 4). At the time of forming the solid electrolyte layer 13, for example, a solution (monomer solution) obtained by dispersing monomer, dopant, and oxidizer in a solvent is prepared. The monomer solution is applied on the surface of the dielectric layer 12 and is heated to perform oxidation polymerization on the monomer by using the oxidizer in the monomer solution, thereby generating conductive high polymer. Preferably, after the conductive high polymer is generated, for example, by washing the conductive high polymer with water, alcohol, acetone, hexane, or the like, the unpolymerized monomer included in the conductive high polymer, excessive dopant which has not been doped in the conductive high polymer, used oxidizer, and the like are washed and removed. The heating temperature and heating time of the monomer solution can be properly set in consideration of, for example, reactivity (polymerization) of the monomer, reactivity (rate of oxidation) of the oxidizer, and the like.

At the time of preparing the monomer solution, as the monomer, for example, at least one material selected from the group consisting of aniline, pyrrole, tiophene, furan, thiophene vinylene, isothia-naphthene, acetylene, p-phenylene, phenylene vinylene, methoxy vinylne, methoxy phenylene, phenylene sulfide, phenylene oxide, anthracene, naphthalene, pyrene, azulene, selenophene, tellurophene, and their derivatives is used. Concretely, 3,4-ethylenedioxythiophene or the like is used.

As a dopant, for example, both of donor dopant and acceptor dopant can be used and at least one material selected from the group consisting of the following series of materials is used. Examples of the donor dopants are alkali metals such as lithium (Li), sodium (Na), and potassium (K) and alkali-earth metals such as calcium (Ca). Examples of the acceptor dopants are halogens such as chlorine ($Cl_2$), bromine ($Br_2$), and iodine ($I_2$), Lewis acids such as phosphorus fluoride ($PF_3$), arsenic fluoride ($AsF_5$), and boron fluoride ($BF_3$), proton acids such as hydrogen fluoride (HF), hydrogen chloride (HCl), nitric acid ($HNO_3$), sulfuric acid ($H_2SO_4$), phosphoric acid ($H_3PO_4$), and perchloric acid ($HClO_4$), alkylbenzene sulfonic acids (for example, para-toluenesulfonic acid) and alkylnaphthalenesulfonic acids and their salts (for example, para-toluenesulfonic acid sodium and alkylnaphthalenesulfonic acid sodium), transition-metal compounds such as ferric chloride ($FeCl_3$), iron perchloric acid ($FeOCl_2$), titanium chloride ($TiCl_4$), and tungsten chloride ($WCl_3$), and electrolyte anions such as chlorine ion ($Cl^-$), bromine ions ($Br^-$), iodine ion ($I^-$), perchloric acid ion ($ClO_4^-$), phosphorus fluoride ion ($PF_3^-$), boron fluoride ion ($BF_3^-$), and arsenic fluoride ion ($AsF_3^-$).

As the oxidizer, for example, halogen such as iodine or bromine, a metal halogen compound such as silicon pentafluoride ($SiF_5$), proton acid such as sulfuric acid, oxygen compound such as sulfur trioxide ($SO_3$), sulfate such as cerium sulfate (Ce(SO$_4$)$_2$), persulate such as sodium persulfate (Na$_2$S$_2$O$_8$), peroxide such as hydrogen peroxide (H$_2$O$_2$), alkylbenzene sulfonate (for example, para-toluenesulfonic acid iron), or the like is used.

As the solvent, for example, water, organic solvent such as butanol is used.

The conductive high polymer generated by the above-described oxidation polymerization reaction is, for example, at least one material selected from the group consisting of polyaniline, polypyrrole, polythiophene, polyfuran, polythiophenevinylene, poly-isothia-naphthene, polyacetylene, poly-p-phenylene, polyphenylene vinylene, poly methoxy vinylne, poly methoxy phenylene, polyphenylene sulfide, poly phenylene oxide, polyanthracene, polynaphthalene, polypyrene, polyazulene, polyselenophene, polytellurophene, and their derivatives and, concretely, polyethylenedioxythiophene. An example of a desirable conductive high polymer is a conjugated-system high polymer having a one-dimensional chain in a high polymer skeleton and having the electron donor function or electron acceptor function (so-called dopamine function).

Description of the process of manufacturing the electrolytic capacitor will be continued. After formation of the stacked structure in which the anode 11, dielectric layer 12, and solid electrolyte layer 13 are stacked in this order, the cathode 14 having the PTC function is formed so as to cover the solid electrolyte layer 13 (step S104 in FIG. 4).

An example of the procedure of forming the cathode 14 is as follows. First, a carbon paste is applied on the surface of the solid electrolyte layer 13 and dried so as to form a film, thereby forming the sub electrode layer 14A (step S1041). Subsequently, as a metal paste for assuring the PTC function, a metal paste containing high polymer and conductive particles is prepared (step S1042). At the time of preparing the metal paste, for example, at least one of the group consisting epoxy resin, polyvinylidene fluoride (PVDF), and polyethylene (PE) is used as the high polymer, and metal particles of nickel (Ni), copper (Cu), aluminum (Al), tungsten (W), molybdenum (Mo), zinc (Zn), cobalt (Co), platinum (Pt), gold (Au), silver (Ag), and the like, or conductive ceramic particles of tungsten carbide (WC), titanium nitride (TiN), zirconium nitride (ZrN), titanium carbide (TiC), titanium boride (TiB$_2$), molybdenum silicide (MoSi$_2$), and tantalum boride (TaB$_2$) are used as the conductive particles. In the case of using metal particles as the conductive particles, it is preferable to use filament metal particles. Specifically, at the time of preparing the metal paste, for example, first, when the high polymer is liquid at room temperature, the liquid high polymer may be used as it is. Second, when the high polymer is not liquid at room temperature, the high polymer may be dissolved in a solvent so as to become liquid and the resultant liquid high polymer may be used. Third, when the high polymer is very hard at room temperature and there is no proper solvent in which the high polymer can be dissolved at room temperature, the high polymer may be heated to decrease its viscosity so as to enter an almost liquid state, and the resultant high polymer may be used. Finally, the metal paste is supplied onto the surface of the sub electrode layer 14A and dried so as to form a film, thereby forming the main electrode layer 14B having the PTC function so as to have the configuration in which the conductive particles are held in the high polymer (step S1043). As the method of supplying the metal paste, for example, coating methods (such as spray method, roller method, and spin coating), impregnating methods (so-called dipping method), printing methods (such as screen printing and pad application), and the like can be used. In such a manner, the cathode 14 is formed so as to have the two-layer structure including the sub electrode layer 14A and the main electrode layer 14B. As a result, the capacitor element 10 having the stacked structure in which the anode 11, dielectric layer 12, solid electrolyte layer 13, and cathode 14 (sub electrode layer 14A and main electrode layer 14B) are stacked in this order is completed.

After the capacitor element 10 is formed, an electrolytic capacitor is assembled by using the capacitor element 10. For example, an anode lead is connected to the anode 11 in the capacitor element 10, a cathode lead is connected to the cathode 14 (step S105 in FIG. 4), and the periphery of the capacitor element 10 is covered with a mold resin so as to partially expose both of the anode and cathode leads (step S106 in FIG. 4). By the operation, an electrolytic capacitor having the structure in which the anode and cathode leads are connected to the capacitor element 10 and the periphery of the capacitor element 10 is covered with the mold resin so that both of the anode and cathode leads are partially exposed is completed. At the time of connecting the anode and cathode leads to the capacitor element 10, for example, they may be connected directly by using welding or caulking or indirectly by using a conductive adhesive.

In the method of manufacturing the electrolytic capacitor according to the embodiment, the cathode 14, concretely, the main electrode layer 14B is formed so as to have the PTC function. On the basis of the principle of the PTC function, the PTC function is given to the main electrode layer 14B in the cathode 14. In this case, different from the conventional electrolytic capacitor method in which a PTC thermistor is connected to a capacitor element to give the PTC function to an electrolytic capacitor so that the process of manufacturing the electrolytic capacitor is more complicated and the number of manufacturing processes increases by the amount corresponding to the PTC thermistor connecting process, the process of connecting the PTC thermistor to the capacitor element 10 is unnecessary. Consequently, complication of the electrolytic capacitor manufacturing process and increase in the number of manufacturing processes caused by the PTC thermistor connecting process is prevented. Moreover, to form the main electrode layer 14B having the PTC function, it is sufficient to use, as the material of the main electrode layer 14B, the materials (high polymer and conductive particles) capable of assuring the PTC function in place of a material which cannot assure the PTC function. That is, since the electrolytic capacitor can be manufactured by using the existing method of manufacturing an electrolytic capacitor which does not have the PTC function only with the change point of forming the main electrode layer 14B by using the material for assuring the PTC function, the electrolytic capacitor manufacturing process is not complicated. Therefore, since the electrolytic capacitor can be manufactured easily while preventing destruction of the electrolytic capacitor caused by heat generated at the time of short circuit by using the PTC function, the electrolytic capacitor having the PTC function can be manufactured as easy as possible. As a result, high productivity can be assured by increasing the manufacture yield of the electrolytic capacitor having the PTC function.

In the electrolytic capacitor according to the embodiment, the cathode 14, concretely, the main electrode layer 14B as part of the cathode 14 has the PTC function. Consequently, different from the conventional electrolytic capacitor in which a PTC thermistor is externally attached as a component other than the capacitor element to the capacitor element, the cathode 14 as the inherent component of the capacitor element 10 has the PTC function. In this case, different from the conventional case, the PTC function is assured without increasing the number of components of the electrolytic capacitor, so that the configuration of the electrolytic capacitor is prevented from becoming complicated to assure the PTC function. Therefore, the PTC function can be assured with the simplest configuration.

Figure 5:
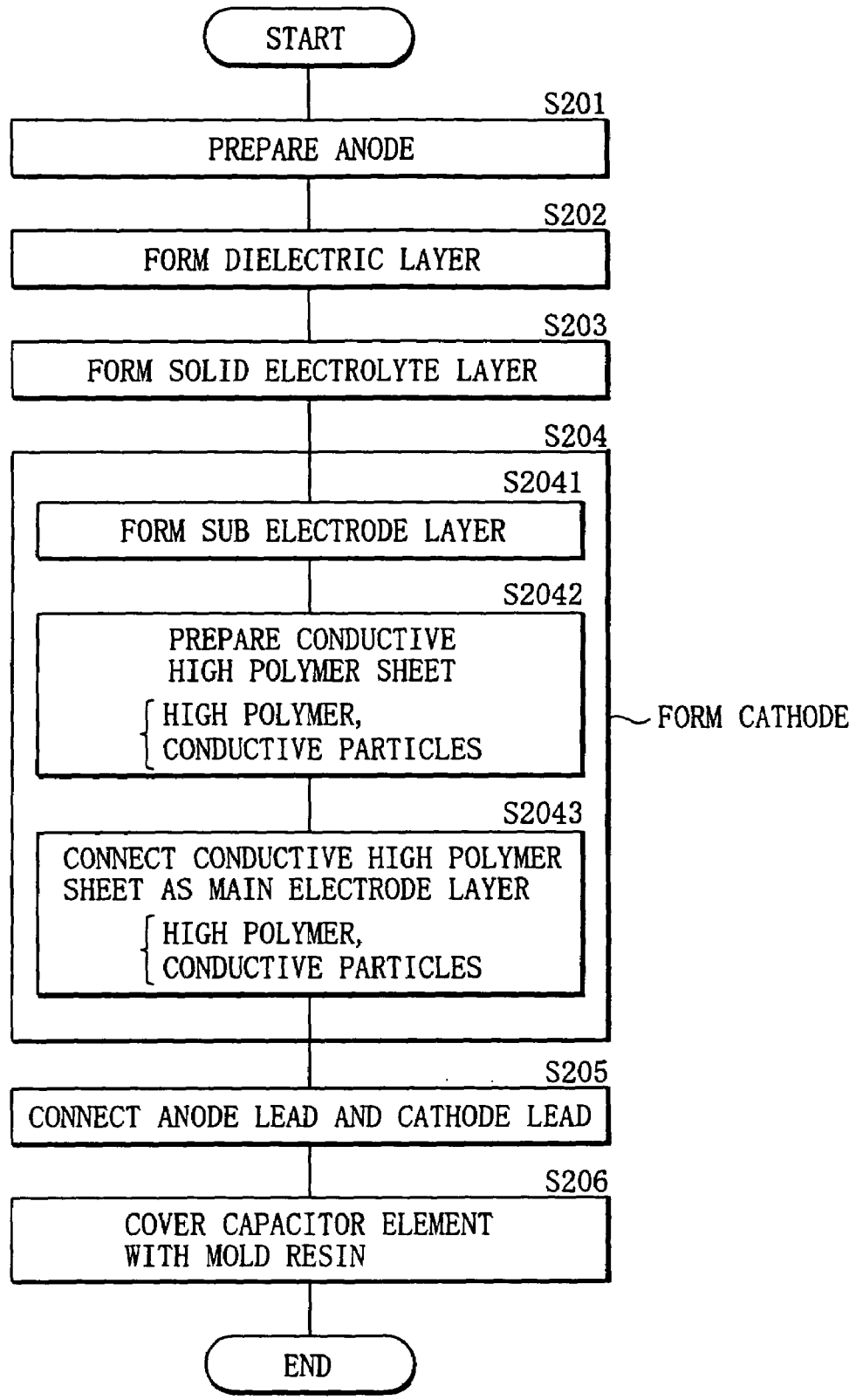
FIG. 5 is a flowchart for explaining a modification of the method of manufacturing the electrolytic capacitor according to the first embodiment of the invention.

In the embodiment, the main electrode layer 14B having the PTC function is formed by supplying the material (high polymer and conductive particles) for assuring the PTC function onto the surface of the sub electrode layer 14A so as to form a film. However, the invention is not always limited to the embodiment. For example, as shown in FIG. 5, in place of the method of forming the main electrode layer 14B on the sub electrode layer 14A, the main electrode layer 14B separately formed may be connected to the sub electrode layer 14A. FIG. 5 is to describe a modification of the electrolytic capacitor manufacturing method and shows the flow of a manufacturing process corresponding to FIG. 4. In the electrolytic capacitor manufacturing method, as shown in FIGS. 1 to 3 and FIG. 5, the anode 11 is prepared (step S201), the dielectric layer 12 and the solid electrolyte layer 13 are formed on the anode 11 (steps S202 and S203) and, on the solid electrolyte layer 13, the cathode 14 is formed so as to include the main electrode layer 14B separately formed (step S204). Concretely, the sub electrode layer 14A is formed on the solid electrolyte layer 13 (step S2041). After that, by applying the material (high polymer and conductive particles) for assuring the PTC function in a sheet shape, a conductive high polymer sheet is formed (step S2042). By connecting the conductive high polymer sheet as the main electrode layer 14B to the surface of the sub electrode layer 14A (step S2043), the cathode 14 is formed so as to have the two-layer structure including the sub electrode layer 14A and the main electrode layer 14B. At the time of connecting the conductive high polymer sheet to the sub electrode layer 14A, for example, to assure attachability of the main electrode layer 14B to the sub electrode layer 14A, it is preferable to use thermo compression bonding process as the connecting process. In such a manner, the capacitor element 10 having the stacked structure in which the anode 11, dielectric layer 12, solid electrolyte layer 13, and cathode 14 (sub electrode layer 14A and main electrode layer 14B) are stacked in this order is formed. After that, by connecting the anode lead and the cathode lead to the anode 11 and the cathode 14 in the capacitor element 10, respectively (step S205) and covering the periphery of the capacitor element 10 so that both of the anode and cathode leads are partially exposed (step S206), the electrolytic capacitor is completed. In this case as well, the PTC function is given to the main electrode layer 14B in the cathode 14, so that effects similar to those of the foregoing embodiment can be obtained. The procedure other than the above-described procedure related to the electrolytic capacitor manufacturing method shown in FIG. 5 is similar to, for example, that of the case shown in FIG. 4.

Although the only the main electrode layer 14B in the cathode 14 has the PTC function in the embodiment, the invention is not limited to the embodiment but, for example, in place of the main electrode layer 14B, only the sub electrode layer 14A may have the PTC function or both of the sub electrode layer 14A and the main electrode layer 14B may have the PTC function. In the case where only the sub electrode layer 14A has the PTC function in place of the main electrode layer 14B, for example, a carbon paste containing high polymer and conductive particles is used as the material of the sub electrode layer 14A (material for assuring the PTC function) and the sub electrode layer 14A is formed by a process similar to that in the case of forming the main electrode layer 14B in the foregoing embodiment, thereby enabling the PTC function to be given to the sub electrode layer 14A. In this case, for example, high polymer similar to that in the foregoing embodiment is used as the high polymer, carbon particles such as carbon black (CB) particles are used as the conductive particles, and a general metal paste (such as silver paste) is used as the material of the main electrode layer 14 (the material which does not assure the PTC function). In the case of giving the PTC function to both of the sub electrode layer 14A and the main electrode layer 14B, for example, it is sufficient to combine the sub electrode layer 14A having the PTC function and the main electrode layer 14B having the PTC function. Also in those cases, the PTC function is given to the cathode 14, so that effects similar to those of the foregoing embodiment can be obtained.

Although the cathode 14 has the two-layer structure (the sub electrode layer 14A and the main electrode layer 14B) in the embodiment, the invention is not always limited to the embodiment. The number of stacked layers of the cathode 14 can be freely changed to the number of 2 or larger. In this case as well, as long as the cathode 14 has a resistance characteristic enough to function as an electrode and can assure the PTC function, effects similar to those of the foregoing embodiment can be obtained. Obviously, in this case as well, for example, only a layer as part of the stacked structure of the cathode 14 may have the PTC function or all of the layers in the stacked structure may have the PTC function.

Figure 6:
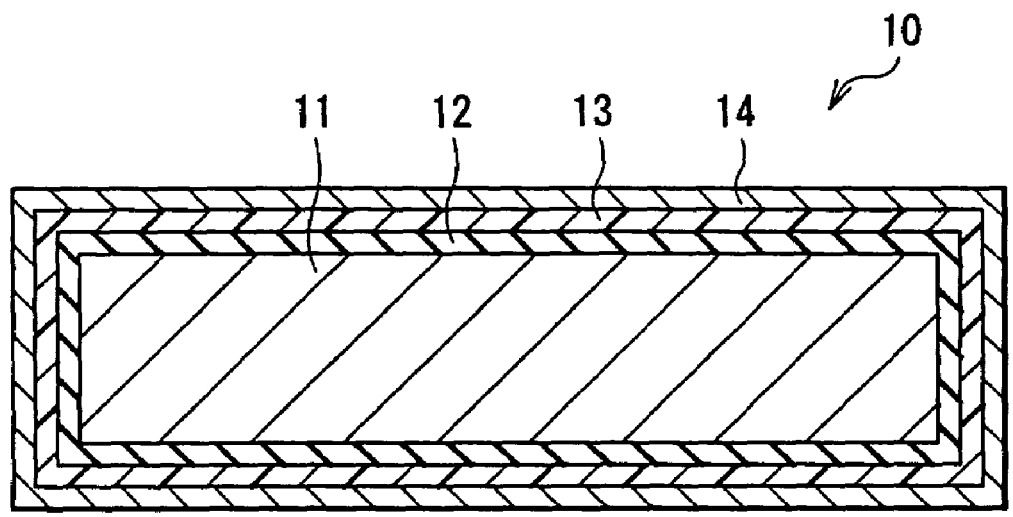
FIG. 6 is a cross section showing a modification of the configuration of the electrolytic capacitor according to the first embodiment of the invention.

Although the cathode 14 having the PTC function has the stacked structure (sub electrode layer 14A and main electrode layer 14B) in the embodiment, the invention is not always limited to the embodiment. For example, as shown in FIG. 6, the cathode 14 may have a single-layer structure. In this case, the cathode 14 may have a configuration corresponding to that of the main electrode layer 14B having the PTC function described in the foregoing embodiment or that of the sub electrode layer 14A having the PTC function in the modification. However, when the resistance characteristic of the conductive particles (such as carbon particles) contained in the sub electrode layer 14A having the PTC function and that of the conductive particles (such as metal particles or conductive ceramic particles) contained in the main electrode layer 14B having the PTC function are compared with each other, the resistance value based on conductive particles in the metal particles or conductive ceramic particles is lower than that in the carbon particles. Consequently, considering that the cathode 14 has not only the PTC function but also the electrode function, it is preferable that the cathode 14 has the configuration corresponding to that of the main electrode layer 14B having the PTC function. In this case as well, effects similar to those of the foregoing embodiment can be obtained. The configuration characteristics other than the above of the capacitor element 10 shown in FIG. 6 are similar to, for example, those of FIG. 2.

Second Embodiment

A second embodiment of the invention will now be described.

Figure 7:
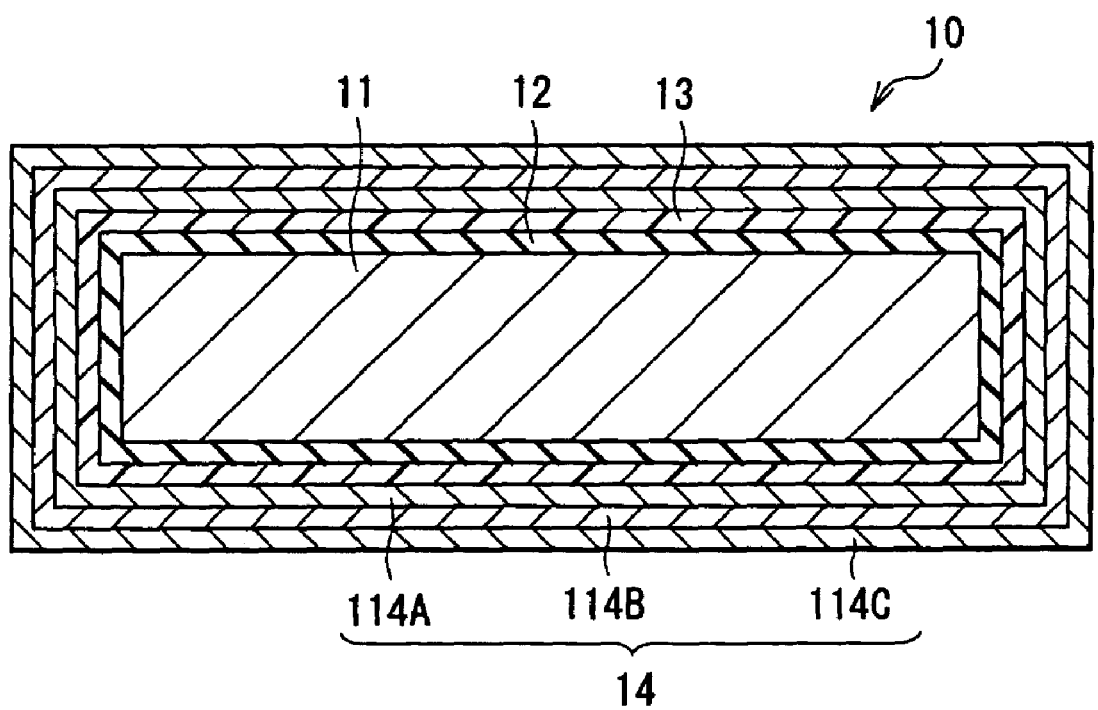
FIG. 7 is a cross section showing a sectional configuration of an electrolytic capacitor according to a second embodiment of the invention.

FIG. 7 shows a sectional configuration of the capacitor element 10 described in the first embodiment as the configuration of an electrolytic capacitor according to the second embodiment. The sectional configuration corresponds to FIG. 2. The electrolytic capacitor according to the second embodiment has a configuration (refer to FIG. 1) similar to that of the electrolytic capacitor of the first embodiment except for the point that a cathode 114 having a three-layer structure (a sub electrode layer 114A, a main electrode layer 114B, and an auxiliary electrode layer 114C) is provided in place of the cathode 14 having the two-layer structure (the sub electrode layer 14A and the main electrode layer 14B).

The cathode 114 in the electrolytic capacitor of the second embodiment has the PTC function and contains at least one of the metal particles and conductive ceramic particles as the conductive particles. In particular, the cathode 114 has, for example, a stacked structure in which two or more layers are stacked, and at least one of the two or more layers contains the conductive particles and has the PTC function. Concretely, for example, as shown in FIG. 7, the cathode 114 has the main electrode layer 114B for assuring conductivity, the sub electrode layer 114A disposed between the main electrode layer 114B and the solid electrolyte layer 13, for electrically joining the main electrode layer 114B to the solid electrolyte layer 13, and the auxiliary electrode layer 114C which is disposed on the side opposite to the sub electrode layer 114A while sandwiching the main electrode layer 114B, contains conductive particles, and has the PTC function. Specifically, the cathode 114 has, for example, a three-layer structure in which the sub electrode layer 114A, main electrode layer 114B, and auxiliary electrode layer 114C are stacked in this order. In the cathode 114, for example, as described above, the sub electrode layer 114A and the main electrode layer 114B do not have the PTC function but only the auxiliary electrode layer 114C has the PTC function.

The sub electrode layer 114A is constructed by containing, for example, carbon. The sub electrode layer 114A has, for example, not only the function of electrically joining the main electrode layer 114B to the solid electrolyte layer 13 but also the function of, for example, in the case where the main electrode layer 114B is in direct contact with the solid electrolyte layer 13, preventing migration of a specific component (for example, silver (Ag)) in the main electrode layer 114B in the environments of high temperature and high moisture.

The main electrode layer 114B contains, for example, a metal which is concretely silver (Ag).

The auxiliary electrode layer 114C is formed by applying a material for assuring the PTC function on the surface of an under layer (in this case, the main electrode layer 114B), concretely, a liquid high polymer containing conductive particles as the material (metal paste) for assuring the PTC function. The auxiliary electrode layer 114C contains, for example, a film-shaped high polymer as a main component formed by using the liquid high polymer, and conductive particles as a sub component held in the film-shaped high polymer. That is, the auxiliary electrode layer 114C is a so-called polymer PTC (P-PTC) layer. The liquid high polymer contains at least one of a thermosetting high polymer and a soluble thermoplastic high polymer (a thermoplastic high polymer which does not directly become a liquid state at room temperature but indirectly becomes a liquid state due to the existence of a solvent which can be dissolved at room temperature) except for an insoluble thermoplastic high polymer (a thermoplastic high polymer which does not directly become a liquid state at room temperature and, moreover, does not also indirectly become a liquid state since no solvent which can be dissolved at room temperature exists). An example of the thermosetting high polymer is an epoxy resin and an example of the soluble thermoplastic high polymer is polyvinylidene fluoride (PVDF). The conductive particles are, for example, metal particles of nickel (Ni), copper (Cu), aluminum (Al), tungsten (W), molybdenum (Mo), zinc (Zn), cobalt (Co), platinum (Pt), gold (Au), silver (Ag), and the like, or conductive ceramic particles of tungsten carbide (WC), titanium nitride (TiN), zirconium nitride (ZrN), titanium carbide (TiC), titanium boride ($TiB_2$), molybdenum silicide ($MoSi_2$), and tantalum boride ($TaB_2$).

Figure 8:
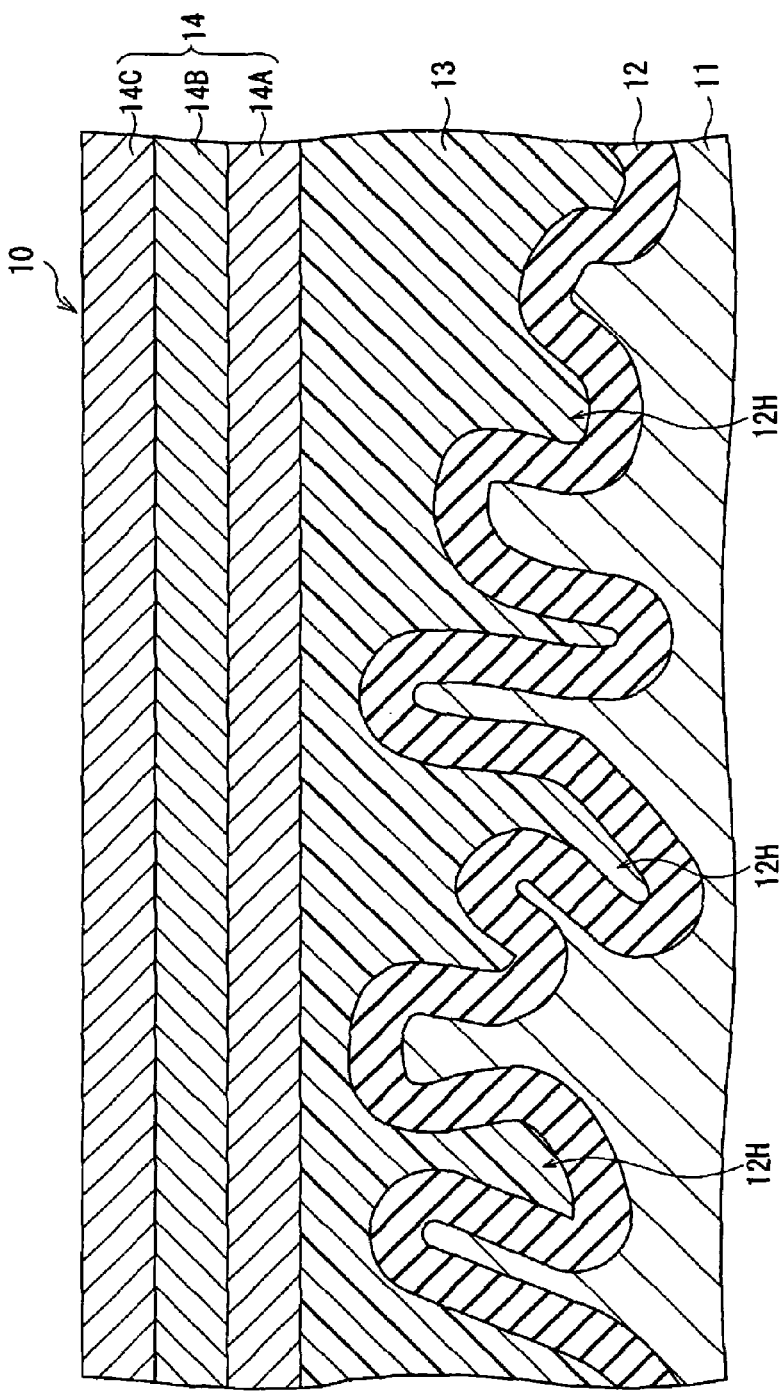
FIG. 8 is a partially enlarged cross section showing a sectional configuration of the electrolytic capacitor illustrated in FIG. 7.

An example of the sectional configuration of the capacitor element 10 having the cathode 114 (sub electrode layer 114A, main electrode layer 114B, and auxiliary electrode layer 114C) is as shown in FIG. 8.

Figure 9:
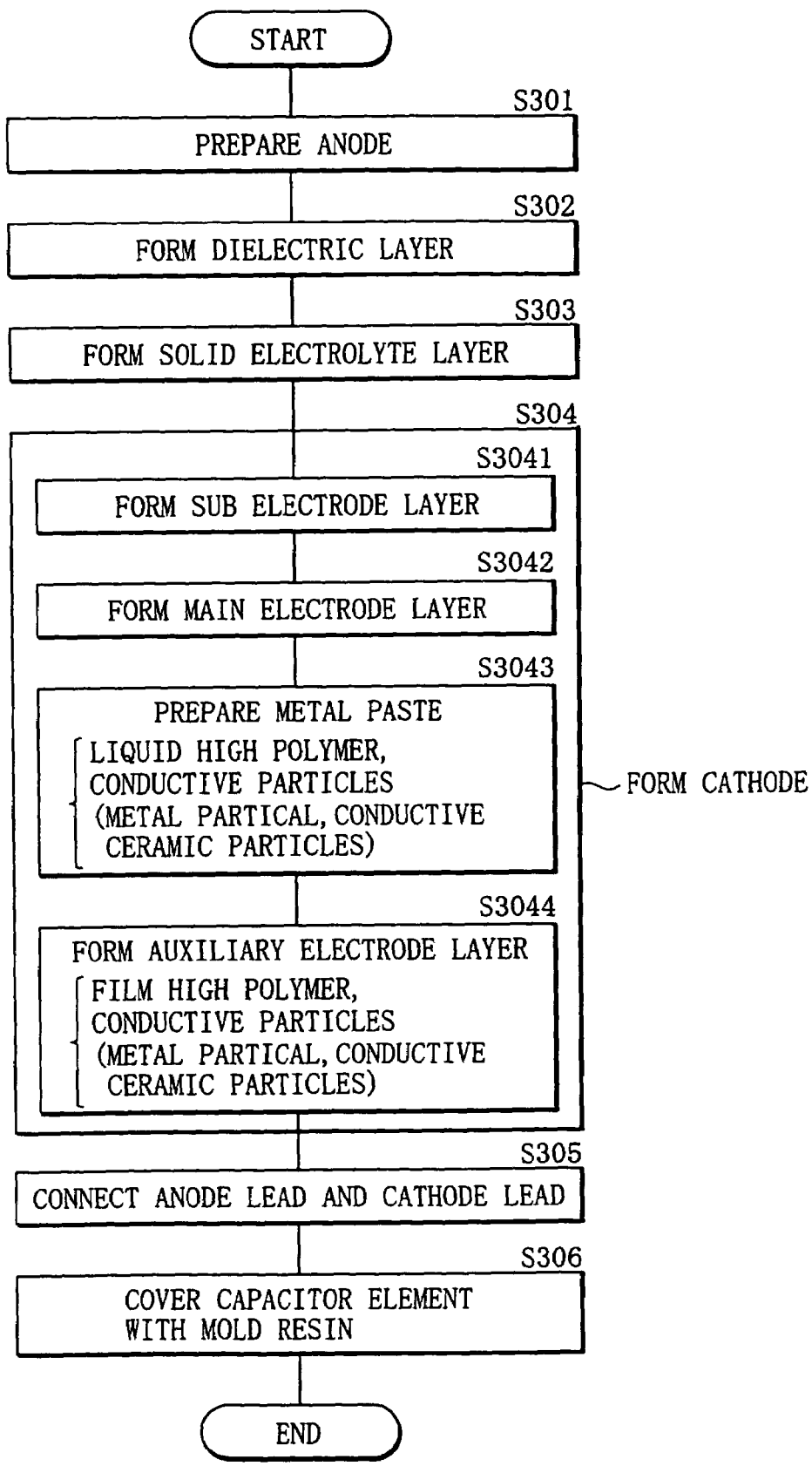
FIG. 9 is a flowchart showing the flow of a manufacturing process of a method of manufacturing the electrolytic capacitor according to the second embodiment of the invention.

With reference to FIG. 1 and FIGS. 7 to 9, as a method of manufacturing the electrolytic capacitor according to the second embodiment, a method of manufacturing the electrolytic capacitor having the capacitor element 10 shown in FIGS. 1, 7, and 8 will now be described. FIG. 9 is used for describing the flow of a manufacturing process of the method of manufacturing the electrolytic capacitor. As the materials of the components of the electrolytic capacitor (capacitor element 10) have been already described above in detail, their description will not be repeated below.

The electrolytic capacitor manufacturing method of the second embodiment is similar to that of the first embodiment (refer to FIG. 4) except for the point that the electrolytic capacitor is manufactured so as to include the cathode 114 having the three-layer structure (sub electrode layer 114A, main electrode layer 114B, and auxiliary electrode layer 114C). At the time of manufacturing the electrolytic capacitor, first, the capacitor element 10 shown in FIGS. 1, 7, and 8 is formed. First, as the anode 11, for example, valve metal foil subjected to the surface enlarging process is prepared (step S301 in FIG. 9), after that, the dielectric layer 12 is formed so as to partially cover the periphery of the anode 11 (step S302 in FIG. 9), and the solid electrolyte layer 13 is formed so as to cover the dielectric layer 12 (step S303 in FIG. 9).

Subsequently, the cathode 114 having the PTC function is formed so as to cover the solid electrolyte layer 13 (step S304 in FIG. 9).

An example of the procedure of forming the cathode 114 is as follows. First, a carbon paste is applied on the surface of the solid electrolyte layer 13 and dried so as to form a film, thereby forming the sub electrode layer 114A (step S3041). Subsequently, a metal paste is formed on the surface of the sub electrode layer 114A and dried to form a film, thereby forming the main electrode layer 114B (step S3042). At the time of forming the main electrode layer 114B, for example, a silver (Ag) paste is used as the metal paste. Subsequently, as the material for assuring the PTC function, the metal paste containing the liquid high polymer and conductive particles is prepared (step S3043). At the time of preparing the metal paste, for example, at least one of the thermosetting high polymer such as epoxy resin and the soluble thermoplastic high polymer such as polyvinylidene fluoride (PVDF) is used as the liquid high polymer, and at least one of the metal particles or conductive ceramic particles are used as the conductive particles. Concretely, metal particles of nickel (Ni), copper (Cu), aluminum (Al), tungsten (W), molybdenum (Mo), zinc (Zn), cobalt (Co), platinum (Pt), gold (Au), silver (Ag), and the like, or conductive ceramic particles of tungsten carbide (WC), titanium nitride (TiN), zirconium nitride (ZrN), titanium carbide (TiC), titanium boride ($TiB_2$), molybdenum silicide ($MoSi_2$), and tantalum boride ($TaB_2$) are used as the conductive particles. In the case of using metal particles as the conductive particles, it is preferable to use filament metal particles. Finally, a metal paste is supplied onto the surface of the main electrode layer 114B and dried to form a film, thereby forming the auxiliary electrode layer 114C having the PTC function so as to contain the film-shaped high polymer formed from the liquid high polymer and the conductive particles held in the film-shaped high polymer (step S3044). As the method of supplying the metal paste, for example, coating methods (such as spray method, roller method, and spin coating), impregnating methods (so-called dipping method), printing methods (such as screen printing and pad application), and the like can be used. In such a manner, the cathode 114 is formed so as to have the three-layer structure including the sub electrode layer 114A, the main electrode layer 114B, and auxiliary electrode layer 114C. As a result, the capacitor element 10 having the stacked structure in which the anode 11, dielectric layer 12, solid electrolyte layer 13, and cathode 114 (sub electrode layer 114A, main electrode layer 114B, and auxiliary electrode layer 114C) are stacked in this order is completed.

Finally, for example, an anode lead is connected to the anode 11 in the capacitor element 10, a cathode lead is connected to the cathode 114 (step S305 in FIG. 9), and the periphery of the capacitor element 10 is covered with a mold resin so as to partially expose both of the anode and cathode leads (step S306 in FIG. 9). By the operation, an electrolytic capacitor having the structure in which the anode and cathode leads are connected to the capacitor element 10 and the periphery of the capacitor element 10 is covered with the mold resin so that both of the anode and cathode leads are partially exposed is completed.

In the method of manufacturing the electrolytic capacitor according to the embodiment, the cathode 114, concretely, the auxiliary electrode layer 114C is formed so as to have the PTC function. On the basis of the principle of the PTC function, the PTC function is given to the auxiliary electrode layer 114C in the cathode 114. In this case, by forming the auxiliary electrode layer 114C so as to contain at least one of the metal particles or conductive ceramic particles as conductive particles, based on the low resistance characteristic of the metal particles or conductive ceramic particles, the low resistance characteristic of the electrolytic capacitor is achieved. Consequently, while preventing destruction of the electrolytic capacitor caused by heat generated at the time of short circuit by using the PTC function, the low resistance characteristic of the electrolytic capacitor can be achieved. Therefore, the resistance characteristic of the electrolytic capacitor having the PTC function can be decreased as much as possible.

Particularly, in the embodiment, the auxiliary electrode layer 114C (film-shaped high polymer and conductive particles) having the PTC function is formed by supplying the metal past (liquid high polymer and conductive particles) onto the surface of the main electrode layer 114B. As compared with, for example, the case of preliminarily forming an auxiliary electrode layer in a sheet shape (conductive high polymer sheet) and joining the sheet-shaped auxiliary electrode layer to the surface of the main electrode layer 114B (by bonding or thermo compression bonding), the resistance characteristic of the electrolytic capacitor decreases only by the amount corresponding to the contact resistance in the bonded part. Therefore, also from this viewpoint, the invention can contribute to decrease in the resistance of the electrolytic capacitor.

In addition, in the electrolytic capacitor according to the embodiment, the resistance characteristic decreases while assuring the PTC function. Thus, the PTC function can be assured with resistance as low as possible.

Figure 10:
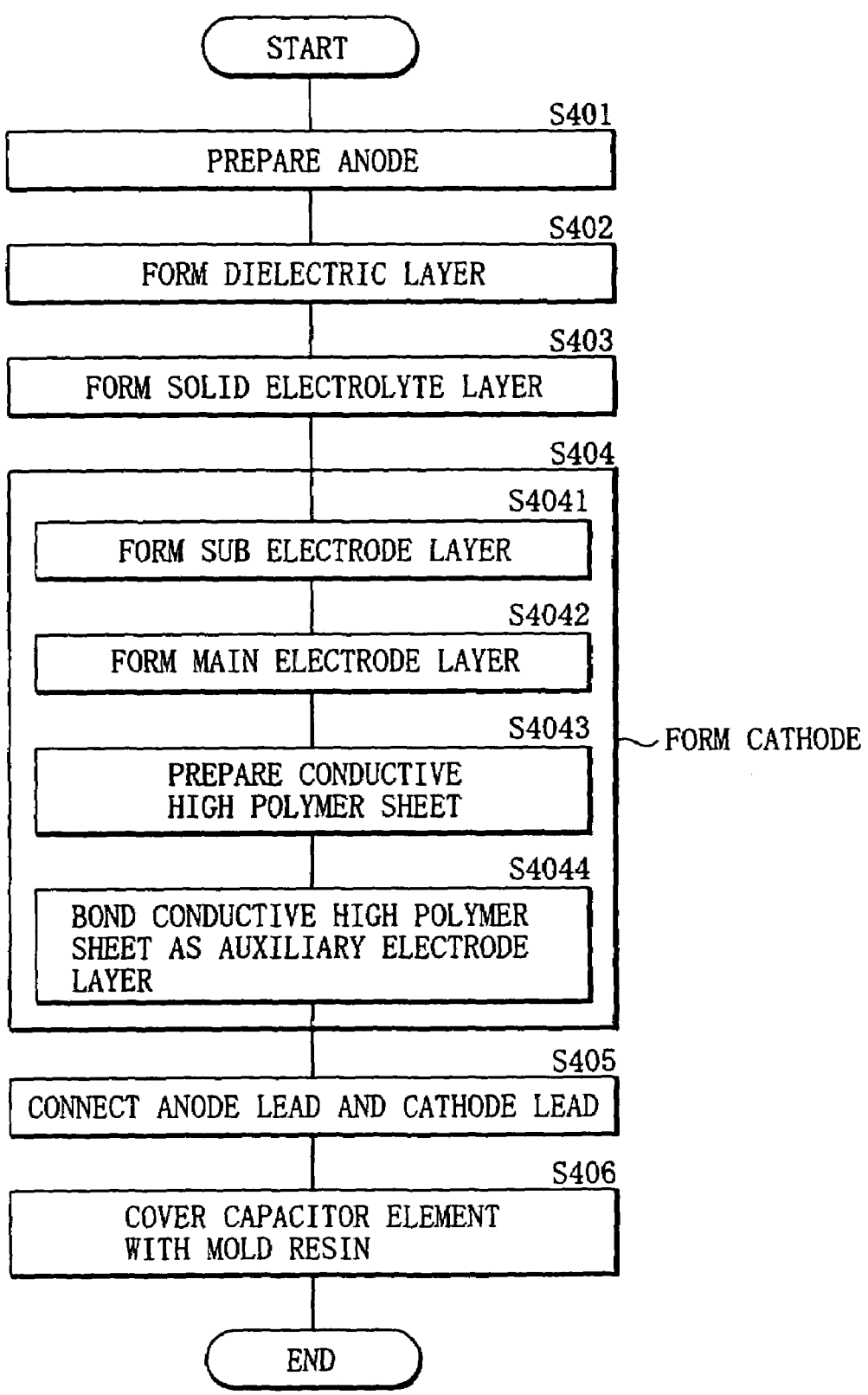
FIG. 10 is a flowchart for explaining a modification of the method of manufacturing the electrolytic capacitor according to the second embodiment of the invention.

In the embodiment, the auxiliary electrode layer 114C is formed by supplying the material (liquid high polymer and conductive particles) for assuring the PTC function onto the surface of the main electrode layer 114B so as to form a film. However, the invention is not always limited to the embodiment. For example, as shown in FIG. 10, in place of the method of forming the auxiliary electrode layer 114C on the surface of the main electrode layer 114B, the auxiliary electrode layer 114C separately formed may be connected to the surface of the main electrode layer 114B. FIG. 10 is to describe a modification of the electrolytic capacitor manufacturing method and shows the flow of a manufacturing process corresponding to FIG. 9. In the electrolytic capacitor manufacturing method, as shown in FIGS. 1, 7, 8, and 10, the anode 11 is prepared (step S401), the dielectric layer 12 and the solid electrolyte layer 13 are formed on the anode 11 (steps S402 and S403) and, on the solid electrolyte layer 13, the cathode 114 is formed so as to include the sub electrode layer 114A, the main electrode layer 114B, and the auxiliary electrode layer 114C separately formed (step S404). Concretely, the sub electrode layer 114A is formed on the solid electrolyte layer 13 (step S4041), the main electrode layer 114B is formed on the sub electrode layer 114A (step S4042) and, after that, by forming a sheet by using the material (liquid high polymer and conductive particles) for assuring the PTC function, a conductive high polymer sheet is formed (step S4043). By connecting the conductive high polymer sheet as the auxiliary electrode layer 114C to the surface of the main electrode layer 114B (step S4044), the cathode 114 is formed so as to have the three-layer structure including the sub electrode layer 114A, the main electrode layer 114B, and the auxiliary electrode layer 114C. As the process of bonding the conductive high polymer sheet to the main electrode layer 114B, for example, a bonding process or a thermo compression bonding can be used. In such a manner, the capacitor element 10 having the stacked structure in which the anode 11, dielectric layer 12, solid electrolyte layer 13, and cathode 14 (sub electrode layer 114A, main electrode layer 114B, and auxiliary electrode layer 114C) are stacked in this order is formed. After that, by connecting the anode lead and the cathode lead to the anode 11 and the cathode 114 in the capacitor element 10, respectively (step S405) and covering the periphery of the capacitor element 10 so that both of the anode and cathode leads are partially exposed (step S406), the electrolytic capacitor is completed. In this case as well, the PTC function is given to the auxiliary electrode layer 114C in the cathode 114, so that effects similar to those of the foregoing embodiment can be obtained. However, it should be noted that, as described above, when the auxiliary electrode layer 114C is bonded to the main electrode layer 114B, as compared with the case of forming the film of the auxiliary electrode layer 114C on the surface of the main electrode layer 114B, the resistance characteristic of the electrolytic capacitor rises only by the amount corresponding to the contact resistance between the main electrode layer 114B and the auxiliary electrode layer 114C. The procedure other than the above-described procedure related to the electrolytic capacitor manufacturing method shown in FIG. 10 is similar to, for example, that of the case shown in FIG. 9.

Although the only the auxiliary electrode layer 114C in the cathode 114 (the sub electrode layer 114A, main electrode layer 114B, and auxiliary electrode layer 114C) has the PTC function in the embodiment, the invention is not limited to the embodiment but, for example, in place of the auxiliary electrode layer 114C, only the sub electrode layer 114A or main electrode layer 114B may have the PTC function or a combination of arbitrary two layers out of the sub electrode layer 114A, the main electrode layer 114B, and the auxiliary electrode layer 114C may have the PTC function. Alternately, all of the sub electrode layer 114A, the main electrode layer 114B, and the auxiliary electrode layer 114C may have the PTC function. In the case of giving the PTC function only to the sub electrode layer 114A, for example, a carbon paste containing conductive particles is used as the material of the sub electrode layer 114A (material for assuring the PTC function) and the sub electrode layer 114A is formed by a process similar to that in the case of forming the auxiliary electrode layer 114C in the foregoing embodiment, thereby enabling the PTC function to be given to the sub electrode layer 114A. In this case, for example, at least one of the metal particles and conductive particles described in the foregoing embodiment is used as the conductive particles, and a general metal paste (such as silver paste) is used as the material of the main electrode layer 114B and the auxiliary electrode layer 114C (the material which does not assure the PTC function). In the case of giving the PTC function only to the main electrode layer 114B, for example, the PTC function can be given to the main electrode layer 114B by forming the main electrode layer 114B by a process similar to that in the case of forming the auxiliary electrode layer 114C in the foregoing embodiment. In this case, as the material of the auxiliary electrode layer 114C (the material which does not assure the PTC function), for example, a general metal paste (such as silver paste) is used. In the case of giving the PTC function to all of the sub electrode layer 114A, the main electrode layer 114B, and the auxiliary electrode layer 114C, for example, it is sufficient to combine the sub electrode layer 114A having the PTC function, the main electrode layer 114B having the PTC function, and the auxiliary electrode layer 114C having the PTC function. Also in those cases, the PTC function is given to the cathode 114, so that effects similar to those of the foregoing embodiment can be obtained.

Although the cathode 114 has the three-layer structure (the sub electrode layer 114A, the main electrode layer 114B, and the auxiliary electrode layer 114C) in the embodiment, the invention is not always limited to the embodiment. The number of stacked layers of the cathode 114 can be freely changed to the number of 2 or larger. In this case as well, as long as the cathode 114 has a resistance characteristic enough to function as an electrode and can assure the PTC function, effects similar to those of the foregoing embodiment can be obtained. Obviously, in this case as well, for example, only a layer as part of the stacked structure of the cathode 114 may have the PTC function or all of the layers in the stacked structure may have the PTC function.

Although the cathode 114 having the PTC function has the stacked structure (sub electrode layer 114A, main electrode layer 114B, auxiliary electrode layer 114C) in the embodiment, the invention is not always limited to the embodiment. For example, the cathode 114 may have a single-layer structure. In this case, the cathode 114 may have a configuration corresponding to that of the auxiliary electrode layer 114C having the PTC function described in the foregoing embodiment. In this case as well, effects similar to those of the foregoing embodiment can be obtained.

The other configuration, operation, action, effect, and modification of the electrolytic capacitor according to the second embodiment and the other procedure, action, effect, and modification of the electrolytic capacitor manufacturing method of the second embodiment are similar to those of the first embodiment.

Third Embodiment

A third embodiment of the invention will now be described.

Figure 11:
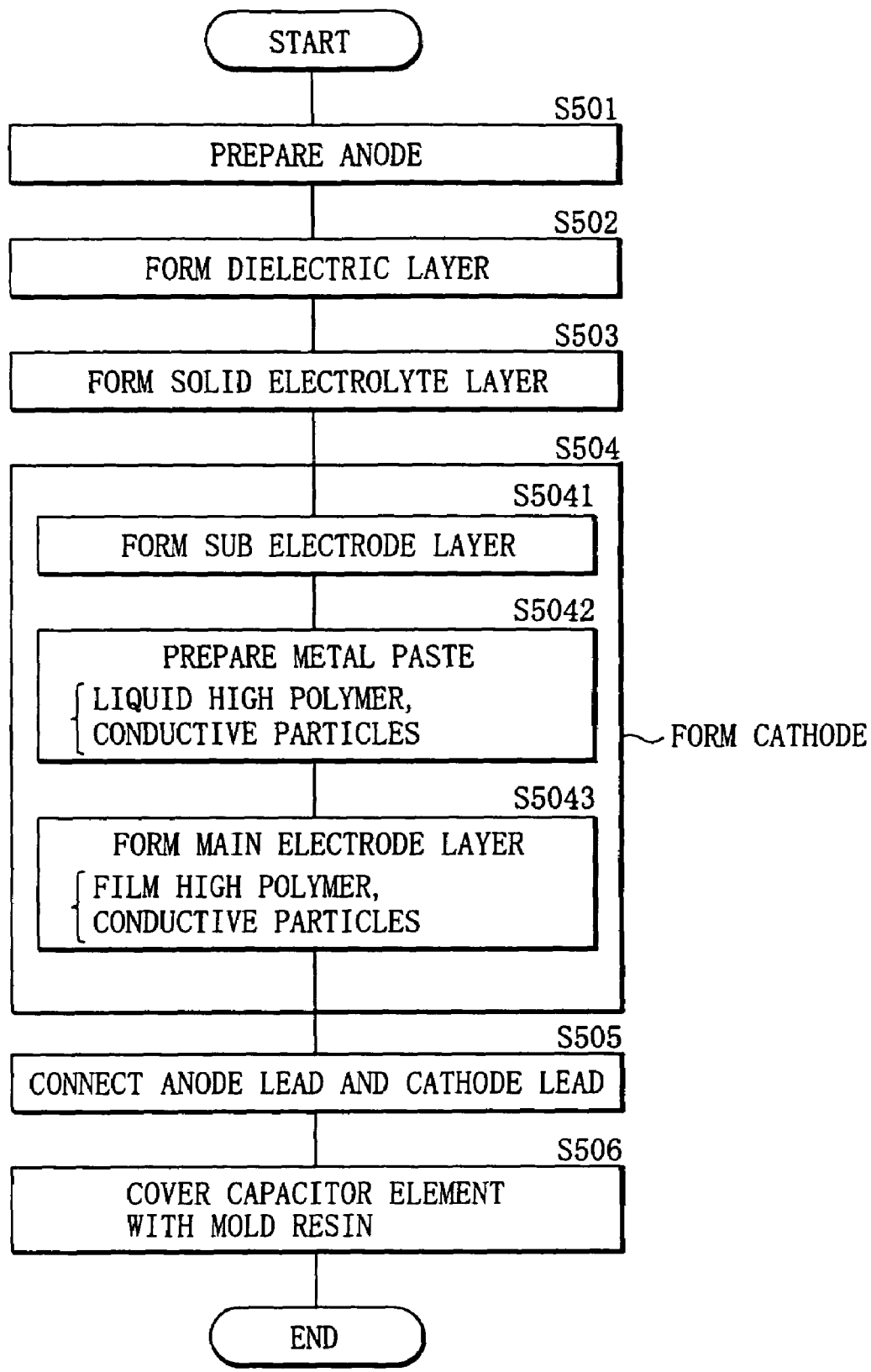
FIG. 11 is a flowchart showing the flow of a manufacturing process of a method of manufacturing an electrolytic capacitor according to a third embodiment of the invention.

FIG. 11 is used to describe the flow of a manufacturing process of an electrolytic capacitor manufacturing method of the third embodiment. An electrolytic capacitor manufactured by the electrolytic capacitor manufacturing method according to the third embodiment has a configuration (refer to FIGS. 1 to 3) similar to that of the electrolytic capacitor of the first embodiment except for the point that the cathode 14 is formed by forming a film from a liquid material for assuring the PTC function. In the following, the configuration of the electrolytic capacitor according to the third embodiment will be described first with reference to FIGS. 1 to 3 and, after that, the electrolytic capacitor manufacturing method of the third embodiment will be described with reference to FIGS. 1 to 3 and FIG. 11. Since the materials of the components of the electrolytic capacitor (capacitor element 10) have been described in detail above, the description will not be repeated.

The cathode 14 in the electrolytic capacitor of the third embodiment is formed by applying a liquid material onto the surface of the solid electrolyte layer 13 has the PTC function. The "liquid material" directly becomes a liquid state (fluid state) without using a solvent at room temperature (which is atmosphere temperature in normal environment where the electrolytic capacitor manufacturing process is generally performed except for high-temperature environment intentionally set, and is concretely atmosphere temperature in a range from about 15° C. to 30° C.) or indirectly becomes the liquid state by being dissolved to the solvent. The liquid material has a characteristic capable of directly forming a film when supplied onto the surface of the solid electrolyte layer 13 by using a method such as coating, dipping, or printing. The "liquid state (fluid state)" denotes a concept including a paste state as long as the material can be supplied onto the surface of the solid electrolyte layer 13 and is a state where the material has viscosity in a range from about 100 cP to 1,000,000 cP.

In particular, the cathode 14 has, for example, as shown in FIG. 2, a two-layer structure in which the main electrode layer 14B is stacked on the sub electrode layer 14A. The main electrode layer 14B in the cathode 14 contains, for example, a metal and is, concretely, formed as a film by applying a liquid material (metal paste) on the surface of the sub electrode layer 14A. More concretely, the main electrode layer 14B is formed by using, as the liquid material for assuring the PTC function, the liquid high polymer containing the conductive particles and is a polymer PTC (P-PTC) layer constructed by containing a film-shaped high polymer formed by using the liquid high polymer, and conductive particles held in the film-shaped high polymer. The liquid high polymer is a high polymer having the characteristic similar to that of the above-described "liquid material" and, concretely, contains at least one of a thermosetting high polymer and a soluble thermoplastic high polymer (a thermoplastic high polymer which does not directly become a liquid state at room temperature but indirectly becomes a liquid state due to the existence of a solvent which can be dissolved at room temperature) except for an insoluble thermoplastic high polymer (a thermoplastic high polymer which does not directly become a liquid state at room temperature and, moreover, does not also indirectly become a liquid state since no solvent which can be dissolved at room temperature exists). An example of the thermosetting high polymer is an epoxy resin and an example of the soluble thermoplastic high polymer is polyvinylidene fluoride (PVDF). The conductive particles are, for example, metal particles of nickel (Ni), copper (Cu), aluminum (Al), tungsten (W), molybdenum (Mo), zinc (Zn), cobalt (Co), platinum (Pt), gold (Au), silver (Ag), and the like, or conductive ceramic particles of tungsten carbide (WC), titanium nitride (TiN), zirconium nitride (ZrN), titanium carbide (TiC), titanium boride ($TiB_2$), molybdenum silicide ($MoSi_2$), and tantalum boride ($TaB_2$).

The procedure of the electrolytic capacitor manufacturing method of the third embodiment is similar to that of the electrolytic capacitor manufacturing method of the first embodiment (refer to FIG. 4) except for the point that the cathode 14 is formed by forming a film by using the liquid material for assuring the PTC function. At the time of manufacturing the electrolytic capacitor, first, the capacitor element 10 shown in FIGS. 1 to 3 is formed. First, as the anode 11, for example, valve metal foil subjected to the surface enlarging process is prepared (step S501 in FIG. 11), after that, the dielectric layer 12 is formed so as to partially cover the periphery of the anode 11 (step S502 in FIG. 11), and the solid electrolyte layer 13 is formed so as to cover the dielectric layer 12 (step S503 in FIG. 11).

Subsequently, the cathode 14 having the PTC function is formed so as to cover the solid electrolyte layer 13 (step S504 in FIG. 11). The cathode 14 is formed so as to have the PTC function by applying the liquid material onto the surface of the solid electrolyte layer 13 so as to form a film.

An example of the procedure of forming the cathode 14 is as follows. First, a carbon paste as the liquid material is supplied onto the surface of the solid electrolyte layer 13 and dried to form a film, thereby forming the sub electrode layer 14A (step S5041). As the method of supplying the carbon paste, for example, coating methods (such as spray method, roller method, and spin coating), impregnating methods (so-called dipping method), printing methods, and the like can be used. Subsequently, by dispersing the conductive particles in the liquid high polymer, a metal paste as the liquid material for assuring the PTC function is prepared (step S5042). At the time of preparing the metal paste, for example, at least one of the thermosetting high polymer such as epoxy resin and the soluble thermoplastic high polymer such as polyvinylidene fluoride (PVDF) is used as the liquid high polymer, and at least one of the metal particles and conductive ceramic particles are used as the conductive particles. Concretely, examples of the metal particles are nickel (Ni), copper (Cu), aluminum (Al), tungsten (W), molybdenum (Mo), zinc (Zn), cobalt (Co), platinum (Pt), gold (Au), silver (Ag), and the like, and examples of the conductive ceramic particles are tungsten carbide (WC), titanium nitride (TiN), zirconium nitride (ZrN), titanium carbide (TiC), titanium boride ($TiB_2$), molybdenum silicide ($MoSi_2$), and tantalum boride ($TaB_2$). In the case of using metal particles as the conductive particles, it is preferable to use filament metal particles. Finally, a metal paste is supplied onto the surface of the sub electrode layer 14A so as to form a film, thereby forming the main electrode layer 14B having the PTC function so as to contain the film-shaped high polymer formed from the liquid high polymer and the conductive particles held in the film-shaped high polymer (step S5043). The method of supplying the metal paste is, for example, similar to that of the carbon paste in the case of forming the sub electrode layer 14A. In such a manner, the cathode 14 is formed so as to have the two-layer structure including the sub electrode layer 14A and the main electrode layer 14B. As a result, the capacitor element 10 having the stacked structure in which the anode 11, dielectric layer 12, solid electrolyte layer 13, and cathode 14 (sub electrode layer 14A and main electrode layer 14B) are stacked in this order is completed.

Finally, for example, an anode lead is connected to the anode 11 in the capacitor element 10, a cathode lead is connected to the cathode 14 (step S505 in FIG. 11), and the periphery of the capacitor element 10 is covered with a mold resin so as to partially expose both of the anode and cathode leads (step S506 in FIG. 11). By the operation, an electrolytic capacitor having the structure in which the anode and cathode leads are connected to the capacitor element 10 and the periphery of the capacitor element 10 is covered with the mold resin so that both of the anode and cathode leads are partially exposed is completed.

In the method of manufacturing the electrolytic capacitor according to the embodiment, at the time of forming the cathode 14 of the two-layer structure (sub electrode layer 14A and main electrode layer 14B) having the PTC function on the solid electrolyte layer 13, a carbon paste is supplied onto the surface of the solid electrolyte layer 13 to form a film, thereby forming the sub electrode layer 14A. By supplying a metal paste (liquid high polymer and conductive particles) onto the surface of the sub electrode layer 14A, the main electrode layer 14B (film-state high polymer and conductive particles) is formed. On the basis of the principle of the PTC function, the PTC function is given to the main electrode layer 14B in the cathode 14. In the conventional electrolytic capacitor manufacturing method, a PTC thermistor is bonded to the capacitor element by thermo compression bonding to give the PTC function to the electrolytic capacitor. Due to mechanical factors (excessive external force applied to the capacitor element) at the time of thermo compression bonding, the dielectric layer tends to be damaged severely during manufacture. In the electrolytic capacitor manufacturing method of the embodiment, different from the conventional electrolytic capacitor manufacturing method, excessive external force is not applied on the dielectric layer 12. Consequently, the dielectric layer 12 is not easily damaged due to the mechanical factors during manufacture. Thus, high productivity can be assured by increasing the manufacture yield of the electrolytic capacitor while preventing destruction of the electrolytic capacitor caused by heat generated at the time of short circuit by using the PTC function. Therefore, by preventing the electrolytic capacitor having the PTC function from being destroyed mechanically during manufacture, the electrolytic capacitor having the PTC function can be stably manufactured.

The difference between the electrolytic capacitor manufacturing method of the embodiment and the conventional electrolytic capacitor manufacturing method will be described for confirmation. In the embodiment, at the time of forming the main electrode layer 14B, a metal paste is supplied onto the surface of the sub electrode layer 14A. In this case, external force is not completely prevented from being applied to the dielectric layer 12 but external force based on the metal paste supplying process is applied. However, obviously, the external force based on the metal paste supplying process is much smaller than that based on the compression bonding process and does not mechanically destroy the dielectric layer 12 during manufacture of the electrolytic capacitor. Therefore, the possibility that the dielectric layer 12 is destroyed due to external force based on the metal paste supplying process is much smaller than the possibility that the dielectric layer is destroyed due to external force based on the compression bonding process.

Particularly, in the embodiment, the cathode 14, concretely, the main electrode layer 14B as part of the cathode 14 has the PTC function. Consequently, different from the conventional electrolytic capacitor manufacturing method in which a PTC thermistor is externally attached as a component other than the capacitor element to the capacitor element, the PTC function is given to the cathode 14 as the inherent component of the capacitor element 10. In this case, different from the conventional case, the PTC function is assured without increasing the number of components of the electrolytic capacitor, so that the configuration of the electrolytic capacitor is prevented from becoming complicated and it is unnecessary to externally attach a new component to the capacitor element 10. Consequently, the number of manufacturing processes of the electrolytic capacitor can be prevented from being increased. Therefore, since the electrolytic capacitor can be manufactured by using the existing method of manufacturing the electrolytic capacitor having no PTC function only with the change point that the main electrode layer 14B is formed by using the liquid material (liquid high polymer and conductive particles) for assuring the PTC function, the electrolytic capacitor having the PTC function can be manufactured as simple as possible.

In addition, the electrolytic capacitor according to the embodiment becomes resistive to destruction due to heat generated at the time of short circuit because of the PTC function of the main electrode layer 14B, so that destruction caused by heat generated at the time of short circuit can be prevented as much as possible by using the PTC function.

The other configuration, operation, action, effect, and modification of the electrolytic capacitor according to the third embodiment and the other procedure, action, effect, and modification of the electrolytic capacitor manufacturing method of the third embodiment are similar to those of the first embodiment.

Fourth Embodiment

A fourth embodiment of the invention will now be described.

Figure 12:
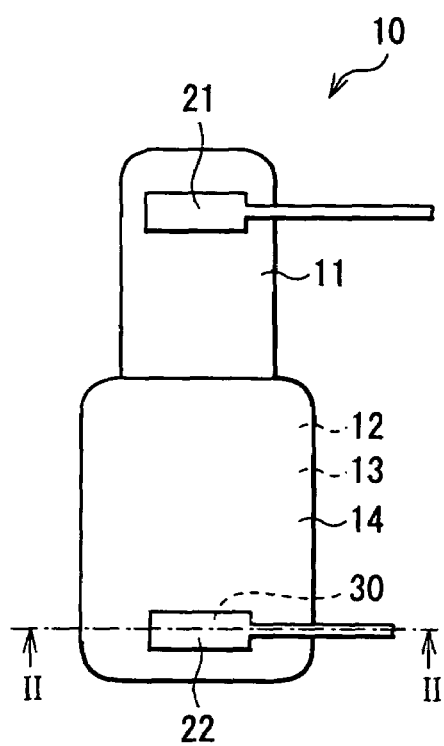
FIG. 12 is an external view showing an external configuration of an electrolytic capacitor according to a fourth embodiment of the invention.
Figure 13:
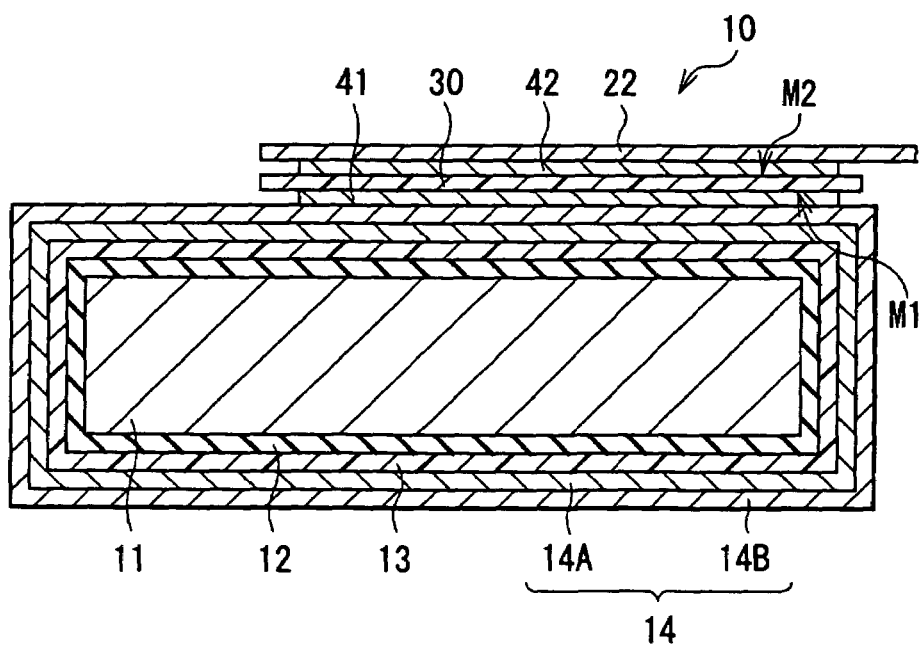
FIG. 13 is an enlarged cross section showing a sectional configuration of the electrolytic capacitor illustrated in FIG. 12.

FIGS. 12 and 13 show the configuration of an electrolytic capacitor according to a fourth embodiment. FIG. 12 shows an external configuration corresponding to FIG. 1, and FIG. 13 shows a sectional configuration (of a section taken along line XIII-XIII of FIG. 12) corresponding to FIG. 2. The electrolytic capacitor of the fourth embodiment has a structure similar to that of the electrolytic capacitor of the first embodiment (refer to FIGS. 1 to 3) except for the point that a PTC layer 30 having the PTC function is connected to the cathode 14.

The electrolytic capacitor according to the fourth embodiment has a structure in which, for example, as shown in FIGS. 12 and 13, an anode lead 21 and a cathode lead 22 are connected to the capacitor element 10 and the periphery of the capacitor element 10 is covered with a mold resin (not shown) so that both of the anode lead 21 and the cathode lead 22 are partially exposed. In the electrolytic capacitor, for example, the PTC layer 30 is connected to the cathode 14 via a conductive adhesive 41, and the cathode lead 22 is connected to the PTC layer 30 via a conductive adhesive 42.

The cathode 14 in the electrolytic capacitor according to the embodiment has, for example, a two-layer structure in which the sub electrode layer 14A and the main electrode layer 14B are stacked in this order and does not have the PTC function.

The PTC layer 30 is a resistance control layer having the PTC function. The PTC layer 30 has a sheet-shaped structure in which the conductive particles are held in the high polymer and is a so-called polymer PTC (P-PTC) layer. The high polymer of the PTC layer 30 is, for example, a thermosetting high polymer and a thermoplastic high polymer. Concrete examples of the thermosetting high polymers are epoxy resin, unsaturated polyester resin, polyimide, polyurethane, phenol resin, and silicone resin. Examples of the thermoplastic resins are olefin polymers (such as polyethylene, ethylene-vinylacetate copolymer, and polyalkylacrylate), halogen polymers (such as fluorine polymers (polyvinylidene fluoride, polytetrafluoroethylene, polyhexafluoropropylene, and copolymers of them), chlorine polymers (such as chlorinated polyethylene), polyamide, polystyrene, polyalkylene oxide, and thermoplastic polyester. Conductive particles are metal particles of nickel (Ni), copper (Cu), aluminum (Al), tungsten (W), molybdenum (Mo), zinc (Zn), cobalt (Co), platinum (Pt), gold (Au), silver (Ag), and the like, conductive ceramic particles of tungsten carbide (WC), titanium nitride (TiN), zirconium nitride (ZrN), titanium carbide (TiC), titanium boride ($TiB_2$), molybdenum silicide ($MoSi_2$), and tantalum boride ($TaB_2$), or carbon particles such as carbon black (C).

The PTC layer 30 having the sheet structure has an bottom face M1 (first face) on the side close to the cathode 14 and a top face M2 (second face) on the side far from the cathode 14 (on the side close to the cathode lead 22). Surface process for exposing the conductive particles are performed on at least one of the bottom face M1 and the top face M2 of the PTC layer 30. In the PTC layer 30, for example, the surface process is performed on only the bottom face M1. The surface process is at least one of, for example, plasma process, ultraviolet process, ozone process, and laser process. The bottom face M1 of the PTC layer 30 is electrically connected to the cathode 14 via the conductive adhesive 41, and the top face M2 of the PTC layer 30 is electrically connected to the cathode lead 22 via the conductive adhesive 42. The details of the surface structure of the bottom face M1 of the PTC layer 30 subjected to the surface process will be described in detail later (refer to FIG. 14).

The conductive adhesive 41 is a first conductive adhesive for electrically connecting the PTC layer 30 to the cathode 14 and is, for example, a paste adhesive containing a metal (such as silver (Ag)). The conductive adhesive 42 is a second conductive adhesive for electrically connecting the PTC layer 30 to the cathode lead 22 and is, for example, an adhesive similar to the conductive adhesive 41.

Both of the anode lead 21 and cathode lead 22 are electrode leads for passing current to the capacitor element 10. The anode lead 21 and cathode lead 22 are made of, for example, a metal such as iron (Fe) or copper (Cu) or a plated metal obtained by plating the metals (for example, tin (Sn) plating or tin lead (SnPb) plating) and are connected to the anode 11 and the cathode 14, respectively, in the capacitor element 10.

Figure 14:
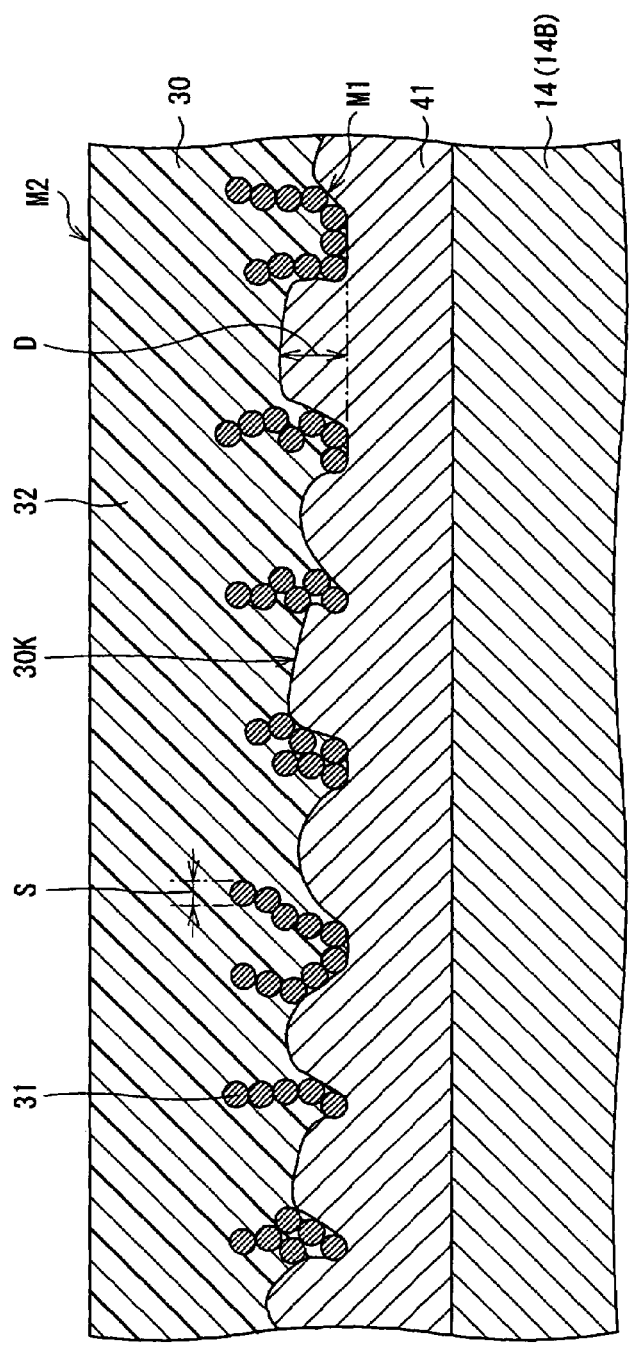
FIG. 14 is a partially enlarged cross section showing a sectional configuration of the electrolytic capacitor illustrated in FIG. 13.

Referring now to FIG. 14, the detailed configuration of the electrolytic capacitor will be described. FIG. 14 shows a partially enlarged sectional configuration of the electrolytic capacitor shown in FIG. 13.

In the PTC layer 30, as described above, the surface process for exposing the conductive particles is performed on the bottom face M1. Concretely, for example, as shown in FIG. 14, in the bottom face M1 of the PTC layer 30, a high polymer 32 is partially removed along the conductive particles 31 around the conductive particles 31 distributed near the bottom face M1, and a recess 30K is formed as an area from which the high polymer 32 is partially removed. The conductive particles 31 are connected to each other in an almost line shape in the high polymer 32, thereby forming a chain of a current path (so-called conductive path). In particular, in the PTC layer 30, for example, to decrease the contact resistance between the PTC layer 30 and the cathode 14 by increasing the contact area (electric contact area) between the conductive particles 31 and the conductive adhesive 41, the recess 30K is formed by partially removing the high polymer 32 so that removal depth D reaches about ⅓ or more of the particle diameter (average particle diameter) S of the conductive particle 31. In FIG. 14, only the conductive particles 31 distributed around the bottom face M1 of the PTC layer 30 out of the conductive particles 31 held in the high polymer 32 are shown.

In the electrolytic capacitor shown in FIGS. 12 to 14, by passing current to the capacitor element 10 via the anode lead 21 and the cathode lead 22, charges are accumulated in the capacitor element 10. At this time, by using the PTC layer 30 having the PTC function, destruction of the electrolytic capacitor due to heat generated at the time of short circuit is prevented. Specifically, when overvoltage or backward voltage is applied to the electrolytic capacitor, if the dielectric layer 12 is partially damaged and short circuit occurs, due to this, excess current flows among the anode 11, solid electrolyte layer 13, and cathode 14, and heat is generated. Due to the heat generated at the time of short circuit, the temperature of the PTC layer 30 rises and the resistance exponentially increases. As a result, the excess current flowing in the capacitor element 10 is suppressed, so that destruction of the capacitor element 10 caused by the excess current is suppressed. The factors of the rise in the temperature of the PTC layer 30 are, for example, the generation of heat at the time of short circuit and also the Joule's heat caused by excess current. When the temperature of the PTC layer 30 decreases after that, the resistance of the PTC layer 30 decreases as the temperature decreases. Consequently, the capacitor element 10 is reset to an energizable state. The principle that the PTC layer 30 has the PTC function is similar to that described in the foregoing first embodiment (the principle that the main electrode layer 14B has the PTC function).

Figure 15:
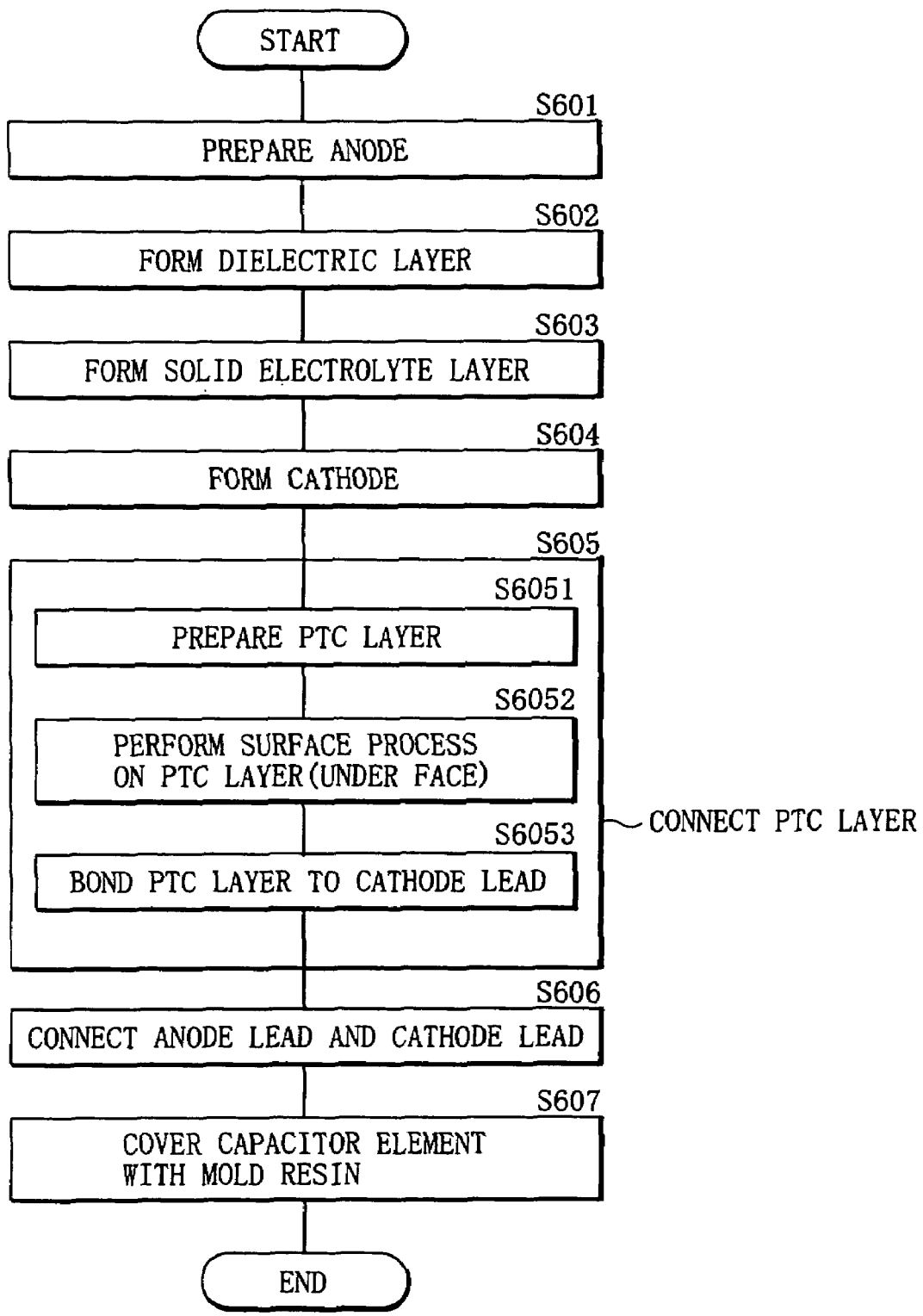
FIG. 15 is a flowchart showing the flow of a manufacturing process of a method of manufacturing an electrolytic capacitor according to the fourth embodiment of the invention.

Referring now to FIGS. 12 to 15, as the electrolytic capacitor manufacturing method according to the embodiment, the electrolytic capacitor manufacturing method shown in FIG. 3 and FIGS. 12 to 14 will be described. FIG. 15 is provided to describe the flow of a manufacturing process of the electrolytic capacitor manufacturing method. In the following, since the materials of the components of the electrolytic capacitor have been already described in detail, the description will not be repeated.

The electrolytic capacitor manufacturing method of the fourth embodiment is similar to that of the first embodiment (refer to FIG. 4) except for the point that a process of forming the cathode 14 having no PTC function and connecting the PTC layer 30 to the capacitor element 10 is newly added. At the time of manufacturing the electrolytic capacitor, first, the capacitor element 10 shown in FIG. 3 and FIGS. 12 to 14 is formed. Specifically, first, valve metal foil subjected to the surface enlarging process is prepared (step S601 in FIG. 15), the dielectric layer 12 is formed so as to partially cover the periphery of the anode 11 (step S602 in FIG. 15), the solid electrolyte layer 13 is formed so as to cover the dielectric layer 12 (step S603 in FIG. 15) and, subsequently, the cathode 14 is formed so as to cover the periphery of the solid electrolyte layer 13 (step S604 in FIG. 15). At the time of forming the cathode 14, for example, by applying and drying a carbon paste around the solid electrolyte layer 13, the sub electrode layer 14A is formed. A silver paste is applied on the sub electrode layer 14A and dried, thereby forming the main electrode layer 14B. In such a manner, the cathode 14 having the stacked structure in which the sub electrode layer 14A and the main electrode layer 14B are stacked in this order is formed. As a result, the capacitor element 10 having the stacked structure in which the anode 11, dielectric layer 12, solid electrolyte layer 13, and cathode 14 are stacked in this order is completed (refer to FIGS. 3, 12, and 13).

Subsequently, the PTC layer 30 having the PTC function is connected to the capacitor element 10 (cathode 14) (step S605 in FIG. 15).

An example of the procedure of connecting the PTC layer 30 is as follows. First, a high polymer containing conductive particles is formed in a sheet shape, thereby preparing the PTC layer 30 having a sheet structure (step S6051). Subsequently, surface process for exposing the conductive particles is performed on at least one of the bottom face M1 facing the cathode 14 in the PTC layer 30 and the top face M2 on the side opposite to the bottom face M1 (step S6052). At the time of performing the surface process, for example, the surface process is performed only to the bottom face M1 of the PTC layer 30. As the surface process, at least one of plasma process, ultraviolet process, ozone process, and laser process is performed. Concretely, by performing the surface process on the bottom face M1 of the PTC layer 30, for example, as shown in FIG. 14, the high polymer 32 is partially removed along the conductive particles 31, thereby forming the recess 30K as the area from the high polymer 32 is partially removed. In this case, particularly, for example, to decrease the contact resistance between the PTC layer 30 and the cathode 14 by increasing the contact area (electric contact area) between the conductive particles 31 and the conductive adhesive 41, it is preferable to partially remove the high polymer 32 so that the removal depth D reaches about ⅓ or more of the particle diameter (average particle diameter) S of the conductive particles 31. Finally, the bottom face M1 subjected to the surface process, of the PTC layer 30 is bonded to the cathode 14 by using the conductive adhesive 41 (step S6053). As a result, the PTC layer 30 is electrically connected to the cathode 14 via the conductive adhesive 41.

An example of the process of the surface process is as follows.

First, in the case of using the plasma process as the surface process, for example, discharge gas is introduced into a vacuum vessel to generate plasma. By using ion bombardment of the plasma and active oxidizing gas formed in the plasma, the high polymer 32 can be partially removed. As the discharge gas, for example, an inactive gas of argon (Ar) or the like, an oxidizing gas of oxygen ($O_2$) or the like, or a mixture gas of the inactive gas and oxidizing gas can be used. Concrete examples of the plasma process are reactive ion etching process using the oxidizing gas as the discharge gas and reverse sputtering process using an inactive gas as the discharge gas.

Second, in the case of using the ultraviolet process as the surface process, for example, by emitting an ultraviolet ray to cut atoms coupled in the high polymer 32, the high polymer 32 can be partially removed. In this case, for example, by performing the ultraviolet emitting process in an oxidizing atmosphere, a decomposed matter which is generated at the time of removing the high polymer 32 can be oxidized and removed by the oxidizing gas. For example, by performing ultraviolet ray irradiating process in an inactive gas atmosphere and water-washing or etching the processed high polymer 32, a decompressed matter which is generated at the time of removing the high polymer 32 can be removed.

Third, in the case of using the ozone process as the surface process, for example, by making the high polymer 32 exposed in an ozone atmosphere to make direct reaction, the high polymer 32 can be partially removed by using the oxidizing reaction of the ozone having strong oxidizing power. It is not limited to use only one of the ultraviolet process and the ozone process but may use both of the ultraviolet process and the ozone process.

Fourth, in the case of using the laser process as the surface process, for example, by emitting a laser beam and using strong optical excitation reactivity of the laser beam, atoms coupled in the high polymer 32 can be disconnected to thereby partially remove the high polymer 32. The laser process is generally known as a laser abrasion method and is a kind of optical decomposition removing process.

Apparatuses, processing conditions, and the like used for carrying out the series of surface processes can be freely set.

Finally, for example, by connecting the anode lead 21 to the anode 11 in the capacitor element 10 and bonding the cathode lead 22 to the PTC layer 30 by using the conductive adhesive 42, the cathode lead 22 is connected to the PTC layer 30 via the conductive adhesive 42 (step S606 in FIG. 15). After that, the periphery of the capacitor element 10 is covered with a mold resin so that both of the anode lead 21 and the cathode lead 22 are partially exposed (step S607 in FIG. 15). As a result, the electrolytic capacitor having the structure in which the anode lead 21 and the cathode lead 22 are connected to the capacitor element 10 and the periphery of the capacitor element 10 is covered with a mold resin so that both of the anode lead 21 and the cathode lead 22 are partially exposed is completed.

Figure 16:
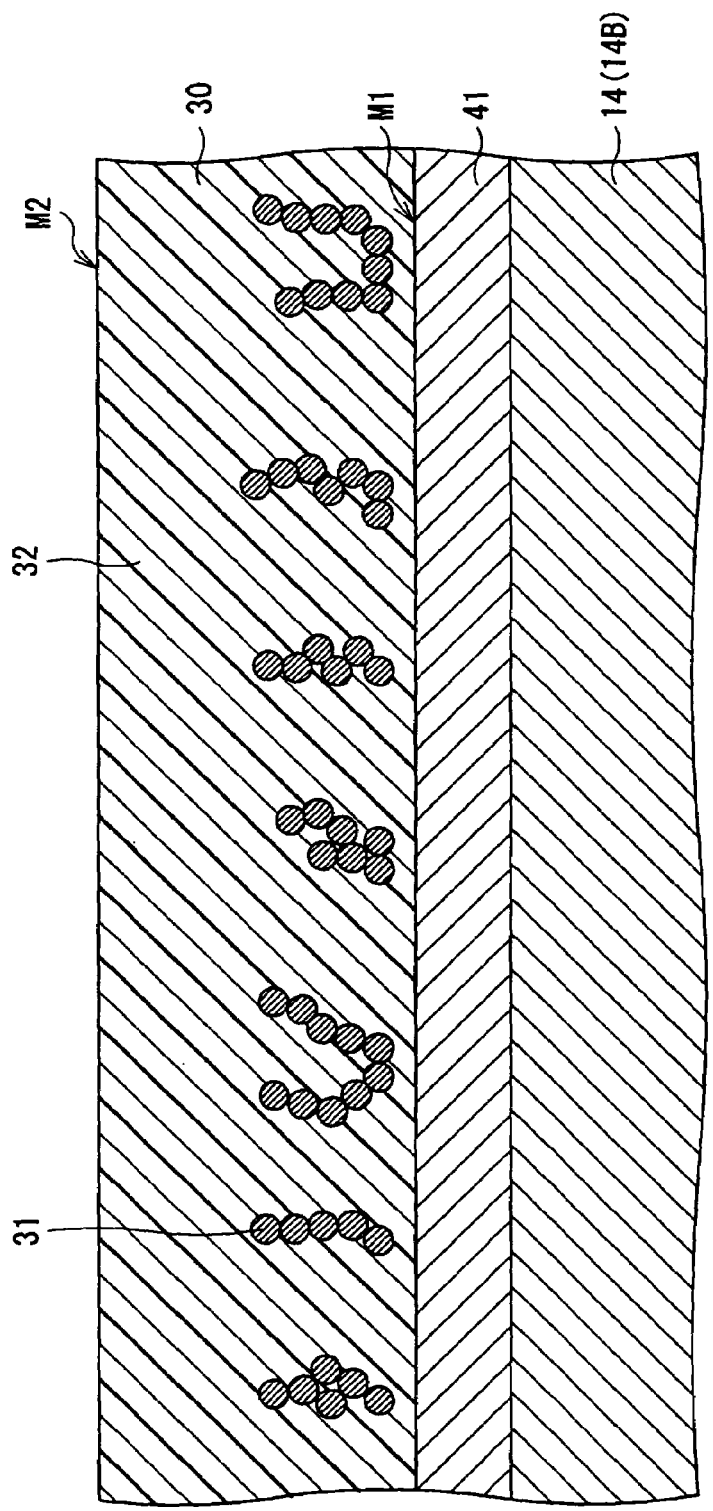
FIG. 16 is a partially enlarged cross section showing a sectional configuration of an electrolytic capacitor as a comparative example of the electrolytic capacitor according to the fourth embodiment of the invention.

In the electrolytic capacitor manufacturing method of the embodiment, the PTC layer 30 having the PTC function is connected to the cathode 14, so that the PTC function is given to the electrolytic capacitor by the PTC layer 30 on the basis of the principle of the PTC function. In this case, specifically, the surface process for exposing the conductive particles is performed on the bottom face M1 of the PTC layer 30 and, after that, the bottom face M1 subjected to the surface process, of the PTC layer 30 is connected to the cathode 14, thereby exposing the conductive particles 31 in the bottom face M1 of the PTC layer 30 as shown in FIG. 14. Consequently, as shown in FIG. 16, as compared with the case where the PTC layer 30 is connected to the cathode 14 without performing the surface process on the bottom face M1, that is, in the case where the conductive particles 31 are not exposed in the bottom face M1 of the PTC layer 30, the contact area (electric contact area) between the PTC layer 30 (conductive particles 31) and the cathode 14 increases, so that contact resistance between the PTC layer 30 and the cathode 14 decreases. As a result, while preventing destruction of the electrolytic capacitor caused by heat generated at the time of short circuit by using the PTC function, the resistance characteristic of the electrolytic capacitor can be decreased. Therefore, the resistance characteristic of the electrolytic capacitor having the PTC function can be reduced as much as possible.

In the embodiment, the bottom face M1 of the PTC layer 30 is connected to the cathode 14 by using the conductive adhesive 41, as shown in FIG. 14, by the surface process, the recess 30K formed in the bottom face M1 of the PTC layer 30 is sufficiently filled with the conductive adhesive 41. In this case, for example, as compared with the case where the bottom face M1 of the PTC layer 30 subjected to the surface process is bonded to the cathode 14 by thermo compression, the contact area between the conductive particles 31 and the conductive adhesive 41 increases. As a result, the electric connection area between the conductive particles 31 and the cathode 14 increases, so that the contact resistance between the PCT layer 30 and the cathode 14 remarkably decreases. Therefore, the resistance characteristic of the electrolytic capacitor having the PTC function can be reduced more.

In the embodiment, as shown in FIG. 14, by performing the surface process on the bottom face M1 of the PTC layer 30, at the time of partially removing the high polymer 32, the high polymer 32 is partially removed until the removal depth D reaches ⅓ or more of the particle diameter (average particle diameter) S of the conducive particle 31. Consequently, the specific conductive particles 31 distributed around the bottom face M1 are sufficiently exposed in the recess 30K, that is, the exposure area of the conductive particles 31 constructing the main electric connection path between the PTC layer 30 and the cathode 14 is assured. Therefore, from the viewpoint as well, the electric connection area between the conductive particles 31 and the cathode 14 increases, so that the resistance characteristic of the electrolytic capacitor having the PTC function can be further reduced.

In addition to the above, in the electrolytic capacitor of the embodiment, while assuring the PTC function in the PTC layer 30, the contact resistance between the PTC layer 30 and the cathode 14 is reduced. Therefore, the PTC function can be assured while reducing the resistance as much as possible.

Figure 17:
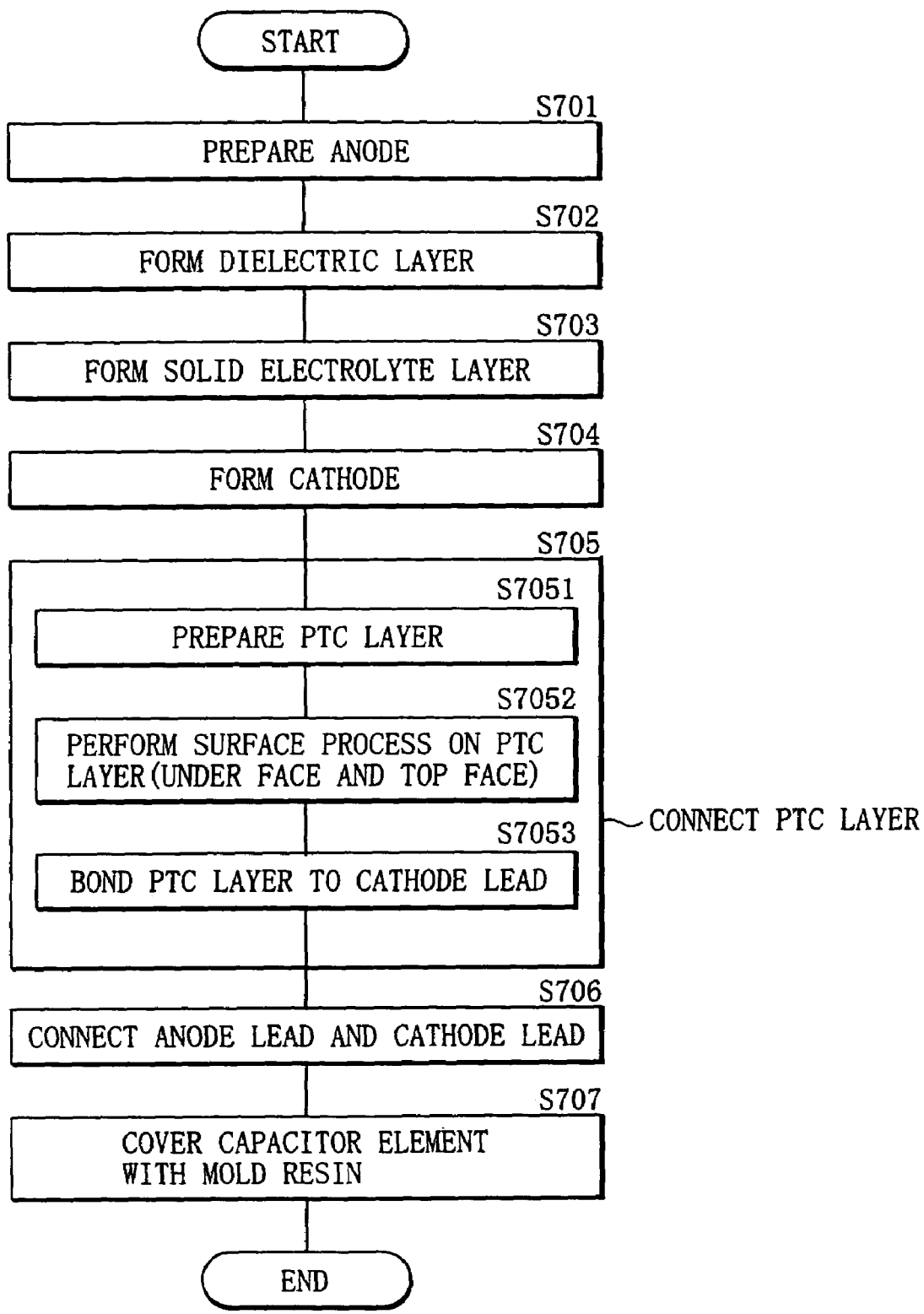
FIG. 17 is a flowchart for explaining a modification of the method of manufacturing the electrolytic capacitor according to the fourth embodiment of the invention.
Figure 18:
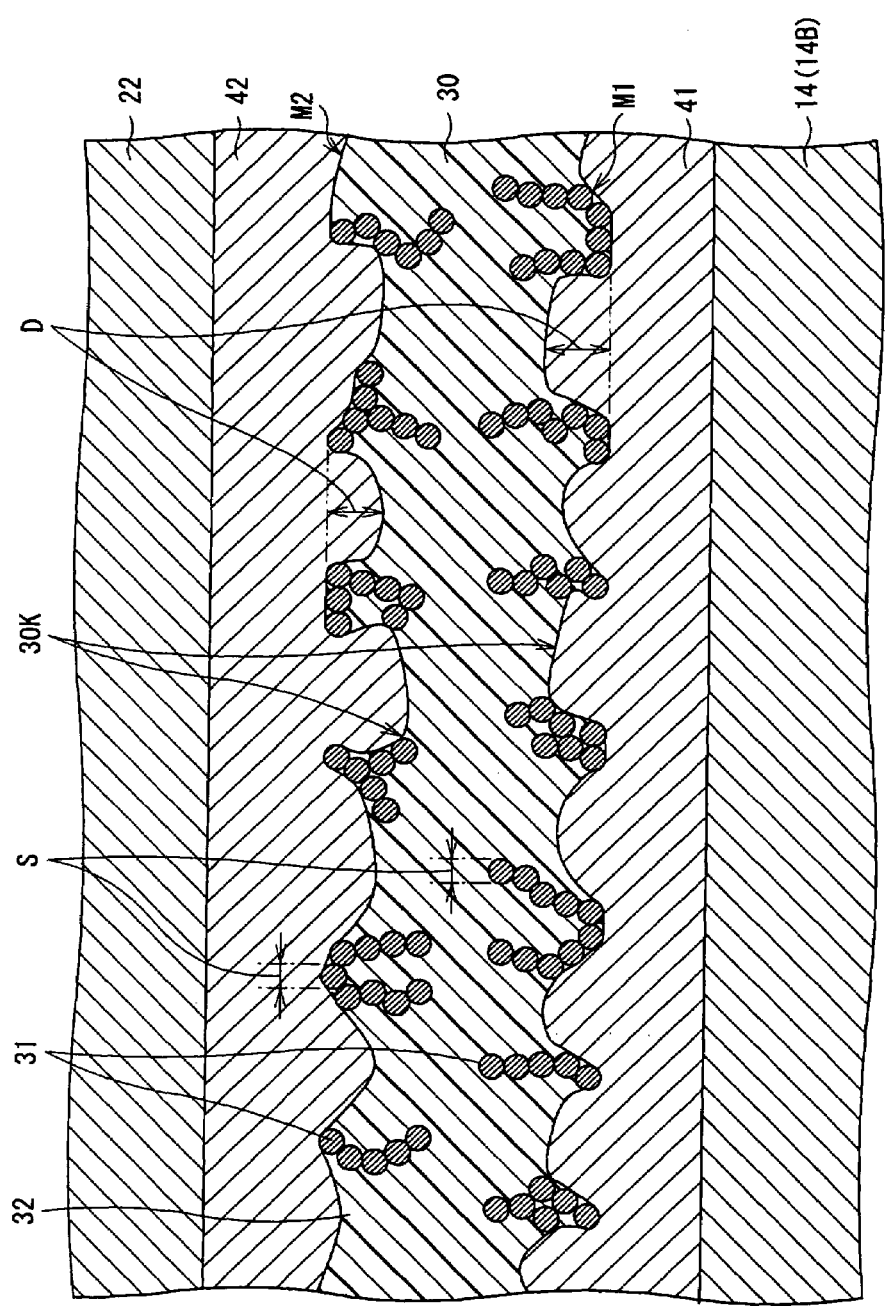
FIG. 18 is a flowchart for explaining a modification of the configuration of the electrolytic capacitor according to the fourth embodiment of the invention.

Although the surface process is performed on only the bottom face M1 of the PTC layer 30 in the embodiment, the invention is not always limited to the embodiment. For example, as shown in FIGS. 17 and 18, the surface process may be performed on both of the bottom face M1 and the top face M2 of the PTC layer 30. FIG. 17 is provided to describe a modification of the electrolytic capacitor manufacturing method and shows the flow of the manufacturing process corresponding to FIG. 15. FIG. 18 shows a partially enlarged sectional configuration of the electrolytic capacitor corresponding to FIG. 14. In the electrolytic capacitor manufacturing method, as shown in FIGS. 3, 12, 13, 17, and 18, the anode 11 is prepared (step S701), the dielectric layer 12, solid electrolyte layer 13, and cathode 14 are formed on the anode 11 (steps S702, S703, and S704), and the PTC layer 30 subjected to the surface process is connected to both of the bottom face M1 and the top face M2 of the solid electrolyte layer 13 by using the conductive adhesive 41 (step S705). Concretely, first, the sheet-shaped PTC layer 30 in which the conductive particles are held in the high polymer is prepared (step S7051). Subsequently, by performing the surface process on both of the bottom face M1 and the top face M2 of the PTC layer 30 (step S7052), the recess 30K is formed by partially removing the high polymer 32 in both of the bottom face M1 and the top face M2 as shown in FIG. 18 to thereby expose the conductive particles 31. The kind of the process used as the surface process and the procedure of the surface process are, for example, similar to those of the foregoing embodiment. Finally, the bottom face M1 subjected to the surface process of the PTC layer 30 is bonded to the cathode 14 by using the conductive adhesive 41 (step S7053). In such a manner, the PTC layer 30 is electrically connected to the cathode 14 via the conductive adhesive 41. After that, the anode lead 21 is connected to the anode 11 in the capacitor element 10 and the cathode lead 22 is bonded to the PTC layer 30 by using the conductive adhesive 42, thereby connecting the cathode lead 22 to the PTC layer 30 via the conductive adhesive 42 (step S706). After that, the periphery of the capacitor element 10 is covered with a mold resin so that both of the anode lead 21 and the cathode lead 22 are partially exposed (step S707), thereby completing the electrolytic capacitor. In this case, by the action based on the surface process described in the foregoing embodiment, the conductive particles 31 are exposed in the bottom face M1 of the PTC layer 30. Consequently, the contact resistance between the PTC layer 30 and the cathode 14 decreases and the conductive particles 31 are exposed also in the top face M2, so that the contact resistance between the PTC layer 30 and the cathode lead 22 also decreases. Since the contact resistance decreases between the PTC layer 30 and the cathode 14 and between the PTC layer 30 and the cathode lead 22, as compared with the case of the foregoing embodiment in which the surface process is performed on only the bottom face M1 of the PCT layer 30, the resistance characteristic of the electrolytic capacitor can be further decreased. The procedure other than the above-described procedure of the electrolytic capacitor manufacturing method shown in FIG. 17 and the characteristics other than the above-described characteristics of the electrolytic capacitor shown in FIG. 18 are, for example, similar to those shown in FIGS. 15 and 14.

Figure 19:
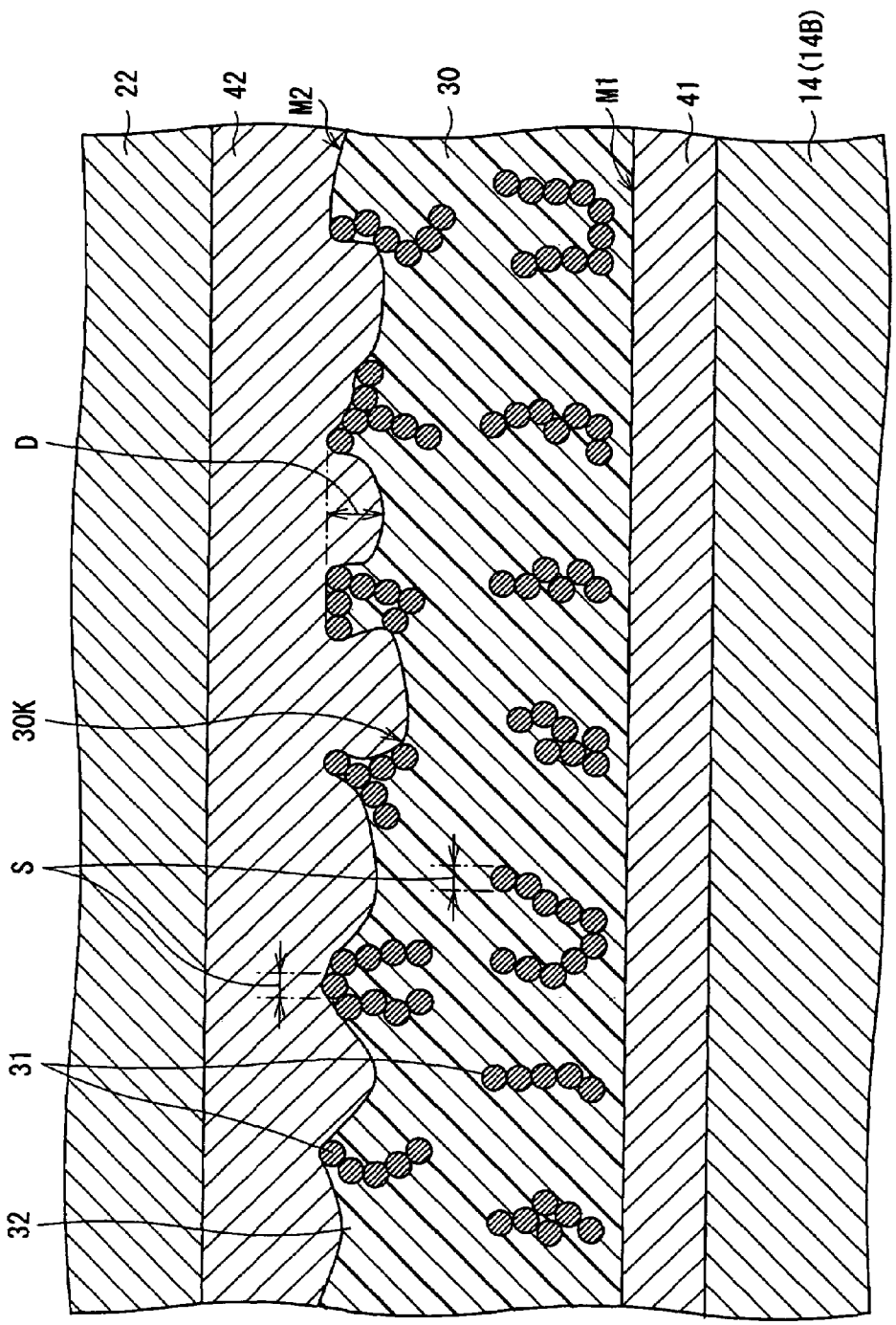
FIG. 19 is a flowchart for explaining another modification of the configuration of the electrolytic capacitor according to the fourth embodiment of the invention.

Obviously, in the embodiment, as shown in FIG. 19, the surface process may be performed on only the top face M2 without performing the surface process on the bottom face M1 of the PTC layer 30. In this case as well, the contact resistance between the PTC layer 30 and the cathode lead 22 decreases, so that effects similar to those of the foregoing embodiment can be obtained. The characteristics other than the above-described characteristics of the configuration of the electrolytic capacitor shown in FIG. 19 are, for example, similar to those of the case shown in FIG. 18 except for the point that the surface process is not performed on the bottom face M1. The method of manufacturing the electrolytic capacitor shown in FIG. 19 is, for example, similar to that of the case shown in FIG. 17 except for the point that the surface process is not performed on the bottom face M1 of the PTC layer 30.

Although the PTC layer 30 is bonded to the cathode 14 by using the conductive adhesive 41 at the time of connecting the PTC layer 30 to the cathode 14 in the embodiment, the invention is not always limited to the embodiment. The PTC layer 30 may be bonded to the cathode 14 by using, for example, a bonding method such as thermo compression bonding in place of using the conductive adhesive 41. In this case as well, effects similar to those of the foregoing embodiment can be obtained. In the case of bonding the PTC layer 30 to the cathode 14, it should be noted that, for example, if an excessive external force is applied to the capacitor element 10 at the time of bonding, the thin dielectric layer 12 is easily broken due to the external force.

The other configuration, operation, action, effect, and modification of the electrolytic capacitor according to the fourth embodiment and the other procedure, action, effect, and modification of the electrolytic capacitor manufacturing method of the fourth embodiment are similar to those of the first embodiment.

EXAMPLES

Concrete examples of the invention will now be described.

An electrolytic capacitor was manufactured by using an electrolytic capacitor manufacturing method described in the first embodiment. Specifically, first, a sintered body (tantalum sintered body) of tantalum powders in which an anode lead made of copper is buried was prepared as an anode. A voltage (5V) was applied to the tantalum sintered body in a formation solution so that the anodizing reaction progresses, thereby forming a dielectric layer. A monomer solution in which monomer, dopant, and oxidizer are dispersed in a solvent was prepared, and the anode in which the dielectric layer was formed was dipped in the monomer solution for 30 seconds, thereby making the monomer solution adhered on the surface of the dielectric layer. After that, the anode was taken out at 0.5 mm/second and dried at room temperature. Subsequently, the anode dipped in the monomer solution was put in a drier (with the temperature of 95° C.) and heated. The monomer was oxidation-polymerized by using the oxidizer contained in the monomer solution, thereby forming a solid electrolyte layer so as to include a conductive high polymer doped with the dopant. A sub electrode layer was formed so as to cover the solid electrolyte layer. After that, a main electrode layer was formed so as to cover the sub electrolytic layer, thereby forming the cathode having the PTC function so as to have the two-layered structure including the sub electrode layer and the main electrode layer. In this case, as the PTC function of the cathode, the resistance was set to be higher (than that of resistance at room temperature) by about 100,000 times or more in the temperature range of 120° C. to 150° C. As a result, a capacitor element having a stacked structure in which the anode, dielectric layer, solid electrolyte layer, and cathode (sub electrode layer and main electrode layer) are stacked in this order was formed. Finally, a cathode lead made of copper was connected to the capacitor element by using a conductive adhesive (silver adhesive) and, after that, the periphery of the capacitor element was covered with epoxy resin as a mold resin so that the anode and cathode leads are partially exposed, thereby completing the electrolytic capacitor.

The procedure of forming the solid electrolyte layer is as follows. First, 3,4-ethylenedioxythiophene ("Baytron M" (trademark) of Bayer Ltd.) as a monomer and a para-toluenesulfonic acid iron (III) 50% butanol solution ("Baytron C" (trademark) of Bayer Ltd.) as a dopant and oxidizer were sufficiently cooled with ice water. 0.867 g of the monomer and 10.4 g of the dopant and oxidizer were weighed. While cooling the monomer and the dopant and oxider with ice water, they were mixed and stirred with a magnetic stirrer, thereby preparing the monomer solution. Subsequently, the anode in which the dielectric layer was already formed was dipped in the monomer solution, thereby making the monomer solution applied onto the surface of the dielectric layer. The dielectric layer on which the monomer solution was applied was left at room temperature for about one hour. After that, the monomer solution was heated to oxidization-polymerize the monomer, thereby forming polyethylene dioxythiophene as the conductive high polymer so as to cover the dielectric layer. The heating parameters were that heating temperature=100° C. and heating time=15 minutes. Finally, by sufficiently cleaning the conductive high polymer with distilled water, unpolymerized monomer, excessive dopant, used oxidizer, and the like were washed away, and the conductive high polymer was dried. At the time of forming the conductive high polymer, the procedure of generating the conductive high polymer was repeated three times. Each time the oxidation polymerization completed, the conductive high polymer was washed with distilled water or ethanol, thereby removing the unpolymerized monomer, excessive dopant, and used oxidizer. In such a manner, a solid electrolyte layer containing the conductive high polymer was formed.

Electrolytic capacitors (examples 1-1 to 1-3) were manufactured while changing the configuration of the cathode (sub electrode layer and main electrode layer) having the PTC function by using the above-described electrolytic capacitor manufacturing method. After that, the characteristics of the electrolytic capacitors were examined. At the time of examining the characteristics of the electrolytic capacitors of the invention, to evaluate the performances by comparison, a comparative electrolytic capacitor (comparative example 1) with the configuration described below was manufactured and its characteristics were also examined.

Example 1-1

A cathode was formed by the following procedure so that only a main electrode layer has the PTC function. Specifically, carbon black (CB) paste TC-8263 of Tanaka Kikinzoku Kogyo K.K. was used as the material (carbon paste) of a sub electrode layer. The carbon paste was applied on the surface of a solid electrolyte layer and dried at 125° C., thereby forming the sub electrode layer. A conductive high polymer sheet was manufactured by forming a mixed material containing the high polymer and conductive particles in a sheet shape and was connected to the surface of the sub electrode layer, thereby forming a main electrode layer. At the time of forming the conductive high polymer sheet, polyvinylidene fluoride (PVDF) Kynar7201 (melting point=122° C. to 126° C., specific gravity=1.88) of Atofina Chemicals was used as the high polymer, and filament nickel powder (Ni) type 210 (average particle diameter=0.5 μm to 1.0 μm, apparent density=0.80 g/cm$^3$, specific surface area=1.50 m$^2$/g to 2.50 m$^2$/g, addition capacity ratio (high polymer:conductive particles)=65:35) of INCO Limited was used as the conductive particles. The high polymer and conductive particles were melted and kneaded in a kneading mill of 150° C. The kneaded material was thermal-pressed so as to be formed in a sheet shape having a thickness of about 0.2 mm, thereby manufacturing a conductive high polymer sheet. As the process of connecting the conductive high polymer sheet, a thermo compression bonding process was used.

Example 1-2

A cathode was formed by a procedure similar to that of Example 1-1 except for the point that a conductive high polymer sheet was manufactured by using linear low-density polyethylene (L-LDPE) UJ960 (melting point=127° C. and specific gravity=0.921) of Japan Polyethylene Corporation as the high polymer and using titanium carbide (TiC) TiC-01 (average particle diameter=0.9 μm to 1.5 μm, addition capacity ratio (high polymer:conductive particles=68:32)) of Japan New Metals Co., Ltd. as the conductive particles.

Example 1-3

A cathode was formed by the following procedure so that only a sub electrode layer has the PTC function. A conductive high polymer sheet was manufactured by forming a mixed material containing the high polymer and conductive particles in a sheet shape and was connected to the surface of a solid electrolyte layer, thereby forming a sub electrode layer. At the time of forming the conductive high polymer sheet, high density polyethylene (HDPE) HY540 (melting point=135° C. and specific gravity=0.961) of Japan Polyethylene Corporation was used as the high polymer and carbon black (CB) Raven430 (addition capacity ratio (high polymer:conductive particles)=67:33) of Columbian Chemicals Company was used as the conductive particles. The high polymer and conductive particles were melted and kneaded in a kneading mill of 150° C. The kneaded material was thermal-pressed so as to be formed in a sheet shape having a thickness of about 0.2 mm, thereby manufacturing a conductive high polymer sheet. As the process of connecting the conductive high polymer sheet, a thermo compression bonding process was used. As the material (metal paste) of the main electrode layer, silver paste NH-1429N of Tanaka Kikinzoku Kogyo K.K. was used. The silver paste was applied on the surface of the sub electrode layer and dried, thereby forming the main electrode layer.

Comparative Example 1

By the following procedure, a cathode was formed so as not to have the PTC function. As the material of a sub electrode layer, the carbon paste used in Example 1-1 was used. The carbon paste was applied on the surface of a solid electrolyte layer and dried at 125° C., thereby forming the sub electrode layer. The silver paste used in Example 1-3 was used as the material of a main electrode layer. The silver paste was applied on the surface of the sub electrode layer and dried, thereby forming the main electrode layer.

Performance tests were conducted on the electrolytic capacitors of Examples 1-1 to 1-3 and Comparative Example 1 to check the operation characteristics of the electrolytic capacitors. Table 1 shows the result. Table 1 shows the operation characteristics of the electrolytic capacitors. As "evaluation", "good" or "bad" is shown. At the time of examining the operation conditions of the electrolytic capacitors, backward voltage (=30V) was applied to each of the electrolytic capacitors and visual observation was carried out. When firing did not occur, it was determined as "good". When firing occurred, it was determined as "bad". For reference sake, Table 1 also shows the construction (high polymer and conductive particles) of the cathode (sub electrode layer and main electrode layer) and whether the PTC function is provided for each of the sub and main electrode layers or not.

TABLE 1

| | Sub electrode layer | | | Main electrode layer | | | |
|---|---|---|---|---|---|---|---|
| | High polymer | Conductive particles | PTC function | High polymer | Conductive particles | PTC function | Evaluation |
| Example 1-1 | | CB paste | Absence | PVDF | Ni | Presence | Good |
| Example 1-2 | | CB paste | Absence | L-LDPE | TiC | Presence | Good |
| Example 1-3 | HDPE | CB | Presence | | Silver paste | Absence | Good |
| Comparative example 1 | | CB paste | Absence | | Silver paste | Absence | Bad |

As understood from the result of Table 1, in the electrolytic capacitors of Examples 1-1 and 1-2 in which the main electrode layer has the PTC function and the electrolytic capacitor of Example 1-3 in which the sub electrode layer has the PTC function, although excess current (short-circuit current) flowed instantaneously due to occurrence of short circuit when the backward voltage is applied, the excess current was immediately suppressed by using the PTC function, so that no firing occurred. The resistance change in the main electrode layer or sub electrode layer having the PTC function of each of the electrolytic capacitors of Examples 1-1 to 1-3 was examined. The resistance increased by 1,000 times or more as the temperature rises. The resistance change rate was sufficient to display the PTC function. On the other hand, in the electrolytic capacitor having no PTC function of Comparative Example 1, when backward voltage was applied, short circuit occurred and excess current flowed. Since the electrolytic capacitor does not have the PTC function, when the excess current continuously flowed, heat was generated and, finally, firing occurred. Therefore, it was recognized that in the electrolytic capacitors of Examples 1-1 to 1-3, by using the PTC function, destruction caused by heat generated at the time of short circuit can be prevented.

Although concrete data will not be presented, the characteristics of an electrolytic capacitor manufactured so that both of the sub and main electrolytic layers have the PTC function, concretely, an electrolytic capacitor obtained by replacing the sub electrolytic layer (without the PTC function) of Examples 1-1 and 1-2 with the sub electrolytic layer (with the PTC function) of Example 1-3 or an electrolytic capacitor obtained by replacing the main electrolytic layer (without the PTC function) of Example 1-3 with the main electrode layer (with the PTC function) of Examples 1-1 and 1-2 were examined. In any of the electrolytic capacitors, results similar to those of the electrolytic capacitors of Examples 1-1 to 1-3 were obtained. Thus, it was recognized that an electrolytic capacitor can be stably manufactured also in the case where both of the sub and main electrolytic layers have the PTC function.

Next, an electrolytic capacitor was manufactured by using the electrolytic capacitor manufacturing method of the second embodiment. First, as the anode, aluminum foil subjected to a process (surface enlarging process) was prepared. Voltage (=23V) was applied to the aluminum foil in a formation solution to make anodic oxidation reaction progressed to form an oxide aluminum film, thereby forming a dielectric layer. After formation of the dielectric layer, capacity was measured in an adipic acid ammonium aqueous solution, and theoretical capacity was about 100 µF. Subsequently, a monomer solution obtained by dispersing monomer, dopant, and oxidizer in a solvent was prepared. By dipping the anode in which the dielectric layer was already formed in the monomer solution for 30 seconds, the monomer solution was adhered onto the surface of the dielectric layer. After that, the anode was taken out in 0.5 mm/second and dried at room temperature. Subsequently, the anode already dipped in the monomer solution was put in a drier and was heated to oxidation-polymerize the monomer by using the oxidizer contained in the monomer solution, thereby forming the solid electrolyte layer so as to contain the conductive high polymer doped with the dopant. The procedure of forming the solid electrolyte layer is similar to that of the case of manufacturing the electrolytic capacitor of the first embodiment. Subsequently, by applying a carbon paste on the surface of the solid electrolyte layer and drying it, the sub electrode layer was formed. Subsequently, the silver paste was applied on the surface of the sub electrode layer and dried, thereby forming the main electrode layer. After that, the auxiliary electrode layer having the PTC function was formed so as to cover the main electrode layer, thereby forming the cathode having the PTC function so as to have the three-layer structure including the sub electrode layer, main electrode layer, and auxiliary electrode layer. As a result, the capacitor element having the stacked structure in which the anode, dielectric layer, solid electrolyte layer, and cathode (sub electrode layer, main electrode layer, and auxiliary electrode layer) are stacked in this order was formed. Finally, an anode lead and a cathode lead made of copper were connected to the capacitor element by using a conductive adhesive (silver adhesive) and the periphery of the capacitor element was covered with an epoxy resin as a mold resin so as to partially expose both of the anode and cathode leads, thereby completing the electrolytic capacitor.

Electrolytic capacitors (Examples 2-1 to 2-7) of the invention were manufactured while changing the configuration of the cathode (auxiliary electrode layer) having the PTC function by using the electrolytic capacitor manufacturing method and, after that, the characteristics of the electrolytic capacitors were examined. At the time of examining the characteristics of the electrolytic capacitors of the invention, to compare and evaluate the performances, comparative electrolytic capacitors (Comparative Examples 2-1 to 2-4) were also manufactured while changing the configuration of the cathode and the characteristics of the electrolytic capacitors were also examined.

Example 2-1

As the material (metal paste) of an auxiliary electrode layer, a mixture (epoxy resin α: mixing weight ratio of (EPICLON850:EP4005)=75:25) between an epoxy resin EPICLON850 (epoxy equivalent=190 g/eq) of Dainippon Ink and Chemicals, Incorporated and an epoxy resin EP4005 (epoxy equivalent=510 g/eq) of Asahi Denka Co., Ltd. was used. As the conductive particles, metal particles, concretely, filament nickel powders (Ni) Type 255 (average particle diameter=2.2 µm to 2.8 µm, apparent density=0.50 g/cm$^3$ to 0.65 g/cm$^3$, specific surface area=0.68 m$^2$/g, addition capacity ratio (high polymer:conductive particles=40:60) of INCO Limited were used. A metal paste was applied on the surface of the main electrode layer and was set at 130° C. under nitrogen atmosphere, thereby forming an auxiliary electrode layer so as to have the thickness of 0.3 mm. As the metal paste, a metal paste containing the liquid high polymer and conductive particles and, as a co-hardener, a hardener B570 (acid anhydride equivalent=168 g/eq, equivalent ratio between acid anhydride and liquid high polymer=1:1) of Dainippon Ink and Chemicals, Incorporated and a hardening accelerator PN-40J (addition amount=1% by weight of the weight of the liquid high polymer) of Ajinomoto-Fine-Techno Co., Inc. was used.

Example 2-2

An auxiliary electrode layer was formed by a procedure similar to that of Example 2-1 except for the point that an epoxy resin (epoxy resin β) AK-601 (epoxy equivalent=153 g/eq) of Nippon Kayaku Co., Ltd. was used in place of the epoxy resin α as the liquid high polymer (film-state high polymer).

Example 2-3

An auxiliary electrode layer was formed by a procedure similar to that of Example 2-1 except for the point that conductive ceramic particles, concretely, tungsten carbide (WC) WC—F (particle diameter=0.62 µm, addition capacity ratio (liquid high polymer:conductive particles)=70:30) of Japan New Metals Co., Ltd. was used in place of the metal particles as the conductive particles.

Example 2-4

As the liquid high polymer (film high polymer), a soluble thermoplastic high polymer, concretely, polyvinylidene fluoride (PVDF; PVDFα) Kynar7201 (melting point=122° C. to 126° C., specific gravity=1.88) of Atofina Chemicals dissolved in a mixture solvent of acetone and toluene was used. As the conductive particles, conductive ceramic particles, concretely, tungsten carbide (WC; addition capacity ratio (liquid high polymer:conductive particles)=70:30) used in Example 2-3 was used. A metal paste prepared by stirring conductive particles in liquid high polymer by a ball mill was applied on the surface of a main electrode layer and dried in vacuum at 100° C., thereby forming an auxiliary electrode layer so as to have a thickness of 0.3 µm.

Example 2-5

An auxiliary electrode layer was formed by a procedure similar to that of Example 2-4 except for the point that tantalum boride (TaB$_2$) TaB$_2$—O (particle diameter=1.00 µm, addition capacity ratio (liquid high polymer:conductive particles)=68:32) of Japan New Metals Co., Ltd. was used as the conductive particles in place of tungsten carbide.

Example 2-6

As the liquid high polymer (film high polymer), a soluble thermoplastic high polymer, concretely, polyvinylidene fluoride (PVDF; PVDFβ) THV200P (melting point=115° C. to 125° C., specific gravity=1.91) of Sumitomo 3M Limited dissolved in N-methyl-2-pyrrolidone was used. As the conductive particles, metal particles, concretely, nickel powder used in Example 2-1 was used. A metal paste prepared by stirring conductive particles in liquid high polymer by a ball mill was applied on the surface of a main electrode layer and dried in vacuum at 100° C., thereby forming an auxiliary electrode layer so as to have a thickness of 0.3 µm.

Example 2-7

An auxiliary electrode layer was formed by bonding a thermoplastic conductive high polymer sheet to the surface of a main electrode layer without using a metal paste as the material of the auxiliary electrode layer. At the time of forming a conductive high polymer sheet, an insoluble thermoplastic high polymer, concretely, high density polyethylene (HDPE) HY540 (melting point=135° C., specific gravity=0.961) of Japan Polyethylene Corporation was used. As the conductive particles, metal particles, concretely, filament nickel powder type 210 (average particle diameter=0.5 µm to 1.0 µm, apparent density=0.80 g/cm$^3$, specific surface area=1.50 m$^2$/g to 2.50 m$^2$/g, addition capacity ratio (high polymer:conductive particles)=65:35) of INCO Limited was used. The high polymer and conductive particles were melted and kneaded in a kneading mill of 150° C. The kneaded material was thermal-pressed so as to be formed in a sheet shape having a thickness of about 0.2 mm. At the time of bonding the conductive high polymer sheet to the surface of the main electrode layer, the conductive adhesive Dotite XA-874 of Fujikurakasei Co., Ltd was used.

Comparative Example 2-1

An auxiliary electrode layer was formed by a procedure similar to that of Example 2-7 except for using, as the conductive particles, in place of the metal particles (nickel powder), carbon particles, concretely, carbon black (CB) #4500 TOKABLACK (particle diameter=40 nm, DBP absorption number=168 cc/100 g, specific surface area=58 m$^2$/g, addition capacity ratio (non-liquid high polymer:conductive particles)=68:32) of Tokai Carbon Co., Ltd.

Comparative Example 2-2

An auxiliary electrode layer was formed by a procedure similar to that of Comparative Example 2-1 except for the point that the conductive high polymer sheet was not bonded to the surface of the main electrode layer but was thermocompression bonded by thermal press at 150° C.

Comparative Example 2-3

A polyvinylidene fluoride (PVDFα) used as a liquid high polymer (film high polymer) in Example 2-4 was used as the material (metal paste) of the auxiliary electrode layer, carbon particles used in Comparative Example 2-1 were also used as conductive particles, and a metal paste prepared by stirring conductive particles in liquid high polymer by a ball mill was applied onto the surface of a main electrode layer and dried in vacuum at 100° C., thereby forming an auxiliary electrode layer so as to have a thickness of 0.3 µm.

Comparative Example 2-4

A cathode was formed without forming an auxiliary electrode layer having the PTC function, specifically, so as to include only the sub electrode layer and the main electrode layer having no PTC function.

The characteristics of the electrolytic capacitors of Examples 2-1 to 2-7 and Comparative Examples 2-1 to 2-4 were examined and the result shown in Table 2 was obtained. Table 2 shows the characteristics of the electrolytic capacitors, which are "ESR (Equivalent Series Resistance mΩ)", "leak current (µA)", and "backward voltage test". As "ESR", an ESR value of 100 kHz of each of the electrolytic capacitors measured by using an impedance analyzer is shown. As the "leak current", a leak current value measured after application of voltage (=6.3V) to each of the electrolytic capacitors for five minutes is shown. As the "backward voltage test", at the time of applying a backward voltage (=60V) to each of the electrolytic capacitors, "bad" is written when a trouble (such as firing, smoke, or the like) is observed and "good" is written when no trouble is observed. For reference sake, in Table 2, the material (the liquid high polymer (film high polymer) and conductive particles) of the auxiliary electrode layer, the presence/absence of the PTC function, and the auxiliary electrode layer forming method are also shown.

TABLE 2

|  | Liquid high polymer (film high polymer) | Conductive particles | PTC function | Forming method | ESR (mΩ) | Leak current (μA) | Backward voltage test |
|---|---|---|---|---|---|---|---|
| Example 2-1 | Epoxy resin α | Ni | Presence | Coating (hardening) | 48.8 | 3.5 | Good |
| Example 2-2 | Epoxy resin β | Ni | Presence | Coating (hardening) | 47.2 | 4.3 | Good |
| Example 2-3 | Epoxy resin α | WC | Presence | Coating (hardening) | 53.4 | 5.2 | Good |
| Example 2-4 | PVDF α | WC | Presence | Coating (drying) | 56.2 | 3.1 | Good |
| Example 2-5 | PVDF α | TaB$_2$ | Presence | Coating (drying) | 59.8 | 5.5 | Good |
| Example 2-6 | PVDF β | Ni | Presence | Coating (drying) | 43.6 | 4.9 | Good |
| Example 2-7 | Conductive high polymer sheet |  | Presence | Bonding (adhesion) | 82.1 | 4.7 | Good |
| Comparative example 2-1 | Conductive high polymer sheet |  | Presence | Bonding (adhesion) | 162.0 | 5.8 | Good |
| Comparative example 2-2 | Conducive high polymer sheet |  | Presence | Bonding (thermo compression bonding) | 213.0 | 750.0 | Good |
| Comparative example 2-3 | PVDF α | CB | Presence | Coating (drying) | 151.0 | 7.2 | Good |
| Comparative example 2-4 | — | — | Absence | — | 35.0 | 1.2 | Bad |

As understood from Table 2, if conditions (suitable conditions) such that the ESR is 100 mΩ or less, leak current is 10.0 μA or less, and the backward voltage test is "good" have to be satisfied as characteristics for practical use of an electrolytic capacitor, the electrolytic capacitors of Examples 2-1 to 2-7 using the metal particles or conductive ceramic particles as the conductive particles satisfy the suitable conditions of all of the ESR, leak current, and backward voltage test. Specifically, firing, smoke, and the like did not occur in the electrolytic capacitors of Examples 2-1 to 2-7 for the reasons: (1) since the metal particles or conductive ceramic particles are contained as the conductive particles, the ESR is suppressed because of the low resistance characteristic of the metal particles or conductive ceramic particles, (2) since excessive external force is not applied to the dielectric layer during manufacture and the dielectric layer is not easily broken due to a mechanical factor, leak current is suppressed, and (3) although excess current flows instantaneously when backward voltage is applied, the resistance of the cathode is increased by using the PTC function of an auxiliary electrode layer, and excess current is suppressed. On the other hand, the electrolytic capacitors of Comparative Examples 2-1 to 2-3 do not satisfy part of the ESR, leak current, and backward voltage test. Concretely, the electrolytic capacitors of Comparative Examples 2-1 and 2-3 satisfy the suitable conditions of both of the leak current and the backward voltage test but do not satisfy the ESR. The electrolytic capacitor of Comparative Example 2-2 satisfies the suitable condition of only the backward voltage test but does not satisfy the suitable conditions of the ESR and leak current. Specifically, since the electrolytic capacitors of Comparative Examples 2-1 to 2-3 do not contain the metal particles or conductive particles but contain the carbon particles as the conductive particles, due to the resistance characteristic of the carbon particles, all of the electrolytic capacitors did not satisfy the suitable condition of the ESR. For reference sake, although the electrolytic capacitor of Comparative Example 2-4 satisfies the suitable conditions of ESR and leak current, due to no PTC function, smoke was generated in the backward voltage test. It was consequently recognized that in the electrolytic capacitors of Examples 2-1 to 2-7, both of the ESR and leak current are suppressed, occurrence of a trouble such as firing and smoke is prevented, and, particularly, the resistance characteristic of the electrolytic capacitors can be reduced.

In particular, when the ESR of the electrolytic capacitors of Examples 2-1 to 2-7 are compared with each other, the ESR in the electrolytic capacitors of Examples 2-1 to 2-6 using the applying (hardening or drying) process is lower than that in the electrolytic capacitor of Example 2-7 using the bonding (attaching) process for forming the auxiliary electrode layer. Specifically, in the electrolytic capacitors of Examples 2-1 to 2-6, the contact resistance between the main electrode layer and the auxiliary electrode layer is lower than that in the electrolytic capacitor of Example 2-7, so that the ESR is reduced only by the decrease in the contact resistance. From the above, it was recognized that the resistance characteristic in Examples 2-1 to 2-6 can be further lowered.

Although concrete data will not be presented, in place of manufacturing an electrolytic capacitor so that only the auxiliary electrode layer in a cathode having a three-layer structure (sub electrode layer, main electrode layer, and auxiliary electrode layer) has the PTC function, an electrolytic capacitor in which only the sub electrode layer has the PTC function, an electrolytic capacitor in which only the main electrode layer has the PTC function, an electrolytic capacitor in which only arbitrary two layers out of the sub electrode layer, main electrode layer, and auxiliary electrode layer have the PTC function, and an electrolytic capacitor in which all of the sub electrode layer, main electrode layer, and auxiliary electrode layer have the PTC function were manufactured and their characteristics were similarly examined. In the electrolytic capacitors, results similar to those of the electrolytic capacitors of Examples 2-1 to 2-7 were obtained. Thus, it was recognized that, irrespective of the structure of the cathode, by forming the cathode so as to contain the metal particles or conductive ceramic particles as the conductive particles, the resistance characteristic of the electrolytic capacitor can be reduced.

For reference sake, the PTC characteristics of the cathodes of Examples 2-1 to 2-7 and Comparative Examples 2-1 to 2-3 were examined and results shown in Table 3 were obtained. Table 3 shows the PTC characteristics of the cathodes. As the PTC characteristics, "room temperature resistance (mΩ)", "operation start temperature (° C.)", and "resistance change rate (the number of digits)" are shown. The "operation start temperature" is temperature indicative of a resistance value which is five times as large as the resistance value shown at 25° C. The "resistance change rate" indicates the number of digits of increase in resistance, that is, the number of digits "x" of the case where the relation of $R2=10^x \times R1$ is satisfied between the room temperature resistance R1 and the resistance R2 increased based on the PTC function. In the case of examining the PTC function, with respect to Examples 2-1 to 2-6 and comparative example 2-3, a film was formed by using the material (metal paste) of the auxiliary electrode layer so as to have a thickness of 0.2 mm between two electrolytic nickel foil electrodes (having a thickness of 25 µm), thereby forming a PTC sheet with an electrode. The PTC sheet was punched in a disc shape having a diameter of 10 mm. After that, the PTC sheet with an electrode was put in a thermostat and resistance was measured at every two degrees by a four-terminal method while increasing the temperature at 2° C./min. within the range from 25° C. to 160° C. With respect to Example 2-7 and Comparative Examples 2-1 and 2-2, a PTC sheet with an electrode was manufactured by a procedure similar to that of Examples 2-1 to 2-6 and Comparative Example 2-3 except for the point that a conductive high polymer sheet was thermo-compression-bonded between two electrolytic nickel foil electrodes, and resistance of the PTC sheet with the electrode was measured. For reference, Table 3 also shows the material of the auxiliary electrode layer (liquid high polymer (film high polymer), conductive particles).

Next, an electrolytic capacitor was manufactured by using the electrolytic capacitor manufacturing method of the third embodiment. A procedure of manufacturing an electrolytic capacitor (including a procedure of forming a solid electrolyte layer) is similar to that of the case of manufacturing the electrolytic capacitor of the second embodiment except for the point that the cathode is formed so as to have a two-layer structure of the sub and main electrode layers.

Electrolytic capacitors (Examples 3-1 to 3-6) of the invention were manufactured while changing the configuration of the cathode (sub electrode layer and main electrode layer) having the PTC function by using the electrolytic capacitor manufacturing method and, after that, the characteristics of the electrolytic capacitors were examined. At the time of examining the characteristics of the electrolytic capacitors of the invention, to compare and evaluate the performances, comparative electrolytic capacitors (Comparative Examples 3-1 to 3-3) were also manufactured while changing the configuration of the cathode and the characteristics of the electrolytic capacitors were also examined.

Example 3-1

A cathode was formed by the following procedure so that only a main electrode layer has the PTC function. Specifi-

TABLE 3

| | Liquid high polymer (film high polymer) | Conductive particles | Resistance (mΩ) at room temperature | Operation start temperature (° C.) | Resistance change rate (the number of digits) |
|---|---|---|---|---|---|
| Example 2-1 | Epoxy resin α | Ni | 1.2 | 125 | 5.5 |
| Example 2-2 | Epoxy resin β | Ni | 1.4 | 128 | 5.3 |
| Example 2-3 | Epoxy resin α | WC | 2.0 | 119 | 4.9 |
| Example 2-4 | PVDF α | WC | 1.5 | 117 | 8.2 |
| Example 2-5 | PVDF α | TaB$_2$ | 2.4 | 120 | 7.6 |
| Example 2-6 | PVDF β | Ni | 1.2 | 125 | 8.7 |
| Example 2-7 | Conductive high polymer sheet | | 0.7 | 127 | 9.0 |
| Comparative examples 2-1, 2-2 | Conductive high polymer sheet | | 27.2 | 126 | 5.2 |
| Comparative example 2-3 | PVDF α | CB | 29.7 | 124 | 5.1 |

As understood from the results shown in Table 3, in all of the cathodes of Examples 2-1 to 2-7 and Comparative Examples 2-1 to 2-3, the resistance change rate of three or more digits is obtained, that is, the resistance increased by 1,000 times or more. Consequently, it was recognized that the cathodes of Examples 2-1 to 2-7 and Comparative Examples 2-1 to 2-3 have the resistance change rate sufficient to display the PTC function. Although concrete data will not be presented, for confirmation, the resistance characteristics of a carbon black paste having no PTC function (the sub electrode layer of Examples 2-1 to 2-7 and Comparative Examples 2-1 to 2-3) and a silver paste having no PTC function (the main electrode layer of Examples 2-1 to 2-6 and Comparative Examples 2-1 to 2-3) were examined, concretely, each of the pastes was formed in a film (by heating and drying) on a glass plate having a size of 30 mm×30 mm by using the dipping method and, after that, room temperature resistance of each of the pastes was measured by using a metal clip. Similarly, the resistance of each of the pastes was measured in a thermostat of 150° C. The resistance increase rate of each of the pastes was 20% or less and the resistance change rate sufficient to display the PTC function was not obtained.

cally, carbon black (CB) paste TC-8263 of Tanaka Kikinzoku Kogyo K.K. was used as the material (carbon paste) of a sub electrode layer. The carbon paste was applied on the surface of a solid electrolyte layer and dried at 125° C., thereby forming the sub electrode layer. As the material (metal paste) of the main electrode layer, a thermosetting high polymer as a liquid high polymer (film high polymer), concretely, a mixture (epoxy resin α: mixing weight ratio of (EPICLON850:EP4005)=75:25) between an epoxy resin EPICLON850 (epoxy equivalent=190 g/eq) of Dainippon Ink and Chemicals, Incorporated and an epoxy resin EP4005 (epoxy equivalent=510 g/eq) of Asahi Denka Co., Ltd. was used. As the conductive particles, filament nickel powders Type 255 (Niα; average particle diameter=2.2 µm to 2.8 µm, apparent density=0.50 g/cm$^3$ to 0.65 g/cm$^3$, specific surface area=0.68 m$^2$/g, addition capacity ratio (high polymer:conductive particles)=40:60) of INCO Limited were used. A metal paste was applied on the surface of the main electrode layer and was set at 130° C. under nitrogen atmosphere, thereby forming a main electrode layer so as to have the thickness of 0.2 mm. As the metal paste, a metal paste containing the liquid high polymer and conductive particles and, as a co-hardener, a hardener B570 (acid anhydride equivalent=168 g/eq, equivalent ratio between acid anhydride and liquid high polymer=1:1) of Dainippon Ink and Chemicals, Incorporated and a hardening accelerator PN-40J (addition amount=1% by weight of the weight of the liquid high polymer) of Ajinomoto-Fine-Techno Co., Inc. was used.

Example 3-2

A cathode was formed by a procedure similar to that of Example 3-1 except for the point that silver-coated nickel flakes (Niβ; silver coating ratio=15%, apparent density=2.4 g/cc, addition capacity ratio (liquid high polymer:conductive particles)=45:55) of Novamet Specialty Products Corporation were used.

Example 3-3

A cathode was formed by a procedure similar to that of Example 3-1 except for the point that a main electrode layer was formed so as to have a thickness of 0.2 μm by using, as the material (metal paste) of the main electrode layer, a soluble thermoplastic high polymer as a liquid high polymer (film high polymer), concretely, polyvinylidene fluoride (PVDF) Kynar7201 (melting point=122° C. to 126° C., specific gravity=1.88) of Atofina Chemicals dissolved in a mixture solvent of acetone and toluene, using, as the conductive particles, tungsten carbide (WC) WC—F (particle diameter=0.62 μm, addition capacity ratio (liquid high polymer:conductive particles)=70:30) of Japan New Metals Co., Ltd., applying a metal paste prepared by stirring the conductive particles in the liquid high polymer by a ball mill onto the surface of a sub electrode layer, and drying the resultant in vacuum at 100° C.

Example 3-4

A cathode was formed so that only the sub electrode layer has the PTC function by the following procedure. As the material (carbon paste) of the sub electrode layer, a thermosetting high polymer as a liquid high polymer (film high polymer), concretely, the epoxy resin α (containing the co-hardener (the hardener and the hardening accelerator)) used in Example 3-1 was used. As the conductive particles, carbon black (CB) #4500 TOKABLACK (particle diameter=40 nm, DBP absorption number=168 cc/100 g, specific surface area=58 m$^2$/g, addition capacity ratio (liquid high polymer:conductive particles)=67:33) of Tokai Carbon Co., Ltd was used. A mixture obtained by mixing and stirring the liquid high polymer and the conductive particles was applied on the surface of the solid electrolyte layer and was set at 130° C. under nitrogen atmosphere, thereby forming the sub electrode layer. As the material (metal paste) of the main electrode layer, silver paste NH-1429N of Tanaka Kikinzoku Kogyo K.K. was used. The silver paste was applied on the surface of the sub electrode layer and dried, thereby forming the main electrode layer.

Example 3-5

A cathode was formed by a procedure similar to that of Example 3-4 except for the point that a thermosetting high polymer as the liquid high polymer (film high polymer), concretely, an epoxy resin AK-601 (epoxy resin β; epoxy equivalent=153 g/eq) of Nippon Kayaku Co., Ltd. was used.

Example 3-6

A cathode was formed by a procedure similar to that of Example 3-4 except for the point that polyvinylidene fluoride (PVDF; PVDF dissolved in a mixture solvent of acetone and toluene) used as a liquid high polymer (film high polymer) in Example 3-3 was used as the material (carbon paste) of the sub electrode layer, the carbon black used in Example 3-4 was used as conductive particles, and a carbon paste prepared by stirring the conductive particles in the liquid high polymer by a ball mill was applied onto the surface of a solid electrolyte layer and dried in vacuum at 100° C., thereby forming a sub electrode layer.

Comparative Example 3-1

A cathode was formed by a procedure similar to that of Example 3-1 except for the point that a silver paste (without the PTC function) used in Example 3-4 was used as the material (metal paste) of the main electrode layer and the metal paste was applied on the surface of the sub electrode layer and dried, thereby forming the main electrode layer without the PTC function.

Comparative Example 3-2

A cathode was formed by a procedure similar to that of Example 3-1 except for the point that a thermoplastic conductive high polymer sheet was thermo-compression-bonded as a main electrode layer to the sub electrode layer without using the metal paste as the material of the main electrode layer. At the time of forming the conductive high polymer sheet, an insoluble thermoplastic high polymer, concretely, high density polyethylene (HDPE) HY540 (melting point=135° C. and specific gravity=0.961) of Japan Polyethylene Corporation was used. As the conductive particles, filament nickel powder type 210 (average particle diameter=0.5 μm to 1.0 μm, apparent density=0.80 g/cm$^3$, specific surface area=1.50 m$^2$/g to 2.50 m$^2$/g, addition capacity ratio (high polymer:conductive particles)=65:35) of INCO Limited was used. The high polymer and conductive particles were melted and kneaded in a kneading mill of 150° C. The kneaded material was thermal-pressed so as to be formed in a sheet shape. At the time of thermo-compression-bonding the conductive high polymer sheet to the sub electrode layer, the conductive high polymer sheet was thermal-pressed to the sub electrode layer at 150° C.

Comparative Example 3-3

A cathode was formed by a procedure similar to that of Example 3-4 except for the point that a thermoplastic conductive high polymer sheet was thermo-compression-bonded as a sub electrode layer to the solid electrolyte layer without using the carbon paste as the material of the sub electrode layer. At the time of forming the high polymer sheet, an insoluble thermoplastic high polymer, concretely, high density polyethylene (HDPE) used in Comparative Example 3-2 was used. As the conductive particles, the carbon black used in Example 3-4 was used. The high polymer and conductive particles were melted and kneaded in a kneading mill of 150° C. The kneaded material was thermal-pressed so as to be formed in a sheet shape. At the time of thermo-compression-bonding the high polymer sheet to the sub electrode layer, the high polymer sheet was thermal-pressed to the sub electrode layer at 150° C.

The characteristics of the electrolytic capacitors of Examples 3-1 to 3-6 and Comparative Examples 3-1 to 3-3 were examined and the result shown in Tables 4 and 5 was obtained.

The characteristics of the electrolytic capacitors of Examples 3-1 to 3-3 and Comparative Examples 3-1 and 3-2 were examined and the result shown in Table 4 was obtained. Table 4 shows the characteristics of the electrolytic capacitors, which are "ESR (Equivalent Series Resistance mΩ)", "leak current (μA)", and "backward voltage test". For reference sake, in Table 4, the materials (the liquid high polymer (film high polymer) and conductive particles) of the sub and main electrode layers, and the presence/absence of the PTC function are also shown.

TABLE 4

|  | Sub electrode layer (without PTC function) | Main electrode layer (with PTC function) |  | ESR (mΩ) | Leak current (μA) | Backward voltage test |
|---|---|---|---|---|---|---|
|  |  | Liquid high polymer (film high polymer) | Conductive particles |  |  |  |
| Example 3-1 | CB paste | Epoxy resin α | Ni α | 48 | 3.6 | Good |
| Example 3-2 | CB paste | Epoxy resin α | Ni β | 51 | 4.3 | Good |
| Example 3-3 | CB paste | PVDF | WC | 45 | 3.5 | Good |
| Comparative example 3-1 | CB paste | Silver paste (without PTC function) |  | 35 | 1.2 | Bad |
| Comparative example 3-2 | CB paste | Conductive high polymer sheet |  | 142 | 536.0 | Good |

As understood from Table 4, if conditions (suitable conditions) such that the ESR is 100 mΩ or less, leak current is 10.0 μA or less, and the backward voltage test is "good" have to be satisfied as characteristics for practical use of an electrolytic capacitor, the electrolytic capacitors of Examples 3-1 to 3-3 satisfy the suitable conditions of all of the ESR, leak current, and backward voltage test. Specifically, firing, smoke, and the like did not occur in the electrolytic capacitors of Examples 3-1 to 3-3 for the reasons: (1) since the carbon paste and metal paste are applied to form a film to thereby form a cathode (sub electrode layer and main electrode layer), the contact resistance between the solid electrolyte layer and the cathode decreases so that the ESR is reduced, (2) since excessive external force is not applied to the dielectric layer at the time of forming the cathode because the main electrode layer is not thermo-compression-bonded to the sub electrode layer, the dielectric layer is not broken due to a mechanical factor during manufacture and, accordingly, leak current is suppressed, and (3) although excess current flows instantaneously when backward voltage is applied, the resistance of the cathode is increased by using the PTC function of the main electrode layer, and excess current is suppressed. On the other hand, the electrolytic capacitors of Comparative Examples 3-1 and 3-2 do not satisfy part of the suitable conditions of the ESR, leak current, and backward voltage test. Concretely, the electrolytic capacitor of Comparative Example 3-1 satisfies the suitable conditions of both of the ESR and leak current but does not satisfy the backward voltage test. The electrolytic capacitor of Comparative Example 3-2 satisfies the suitable condition of the backward voltage test but does not satisfy the suitable conditions of the ESR and leak current. Specifically, in the electrolytic capacitor of Comparative Example 3-1, a cathode is formed by applying the carbon paste and metal paste and the main electrode layer is not thermo-compression-bonded to the sub electrode layer. Consequently, in a manner similar to Examples 3-1 to 3-3, the ESR and leak current are reduced. However, the cathode does not have the PTC function, so that smoke was generated in the backward voltage test. In the electrolytic capacitor of Comparative Example 3-2, the main electrode layer was formed by thermo-compression-bonding the conductive high polymer sheet having the PTC function, so that no fire or smoke occurred in the backward voltage test. However, the ESR became very high due to increase in the contact resistance between the solid electrolyte layer and the cathode, and the dielectric layer was severely damaged due to an excessive external force at the time of thermo compression bonding, so that leak current increased remarkably. It was consequently recognized that in the electrolytic capacitors of Examples 3-1 to 3-3, both of the ESR and leak current are suppressed and occurrence of a trouble such as firing and smoke is prevented, so that the electrolytic capacitors can be stably manufactured.

The characteristics of the electrolytic capacitors of Examples 3-4 to 3-6 and Comparative Example 3-3 were examined and the result shown in Table 5 was obtained. Table 5 shows the characteristics of the electrolytic capacitors and shows, as the characteristics, like Table 4, the characteristics of "ESR (mΩ)", "leak current (μA)", and "backward voltage test" and, in addition, the materials of the sub and main electrode layers, and the presence/absence of the PTC function.

TABLE 5

|  | Sub electrode layer (with PTC function) |  | Main electrode layer (without PTC function) | ESR (mΩ) | Leak current (μA) | Backward voltage test |
|---|---|---|---|---|---|---|
|  | Liquid high polymer (film high polymer) | Conductive particles |  |  |  |  |
| Example 3-4 | Epoxy resin α | CB | Silver paste | 72 | 2.1 | Good |
| Example 3-5 | Epoxy resin β | CB | Silver paste | 69 | 3.2 | Good |

TABLE 5-continued

| | Sub electrode layer (with PTC function) | | | | | |
|---|---|---|---|---|---|---|
| | Liquid high polymer (film high polymer) | Conductive particles | Main electrode layer (without PTC function) | ESR (mΩ) | Leak current (μA) | Backward voltage test |
| Example 3-6 | PVDF | CB | Silver paste | 68 | 4.4 | Good |
| Comparative example 3-3 | Conductive high polymer sheet | | Silver paste | 197 | 897.0 | Good |

As understood from Table 5, if suitable conditions (ESR≦100, leak current≦10.0 μA, and the backward voltage test="good") regarding characteristics for practical use of an electrolytic capacitor are considered, the electrolytic capacitors of Examples 3-4 to 3-6 satisfy the suitable conditions of all of the ESR, leak current, and backward voltage test for reasons similar to those of the electrolytic capacitors of Examples 3-1 to 3-3. In contrast, in the electrolytic capacitor of Comparative Example 3-3, for reasons similar to those of the electrolytic capacitor of Comparative Example 3-2, firing, smoke, and the like did not occur in the backward voltage test, but both of the ESR and leak current largely increased. It was consequently recognized that also in the electrolytic capacitors of Examples 3-4 to 3-6, both of the ESR and leak current are suppressed and occurrence of a trouble such as firing and smoke is prevented, so that the electrolytic capacitors can be stably manufactured.

Although concrete data will not be presented, the characteristics of the electrolytic capacitor manufactured so that both of the sub and main electrode layers have the PTC function, concretely, the electrolytic capacitors obtained by replacing the sub electrode layers (without the PTC function) of Examples 3-1 to 3-3 with the sub electrode layers (with the PTC function) of Examples 3-4 to 3-6, and the electrolytic capacitors obtained by replacing the main electrode layers (with the PTC function) of Examples 3-4 to 3-6 with the sub electrode layers (with the PTC function) of Examples 3-1 to 3-3 were examined, and results similar to those obtained with respect to the electrolytic capacitors of Examples 3-1 to 3-6 were obtained in each of the electrolytic capacitors. Thus, it was recognized that, also in the case where both of the sub and main electrode layers are provided with the PTC function, the electrolytic capacitor can be stably manufactured.

For reference sake, the PTC characteristics of the cathodes of Examples 3-1 to 3-6 and Comparative Examples 3-2 to 3-3 were examined and results shown in Table 6 were obtained. Table 6 shows the PTC characteristics of the cathodes. As the PTC characteristics, "room temperature resistance (mΩ)", "operation start temperature (° C.)", and "resistance change rate (the number of digits)" are shown. At the time of examining the PTC functions, with respect to Examples 3-1 to 3-3 in which the main electrode layer has the PTC function, a film was formed by using the material (metal paste) of the main electrode layer so as to have a thickness of 0.2 mm between two electrolytic nickel foil electrodes (having a thickness of 25 μm), thereby forming a PTC sheet with an electrode. The PTC sheet was punched in a disc shape having a diameter of 10 mm. After that, the PTC sheet with an electrode was put in a thermostat and resistance was measured at every two degrees by a four-terminal method while increasing the temperature at 2° C./min. within the range from 25° C. to 160° C. With respect to Examples 3-4 to 3-6 in which the sub electrode layer has the PTC function, a PTC sheet with an electrode was manufactured by a procedure similar to that of Examples 3-1 to 3-3 except for the point that the material (carbon paste) of the sub electrode layer is used, and resistance of the PTC sheet with the electrode was measured. Further, with respect to Comparative Examples 3-2 and 3-3 in which the conductive high polymer sheet has the PTC function, a PTC sheet with an electrode was manufactured by a procedure similar to that of Examples 3-1 to 3-3 or Examples 3-4 to 3-6 except for the point that the conductive high polymer sheet was thermo-compression-bonded between two electrolytic nickel foil electrodes, and resistance of the PTC sheet with the electrode was measured. For reference, Table 6 also shows the kind of an electrode layer to be measured in the cathode, that is, the electrode layer with the PTC function.

TABLE 6

| | Measured electrode layer (with PTC function) | Resistance (mΩ) at room temperature | Operation start temperature (° C.) | Resistance change rate (the number of digits) |
|---|---|---|---|---|
| Example 3-1 | Main electrode layer | 1.2 | 125 | 5.5 |
| Example 3-2 | Main electrode layer | 2.4 | 123 | 5.1 |
| Example 3-3 | Main electrode layer | 1.5 | 117 | 8.2 |
| Example 3-4 | Sub electrode layer | 30.2 | 123 | 3.8 |
| Example 3-5 | Sub electrode layer | 32.5 | 120 | 3.7 |
| Example 3-6 | Sub electrode layer | 30.7 | 128 | 5.3 |
| Comparative example 3-2 | Main electrode layer | 0.7 | 127 | 9.0 |
| Comparative example 3-3 | Sub electrode layer | 27.2 | 126 | 5.2 |

As understood from the results shown in Table 6, in all of the cathodes of Examples 3-1 to 3-6 and Comparative Examples 3-2 and 3-3, the resistance change rate of three or more digits is obtained, that is, the resistance increased by 1,000 times or more. Consequently, it was recognized that the cathodes of Examples 3-1 to 3-6 and Comparative Examples 3-2 to 3-3 have the resistance change rate sufficient to display the PTC function.

Finally, an electrolytic capacitor was manufactured by using the electrolytic capacitor manufacturing method of the fourth embodiment. By a procedure similar to the procedure of manufacturing an electrolytic capacitor (including a procedure of forming a solid electrolyte layer) of the third embodiment, a capacitor element was formed. A procedure of forming a solid electrolyte layer is similar to that of the case of manufacturing the electrolytic capacitor of the third embodiment. A PTC layer having a sheet structure was prepared by forming a sheet by using a high polymer containing conductive particles, surface process for exposing the conductive particles was performed on the bottom face (face facing the cathode) of the PTC layer, and the bottom face of the PTC layer was bonded to the cathode by using a conductive adhesive, thereby connecting the PTC layer to the cathode via the conductive adhesive. Subsequently, an anode lead made of copper was connected to the anode in the capacitor element by using a conductive adhesive and, similarly, a cathode lead made of copper was bonded to the PTC layer by using a conductive adhesive. Finally, the periphery of the capacitor element was covered with an epoxy resin as a mold resin so that the anode and cathode leads are partially exposed, thereby completing the electrolytic capacitor. As the conductive adhesive, a conductive adhesive Dotite XA-874 of Fujikurakasei Co., Ltd was used.

Electrolytic capacitors (Examples 4-1 to 4-5) of the invention were manufactured while changing the configuration of the PTC layer having the PTC function by using the electrolytic capacitor manufacturing method and, after that, the characteristics of the electrolytic capacitors were examined. At the time of examining the characteristics of the electrolytic capacitors of the invention, to compare and evaluate the performances, comparative electrolytic capacitors (Comparative Examples 4-1 to 4-4) were also manufactured while changing the configuration of the PTC layer as follows, and the electrolytic capacitor (Comparative Example 4-5) was also manufactured so as not to have the PTC layer, and the characteristics of the electrolytic capacitors were also examined.

Example 4-1

A PTC layer was formed by the following procedure and the surface process was performed on the PTC layer, thereby manufacturing an electrolytic capacitor. As a procedure of preparing the PTC layer, a mixture (mixing weight ratio of (EPICLON850:EP4005)=75:25) between an epoxy resin EPICLON850 (epoxy equivalent=190 g/eq) of Dainippon Ink and Chemicals, Incorporated and an epoxy resin EP4005 (epoxy equivalent=510 g/eq) of Asahi Denka Co., Ltd. was used. As the conductive particles, metal particles, concretely, filament nickel powders (Ni) Type 255 (Niα; average particle diameter=2.2 μm to 2.8 μm, apparent density=0.50 g/cm$^3$ to 0.65 g/cm$^3$, specific surface area=0.68 m$^2$/g, addition capacity ratio (high polymer:conductive particles)=40:60) of INCO Limited were used. The high polymer and conductive particles were mixed and stirred and the resultant was applied on the surface of a PET (Polyethylen trephthalate) film and was set at 130° C. under nitrogen atmosphere, thereby forming a sheet-shaped PTC layer so as to have the thickness of 0.2 mm. As the material of the PTC layer, a material containing not only the high polymer and conductive particles but also, as a co-hardener, a hardener B570 (acid anhydride equivalent=168 g/eq, equivalent ratio between acid anhydride and liquid high polymer=1:1) of Dainippon Ink and Chemicals, Incorporated and a hardening accelerator PN-40J (addition amount=1% by weight of the weight of the liquid high polymer) of Ajinomoto-Fine-Techno Co., Inc. was used. An ozone process as the surface process was performed on the PTC layer. Concretely, the UV ozone cleaner VUM-3073-13-00 manufactured by OAK Science Incorporation was used to irradiate the bottom face of the PTC layer in the ozone atmosphere with ultraviolet rays for three minutes, thereby partially removing the high polymer so that the removal depth becomes about 5 μm and forming a recess.

Example 4-2

An electrolytic capacitor was manufactured by a procedure similar to that of Example 4-1 except for the point that a plasma process was used in place of the ozone process as the surface process on the PTC layer. Concretely, an ashing system of a reactive ion etching type using oxygen ($O_2$) as the discharge gas was used to etch the bottom face of the PTC layer under conditions of pressure=20 Pa, power density=0.25 W/cm$^3$, and process time=1 minute.

Example 4-3

An electrolytic capacitor was manufactured by a procedure similar to that of Example 4-1 except for the point that polyvinylidene fluoride (PVDF) Kynar7201 (melting point=122° C. to 126° C., specific gravity=1.88) of Atofina Chemicals was used as a high polymer, conductive ceramic particles, concretely, tungsten carbide (WC) WC—F of Japan New Metals Co., Ltd. (particle diameter=0.62 μm and addition capacity ratio (liquid high polymer:conductive particles)=70:30) was used as the conductive particles, a paste prepared by stirring the conductive particles in the high polymer dissolved in a mixture solvent of acetone and toluene by a ball mill was applied on the surface of a PET film and dried in vacuum at 100° C., thereby forming a PTC layer in a sheet shape so as to have a thickness of 0.2 mm, and the high polymer was partially removed under conditions of ultraviolet irradiation time of 5 minutes and removal depth of 2 μm.

Example 4-4

An electrolytic capacitor was manufactured by a procedure similar to that of Example 4-1 except for the point that linear low-density polyethylene (L-LDPE) UJ960 (melting point=127° C. and specific gravity=0.921) of Japan Polyethylene Corporation was used as the high polymer, metal particles, concretely, filament nickel powder (Ni) type 210 (Niβ; average particle diameter=0.5 μm to 1.0 μm, apparent density=0.80 g/cm$^3$, specific surface area=1.50 m$^2$/g to 2.00 m$^2$/g, addition capacity ratio (high polymer:conductive particles)=65:35) of INCO Limited was used as the conductive particles, the high polymer and conductive particles were melted and kneaded in a kneading mill of 150° C., and the kneaded material was thermal-pressed and electron-beam-bridged with a doze of 100 kGy (gray), thereby forming a sheet-shaped PTC layer so as to have a thickness of 0.2 mm, and the high polymer was partially removed under conditions of ultraviolet irradiation time of 3 minutes and removal depth of 3 μm.

An electrolytic capacitor was manufactured by a procedure similar to that of Example 4-1 except for the point that high density polyethylene (HDPE) HY540 (melting point=135° C., specific gravity=0.961) of Japan Polyethylene Corporation was used as the high polymer, carbon particles, concretely, carbon black (CB) #4500 TOKA-BLACK (particle diameter=40 nm, DBP absorption number=168 cc/100 g, specific surface area=58 m$^2$/g, addition capacity ratio (high polymer:conductive particles)=68:32) of Tokai Carbon Co., Ltd. was used as conductive particles, the high polymer and conductive particles were melted and kneaded in a kneading mill of 150° C., and the kneaded material was thermal-pressed and electron-beam-bridged with a doze of 100 kGy (gray), thereby forming a sheet-shaped PTC layer so as to have a thickness of 0.2 mm, and the high polymer was partially removed under conditions of ultraviolet irradiation time of 1 minute and removal depth of 1 μm.

Comparative Example 4-1

An electrolytic capacitor was manufactured by a procedure similar to those of Examples 4-1 and 4-2 except that the surface process is not performed on the bottom face of the PTC layer Comparative Example 4-2

An electrolytic capacitor was manufactured by a procedure similar to that of Example 4-3 except that the surface process is not performed on the bottom face of the PTC layer Comparative Example 4-3

An electrolytic capacitor was manufactured by a procedure similar to those of Example 4-4 except that the surface process is not performed on the bottom face of the PTC layer.

Comparative Example 4-4

An electrolytic capacitor was manufactured by a procedure similar to those of Example 4-5 except that the surface process is not performed on the bottom face of the PTC layer.

Comparative Example 4-5

For reference sake, an electrolytic capacitor was manufactured without a PTC layer, that is, so as not to provide the PTC function.

The characteristics of the electrolytic capacitors of Examples 4-1 to 4-5 and Comparative Examples 4-1 to 4-5 were examined and the results shown in Tables 7 to 10 were obtained. Tables 7 to 10 show the characteristics of the electrolytic capacitors, which are "ESR (Equivalent Series Resistance mΩ)", "leak current (μA)", and "backward voltage test". Table 7 shows the characteristics of the electrolytic capacitors of Examples 4-1 and 4-2 and Comparative Example 4-1. Table 8 shows the characteristics of the electrolytic capacitors of Example 4-3 and Comparative Example 4-2. Table 9 shows the characteristics of the electrolytic capacitors of Example 4-4 and Comparative Example 4-3. Table 10 shows the characteristics of the electrolytic capacitors of Example 4-5 and Comparative Example 4-4. For reference sake, in all of Tables 7 to 10, the characteristics of the electrolytic capacitor of Comparative Example 4-5 are also shown. In Tables 7 to 10, for reference sake, in addition to the materials (the high polymer and conductive particles) of the PTC layer, the presence/absence of the PTC function, the PTC layer forming method, and the surface process are also shown.

TABLE 7

| | High polymer | Conductive particles | PTC function | Forming method | Surface process | ESR (mΩ) | Leak current (μA) | Backward voltage test |
|---|---|---|---|---|---|---|---|---|
| Example 4-1 | Epoxy resin | Ni α | Presence | Coating/thermo compression bonding | Presence (ozone) | 40.2 | 3.1 | Good |
| Example 4-2 | Epoxy resin | Ni α | Presence | Coating/thermo compression bonding | Presence (etching) | 39.9 | 3.8 | Good |
| Comparative example 4-1 | Epoxy resin | Ni α | Presence | Coating/thermo compression bonding | Absence | 48.8 | 3.5 | Good |
| Comparative example 4-5 | — | — | Absence | — | Absence | 35.0 | 1.2 | Bad |

TABLE 8

| | High polymer | Conductive particles | PTC function | Forming method | Surface process | ESR (mΩ) | Leak current (μA) | Backward voltage test |
|---|---|---|---|---|---|---|---|---|
| Example 4-3 | PVDF | WC | Presence | Coating/drying | Presence (ozone) | 49.4 | 2.6 | Good |
| Comparative example 4-2 | PVDF | WC | Presence | Coating/drying | Absence | 56.2 | 3.1 | Good |
| Comparative example 4-5 | — | — | Absence | — | Absence | 35.0 | 1.2 | Bad |

TABLE 9

| | High polymer | Conductive particles | PTC function | Forming method | Surface process | ESR (mΩ) | Leak current (μA) | Backward voltage test |
|---|---|---|---|---|---|---|---|---|
| Example 4-4 | L-LDPE | Ni β | Presence | Thermal press | Presence (ozone) | 39.5 | 3.4 | Good |
| Comparative example 4-3 | L-LDPE | Ni β | Presence | Thermal press | Absence | 74.4 | 4.9 | Good |
| Comparative example 4-5 | — | — | Absence | — | Absence | 35.0 | 1.2 | Bad |

TABLE 10

| | High polymer | Conductive particles | PTC function | Forming method | Surface process | ESR (mΩ) | Leak current (μA) | Backward voltage test |
|---|---|---|---|---|---|---|---|---|
| Example 4-5 | HDPE | CB | Presence | Thermal press | Presence (ozone) | 71.6 | 5.1 | Good |
| Comparative example 4-4 | HDPE | CB | Presence | Thermal press | Absence | 162.0 | 5.8 | Good |
| Comparative example 4-5 | — | — | Absence | — | Absence | 35.0 | 1.2 | Bad |

As understood from Table 7, when the characteristics of the electrolytic capacitors of Examples 4-1 and 4-2 in which the surface process is performed on the PTC layer are compared with those of the electrolytic capacitor of Comparative Example 4-1 in which the surface process is not performed on the PTC layer, firing, smoke, and the like did not occur in the electrolytic capacitors of Examples 4-1 and 4-2 and the electrolytic capacitor of Comparative Example 4-1 since the PTC layer having the PTC function is provided. The leak current in the electrolytic capacitors of Examples 4-1 and 4-2 and that in the electrolytic capacitor of Comparative Example 4-1 are almost the same. However, the ESR in the electrolytic capacitors of Examples 4-1 and 4-2 is lower than that of the electrolytic capacitor of Comparative Example 4-1. Specifically, in the electrolytic capacitors of Examples 4-1 and 4-2, the surface process is performed on the bottom face of the PTC layer so that the conductive particles are exposed. Consequently, the contact resistance between the PTC layer and the cathode decreases and, as a result, the ESR is lowered. Therefore, in the electrolytic capacitors of Examples 4-1 and 4-2, both of the ESR and leak current are suppressed, occurrence of a trouble such as firing, smoke, and the like is prevented and, particularly, it was recognized that the resistance characteristic of the electrolytic capacitors can be reduced. For reference sake, the characteristics of the electrolytic capacitors of Examples 4-1 and 4-2 having the PTC layer and those of the electrolytic capacitor of Comparative Example 4-5 having no PTC layer were examined. The ESR and leak current of the electrolytic capacitor of Comparative Example 4-5 are almost the same as those of the electrolytic capacitors of Examples 4-1 and 4-2. However, different from the electrolytic capacitors of Examples 4-1 and 4-2, the PTC function is not provided, so that smoke occurred in the backward voltage test.

As understood from the result shown in Table 8, when the characteristics of the electrolytic capacitor of Example 4-3 in which the surface process is performed on the PTC layer are compared with those of the electrolytic capacitor of Comparative Example 4-2 in which the surface process is not performed on the PTC layer, like the result shown in Table 7, the results of leak current and backward voltage test of the electrolytic capacitor of Example 4-3 and those of the electrolytic capacitor of Comparative Example 4-2 are almost the same. However, the ESR of the electrolytic capacitor of Example 4-3 is lower than that of the electrolytic capacitor of Comparative Example 4-2. Consequently, also in the electrolytic capacitor of Example 4-3, both of the ESR and the leak current are suppressed, and occurrence of a trouble such as firing or smoke is prevented. It was consequentially recognized that the resistance characteristic can be lowered.

As understood from the result shown in Table 9, when the characteristics of the electrolytic capacitor of Example 4-4 in which the surface process is performed on the PTC layer are compared with those of the electrolytic capacitor of Comparative Example 4-3 in which the surface process is not performed on the PTC layer, like the result shown in Table 7, the results of leak current and backward voltage test of the electrolytic capacitor of Example 4-4 and those of the electrolytic capacitor of Comparative Example 4-3 are almost the same. However, the ESR of the electrolytic capacitor of Example 4-3 is lower than that of the electrolytic capacitor of Comparative Example 4-4. Consequently, also in the electrolytic capacitor of Example 4-4, both of the ESR and the leak current are suppressed, and occurrence of a trouble such as firing or smoke is prevented. It was consequentially recognized that the resistance characteristic can be lowered.

Further, as understood from the result shown in Table 10, when the characteristics of the electrolytic capacitor of Example 4-5 in which the surface process is performed on the PTC layer are compared with those of the electrolytic capacitor of Comparative Example 4-4 in which the surface process is not performed on the PTC layer, like the result shown in Table 7, the results of leak current and backward voltage test of the electrolytic capacitor of Example 4-5 and those of the electrolytic capacitor of Comparative Example 4-4 are almost the same. However, the ESR of the electrolytic capacitor of Example 4-5 is lower than that of the electrolytic capacitor of Comparative Example 4-4. Consequently, also in the electrolytic capacitor of Example 4-5, both of the ESR and the leak current are suppressed, and occurrence of a trouble such as firing or smoke is prevented. It was consequentially recognized that the resistance characteristic can be lowered.

As described above, in any of the electrolytic capacitors of the invention (Examples 4-1 to 4-5), the resistance characteristic can be lowered. In particular, when the ESR of the electrolytic capacitors of the invention were compared with each other, it was recognized that the ESR in the electrolytic capacitors of Examples 4-1 to 4-4 using the metal particles or conductive ceramic particles as the conductive particles can be lowered more than the electrolytic capacitor of Example 4-5 using the carbon particles as the conductive particles.

Although concrete data will not be presented, when electrolytic capacitors were manufactured by performing an ultraviolet process and a laser process in place of the plasma process and the ozone process as the surface process on the bottom face of the PTC layer and the characteristics were similarly examined, results similar to those of the electrolytic capacitors of Examples 4-1 to 4-5 were obtained in any of the manufactured electrolytic capacitors. It was therefore recognized that the resistance characteristic of an electrolytic capacitor can be lowered by performing the surface process for exposing the conductive particles on the bottom face of the PTC layer irrespective of the kind of the surface process.

Although concrete data will not be presented, when an electrolytic capacitor in which the surface process is performed on only the top face of the PTC layer and an electrolytic capacitor in which the surface process is performed on both of the top and bottom faces of the PTC layer were manufactured in place of the electrolytic capacitor in which the surface process is performed on only the bottom face of the PTC layer and the characteristics were similarly examined, results similar to those of the electrolytic capacitors of Examples 4-1 to 4-5 were obtained also in any of the manufactured electrolytic capacitors. It was therefore recognized that the resistance characteristic of an electrolytic capacitor can be lowered by performing the surface process on the PTC layer.

For reference sake, the PTC characteristics of the PTC layers of Examples 4-1 to 4-5 and Comparative Examples 4-1 to 4-4 were examined and the results shown in Table 11 were obtained. Table 11 shows the PTC characteristics of the PTC layer. As the PTC characteristics, "room temperature resistance (mΩ)", "operation start temperature (° C.)", and "resistance change rate (the number of digits)" are shown. In the case of examining the PTC characteristics, with respect to Examples 4-1 to 4-3 and comparative examples 4-1 and 4-2, a film was formed by using the material (high polymer containing conductive particles) of the PTC so as to have a thickness of 0.2 mm between two electrolytic nickel foil electrodes (having a thickness of 25 μm), thereby forming a PTC sheet with an electrode. The PTC sheet was punched in a disc shape having a diameter of 10 mm. After that, the PTC sheet with an electrode was put in a thermostat and resistance was measured at every two degrees by a four-terminal method while increasing the temperature at 2° C./min. within the range from 25° C. to 160° C. With respect to Examples 4-4 and 4-5 and Comparative Examples 4-3 and 4-4, a PTC sheet with an electrode was manufactured by a procedure similar to that of Examples 4-1 to 4-3 and Comparative Examples 4-1 and 4-2 except for the point that the PTC layer was thermo-compression-bonded between two electrolytic nickel foil electrodes, and resistance of the PTC sheet with the electrode was measured.

TABLE 11

| | Resistance (mΩ) at room temperature | Operation start temperature (° C.) | Resistance change rate (the number of digits) |
|---|---|---|---|
| Examples 4-1 and 4-2 Comparative example 4-1 | 1.2 | 125 | 5.5 |
| Example 4-3 Comparative example 4-2 | 1.5 | 117 | 8.2 |
| Example 4-4 Comparative example 4-3 | 1.1 | 115 | 8.7 |
| Example 4-5 Comparative example 4-4 | 27.2 | 126 | 5.2 |

As understood from the results shown in Table 11, in all of the PTC layers of Examples 4-1 to 4-5 and Comparative Examples 4-1 to 4-4, the resistance change rate of three or more digits is obtained, that is, the resistance increased by 1,000 times or more. Consequently, it was recognized that the PTC layers of Examples 4-1 to 4-5 and Comparative Examples 4-1 to 4-4 have the resistance change rate sufficient to display the PTC function.

Although the invention has been described by the embodiments and examples, the invention is not limited to the embodiments and examples. As long as an electrolytic capacitor can be constructed or manufactured so as to have the PTC function, the configuration, material, and dimensions of the electrolytic capacitor, the procedure of manufacturing the electrolytic capacitor, and the like can be freely changed.

The electrolytic capacitor according to the invention and the method of manufacturing the same can be applied to a solid electrolytic capacitor whose main part (capacitor element) in which electric reaction occurs is constructed by containing a solid material (conductive high polymer).

Obviously, many modifications and variations of the present invention are possible in the light of the above teachings. It is therefore to be understood that within the scope of the appended claims the invention may be practiced otherwise than as specifically described.

What is claimed is:

1. An electrolytic capacitor comprising:
   a capacitor element having a stacked structure in which a first electrode layer, a dielectric layer, a solid electrolyte layer, and a second electrode layer are stacked in this order;
   a resistance control layer which is connected to the second electrode layer in the capacitor element, has a sheet structure in which conductive particles are held in a high polymer, and has a first face on the side close to the second electrode layer and a second face on the side far from the second electrode layer, a surface process for exposing the conductive particles being performed on at least one of the first and second faces, and in which resistance increases in accordance with rise in temperature in a predetermined temperature range; and
   an electrode lead connected to the resistance control layer.

2. An electrolytic capacitor according to claim 1, wherein at least one of a plasma process, an ultraviolet process, an ozone process, and a laser process is performed as the surface process on at least one of the first and second faces of the resistance control layer.

3. An electrolytic capacitor manufacturing method comprising:
   a step of connecting a resistance control layer having a sheet structure in which conductive particles are held in a high polymer and whose resistance increases in accordance with rise in temperature within a predetermined temperature range to a second electrode layer in a capacitor element in which a first electrode layer, a dielectric layer, a solid electrolyte layer, and the second electrode layer are stacked in this order; and
   a step of connecting an electrode lead to the resistance control layer,
   wherein the step of connecting the resistance control layer to the second electrode layer and the electrode lead comprises:
   a first step of performing surface process for exposing the conductive particles on at least one of a first face facing the second electrode layer of the resistance control layer and a second face on the side opposite to the first face;
   a second step of connecting the resistance control layer to the second electrode layer in the first face; and
   a third step of connecting the resistance control layer to the electrode lead in the second face.

* * * * *